(12) United States Patent
Wang et al.

(10) Patent No.: US 10,922,908 B2
(45) Date of Patent: Feb. 16, 2021

(54) SYSTEM AND METHOD FOR VEHICLE SENSOR DATA STORAGE AND ANALYSIS

(71) Applicant: THE BOEING COMPANY, Chicago, IL (US)

(72) Inventors: Changzhou Wang, Bellevue, WA (US); Jun Yuan, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 431 days.

(21) Appl. No.: 15/896,208

(22) Filed: Feb. 14, 2018

(65) Prior Publication Data

US 2019/0251764 A1 Aug. 15, 2019

(51) Int. Cl.
| | | |
|---|---|---|
| *G01M 17/00* | (2006.01) | |
| *G06F 7/00* | (2006.01) | |
| *G07C 5/08* | (2006.01) | |
| *G06F 16/21* | (2019.01) | |
| *G06F 16/22* | (2019.01) | |
| *G06F 17/30* | (2006.01) | |

(52) U.S. Cl.
CPC ......... *G07C 5/0841* (2013.01); *G06F 16/219* (2019.01); *G06F 16/2282* (2019.01)

(58) Field of Classification Search
CPC ............... G06F 16/219; G06F 16/2282; G06F 17/30569; G06F 17/30339; G06F 17/30336
USPC .......................................... 701/33.4; 707/746
See application file for complete search history.

(56) References Cited

U.S. PATENT DOCUMENTS

| | | | |
|---|---|---|---|
| 6,473,400 B1 * | 10/2002 | Manning | H04L 43/00 370/229 |
| 6,501,479 B1 * | 12/2002 | Root | G06T 1/60 341/67 |
| 8,271,430 B2 | 9/2012 | Willson | |
| 8,688,622 B2 | 4/2014 | Willson | |
| 2016/0005281 A1 * | 1/2016 | Laska | G08B 13/1961 348/143 |

(Continued)

FOREIGN PATENT DOCUMENTS

CN 105260128 A * 1/2016

OTHER PUBLICATIONS

English Translation for CN-105260128-A.*

*Primary Examiner* — Mahmoud S Ismail
(74) *Attorney, Agent, or Firm* — Moore IP Law

(57) ABSTRACT

A method includes obtaining, at a processor, first data associated with operation of a vehicle. The first data includes sensor data from sensor(s) onboard the vehicle and indicates one or more parameter values of a first parameter measured by the sensor(s) and one or more associated timestamps. The method includes determining, by the processor, a first amount of storage space associated with storing a first portion of the first data in accordance with a first storage scheme and a second amount of storage space associated with storing the first portion in accordance with a second storage scheme that is different than the first storage scheme. The method further includes storing the first portion of the first data in a memory in accordance with the first storage scheme based on the first amount of storage space satisfying a first threshold that is based on the second amount of storage space.

29 Claims, 22 Drawing Sheets

(56) References Cited

U.S. PATENT DOCUMENTS

2016/0125053 A1* 5/2016 Willson ............... G06F 16/211
　　　　　　　　　　　　　　　　　　　　　707/746

* cited by examiner

SYSTEM AND METHOD FOR VEHICLE SENSOR DATA STORAGE AND ANALYSIS

FIELD OF THE DISCLOSURE

The present disclosure is generally related to vehicle sensor data storage and analysis.

BACKGROUND

Improvements in technology have led to an increasing number of sensors on board vehicles, such as aircraft, automobiles, ships, drones, rockets, spacecraft, and so forth. These sensors may record data before, during, and after transit of the vehicles. Data recorded from these sensors may be used to analyze vehicle operations for different purposes, such as safety diagnosis, reliability analysis, operation cost reduction, and flight testing. Challenges in such analysis may result due to the large volume of data generated by the sensors.

As a particular example, a Quick Access Recorder (QAR) of an aircraft may record over 1000 parameters with sampling rates ranging from 1/64 Hertz (Hz) to 8 Hz. As a result, for a 3-hour flight, the QAR may generate approximately 10 million samples. As another particular example, a Continuous Parameter Logging (CPL) device of an aircraft may record approximately 2500 parameters with sampling rates ranging from 1 Hz to 10 Hz. As a result, for a 10-hour flight, the CPL may produce approximately half a billion samples. As technology improves, the number of samples generated by sensors on board vehicles may increase to the tens of billions or greater. Storing such large volume of sensor data uses a large memory footprint, which can substantially increase cost of systems on board vehicles. Additionally, processing such large volume of sensor data can take considerable time and use considerable processing resources, thereby decreasing the operational efficiency of at least some systems on board vehicles.

SUMMARY

In a particular implementation, a method includes obtaining, at a processor, first data associated with operation of a vehicle. The first data includes sensor data from one or more sensors onboard the vehicle, and the first data indicates one or more parameter values of a first parameter measured by the one or more sensors and one or more timestamps associated with the one or more parameter values. The method includes determining, by the processor, a first amount of storage space associated with storing a first portion of the first data in accordance with a first storage scheme. The method includes determining, by the processor, a second amount of storage space associated with storing the first portion of the first data in accordance with a second storage scheme that is different than the first storage scheme. The method further includes storing the first portion of the first data in a memory in accordance with the first storage scheme based on the first amount of storage space satisfying a first threshold. The first threshold is based on the second amount of storage space. In some implementations, the method further includes, after storing the first portion of the first data in accordance with the first storage scheme, processing the first portion of the first data from the memory. Processing the first data can include designating an iterator handle to analyze a subset of the first portion of the first data corresponding to a particular time period, as further described herein.

In another particular implementation, a vehicle includes one or more sensors onboard the vehicle and configured to generate sensor data during operation of the vehicle. The sensor data indicates one or more parameter values of at least one operational parameter measured by the one or more sensors and one or more timestamps associated with the one or more parameter values. The vehicle includes a memory. The vehicle further includes a processor coupled to the memory and configured to receive sensor data, to determine a first amount of storage space associated with storing a portion of the sensor data in accordance with a first storage scheme, and to determine a second amount of storage space associated with storing the portion of the sensor data in accordance with a second storage scheme that is different than the first storage scheme. The processor is further configured to store the portion of the sensor data in the memory in accordance with the first storage scheme based on the first amount of storage space satisfying a threshold. The threshold is based on the second amount of storage space.

In another particular implementation, a non-transitory computer-readable medium stores instructions that, when executed by a processor, cause the processor to perform operations including obtaining sensor data associated with operation of a vehicle, wherein the sensor data is generated by one or more sensors onboard the vehicle, wherein the sensor data indicates one or more samples of at least one operational parameter measured by the one or more sensors and one or more timestamps associated with the one or more samples. The operations include determining a first amount of storage space associated with storing a portion of the sensor data in accordance with a first storage scheme. The operations include determining a second amount of storage space associated with storing the portion of the sensor data in accordance with a second storage scheme that is different than the first storage scheme. The operations further include storing the portion of the sensor data in a memory in accordance with the first storage scheme based on the first amount of storage space satisfying a first threshold. The first threshold is based on the second amount of storage space. In some implementations, the operations further include, after the portion of the sensor data is stored in accordance with the first storage scheme, accessing a particular sample of the one or more samples based on an index or a timestamp, as further described herein.

DETAILED DESCRIPTION

Figure 1:
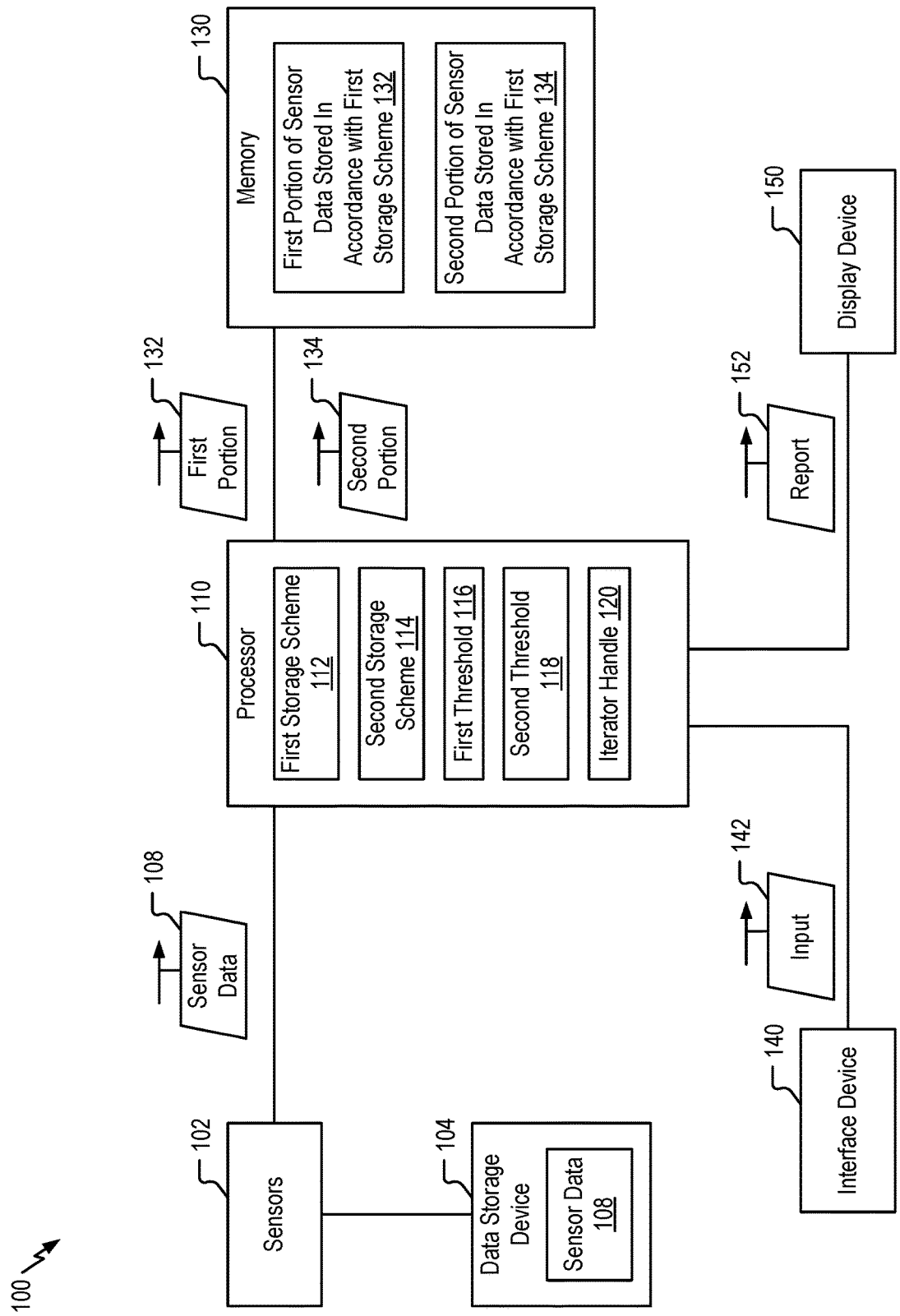
FIG. 1 is a block diagram that illustrates a particular implementation of a system that stores vehicle sensor data in a memory in accordance with one or more storage schemes.

Particular implementations are described with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining", "calculating", "generating", "adjusting", "modifying", etc. may be used to describe how one or more operations are performed. It should be noted that such terms are not to be construed as limiting and other techniques may be utilized to perform similar operations. Additionally, as referred to herein, "generating", "calculating", "using", "selecting", "accessing", and "determining" may be used interchangeably. For example, "generating", "calculating", or "determining" a parameter (or a signal) may refer to actively generating, calculating, or determining the parameter (or the signal) or may refer to using, selecting, or accessing the parameter (or signal) that is already generated, such as by another component or device. Additionally, "adjusting" and "modifying" may be used interchangeably. For example, "adjusting" or "modifying" a parameter may refer to changing the parameter from a first value to a second value (a "modified value" or an "adjusted value"). As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

Implementations disclosed herein enable improved vehicle sensor data storage and analysis. In particular, one or more systems described herein include a vehicle including a plurality of sensors, a processor, and a memory. The plurality of sensors is configured to generate sensor data before, during, and/or after operation of the vehicle. The processor is configured to obtain the sensor data from the plurality of sensors and to determine whether to store the sensor data (or portions thereof) in the memory in accordance with one of multiple storage schemes. In a particular implementation, the multiple storage schemes include a first storage scheme (e.g., a "compact" storage scheme) and a second storage scheme (e.g., a "direct" storage scheme). For sensor data associated with particular behaviors, storage in accordance with the first storage scheme uses less memory than storage in accordance the second storage scheme, as further described herein. Thus, storing at least some portions of the sensor data in the memory in accordance with the first storage scheme may reduce a memory footprint of the stored sensor data.

To illustrate, the processor is configured to determine a first amount of storage space associated with storing a first portion of the sensor data in accordance with the first storage scheme and a second amount of storage space associated with storing the first portion of the sensor data in accordance with the second storage scheme. The processor is further configured to store the first portion of the sensor data in accordance with the first storage scheme based on the first amount of storage space satisfying a threshold. For example, if the first amount of storage space is less than (e.g., satisfies) the threshold, the processor stores the first portion of the sensor data in accordance with the first storage scheme. The threshold is based on the second amount of storage space. For example, the threshold may be equal to the second amount of storage space or to a product of the second amount of storage space and a control parameter that corresponds to an amount of additional time associated with accessing data stored in accordance with the first storage scheme. However, if the first amount of storage space is greater than or equal to the threshold (e.g., fails to satisfy the threshold), the processor stores the first portion of the sensor data in accordance with the second storage scheme. Thus, the processor is able to determine, for one or more portions (e.g., one or more parameters, one or more groups of related parameters, etc.) of the sensor data, the storage scheme that uses less (e.g., fewer) memory resources (e.g., memory and processing time) to store the one or more portions, which reduces the overall memory footprint associated with storing the sensor data in the memory. Although amounts of storage space are described herein as satisfying a threshold if the amount of storage space is less than a threshold, in other implementations, an amount of storage space satisfies a threshold if the amount of storage space is less than or equal to the threshold. In other implementations, an amount of storage space may satisfy a threshold if the amount of storage space is greater than (or greater than or equal to) the threshold, and the opposite operations performed in response to satisfaction of the threshold (e.g., storage in accordance with the second storage scheme if the first amount of storage space satisfies the threshold).

Additionally, at least one implementation of the first storage scheme enables faster accessing time to stored samples than conventional compression schemes. For example, as further described herein, a particular sample of a stored portion of the sensor data may be accessed in O (log k) time as compared to O (log n) time, where n is the total number of samples in the stored portion, and k is the number of "chunks" of samples in the stored portion. Thus, the implementations described herein may reduce the memory footprint associated with storing sensor data as compared to storing uncompressed sensor data and may increase processing speed and decrease processing resources associated with analyzing the stored sensor data.

FIG. 1 illustrates an example of a particular implementation of a system 100 that stores vehicle sensor data in accordance with one or more storage schemes. The system 100 includes one or more sensors 102, a processor 110, a memory 130, an interface device 140, and a display device 150. In a particular implementation, the system 100 is integrated into a vehicle. For example, the system 100 may be integrated in an aircraft, an unmanned aerial vehicle (UAV) (e.g., a drone aircraft), an automobile, a train, a motorcycle, a bus, a ship or boat, a rocket, a spacecraft, an autonomous vehicle, or another vehicle, as illustrative, non-limiting examples. In other implementations, one or more components may be external to the vehicle, such as the processor 110, the memory 130, the interface device 140, the display device 150, or a combination thereof. Although the system 100 is described as being integrated in a vehicle, in other implementations, the system 100 may be integrated in or include a machine, a factory, a building, or a component thereof.

In a particular implementation, the vehicle includes the one or more sensors 102 onboard the vehicle and a data storage device 104. The one or more sensors 102 are configured to generate sensor data 108 during operation of the vehicle. In a particular implementation, the vehicle includes an aircraft, and the one or more sensors 102 are configured to generate the sensor data 108 before, during, and/or after a flight of the aircraft. The one or more sensors 102 may include multiple types of sensors. As illustrative examples, the one or more sensors 102 include a speed sensor, an altitude sensor, a pressure sensor, a control surface sensor (e.g., a flap position indicator), a landing gear position indicator, a fuel flow rate sensor, a powerplant sensor (e.g., an engine revolutions-per-minute (RPM) sensor), other sensors, or a combination thereof.

The sensor data 108 may include values of one or more parameters. To illustrate, the one or more sensors 102 are configured to measure one or more characteristics, either continually or at discrete intervals. The measured values may be referred to as samples, and the measurement rate may be referred to as a sampling rate. As non-limiting examples, the sensor data 108 includes speed values for a speed parameter, altitude values for an altitude parameter, or a combination thereof. As another non-limiting example, for a landing gear position parameter, the values include or correspond to state data that indicates a state of the parameter, such as a landing gear deployed state or a landing gear retracted state. In some implementations, the sensor data 108 generated by the one or more sensors 102 is timestamped. As a particular non-limiting example, the speed sensor assigns each speed value a corresponding time, such as t0, t1, t2, etc. In other implementations, at least a portion of the sensor data 108 is not timestamped when generated by the one or more sensors 102. Sensor data that does not have a timestamp may be timestamped or synchronized by the processor 110 or by another component, such as another processor or a controller of the vehicle.

The data storage device 104 includes or corresponds to a volatile memory, a non-volatile memory, or a combination thereof. In some implementations, the data storage device 104 is configured to store data, such as the sensor data 108. In other implementations, the data storage device 104 may store other data, such as data based on or including the sensor data 108, in addition to or instead of the sensor data 108. The other data may include timestamps, time data, estimated sensor values, a subset of the sensor data 108, or a combination thereof.

The processor 110 is coupled to the one or more sensors 102 and configured to obtain the sensor data 108 from the one or more sensors 102. In a particular implementation, the processor 110 is coupled to the one or more sensors 102 via a network. The network may include a wired network or a wireless network. The network may be configured in accordance with one or more wireless communication protocols, such as an Institute of Electrical and Electronics Engineers (IEEE) protocol, a Wi-Fi Alliance protocol, a Bluetooth® protocol, a Zigbee® protocol, a near-field communication protocol, a cellular protocol, a Long Term Evolution (LTE) protocol, or a combination thereof. Bluetooth is a registered trademark of Bluetooth Special Interest Group (SIG), and Zigbee is a registered trademark of Zigbee Alliance. In another particular implementation, the processor 110 is coupled to an interface (e.g., a bus) of a sensor system of the vehicle. In other implementations, the data storage device 104 may be removed from the vehicle (or from a location within the vehicle) and coupled to the processor 110, or the sensor data 108 may be copied and transferred to the processor 110. In some implementations, the processor 110 is configured to receive additional data from the one or more sensors 102 or the data storage device 104. The additional data may include timestamps, time data, estimated sensor values, a subset of the sensor data 108, data based on the sensor data 108, or a combination thereof. In some implementations, the processor 110 is integrated within the vehicle. In an alternate implementation, the processor 110 is external to and communicatively coupled to the vehicle including the one or more sensors 102.

In some implementations, the processor 110 is configured to remove values or add values to a portion of the sensor data 108 (e.g., particular sensor data corresponding to a particular sensor of the one or more sensors 102) to synchronize the sensor data 108 or to smooth out the sensor data 108. For example, the processor 110 may remove values when sensors have different sampling rates to synchronize a faster sampling rate with a slower sampling rate. As another example, the processor 110 may add estimated values to smooth out the sensor data 108 when a sensor has a slow sampling rate, when the values of the sensor data 108 have large fluctuations, or both. In some implementations, the processor 110 is configured to correct errors in the sensor data 108. For example, the processor 110 may assign a null value (e.g., 0 or 9999) to a parameter value when the parameter value is determined to be incorrect or unreliable. As a particular illustrative example, the processor 110 assigns the null value to a parameter value generated by a malfunctioning sensor or to a value that is determined to be outside of an operating envelope or an unexpected range of values. In alternate implementations, the processor 110 is configured to store the sensor data 108 "as is" (e.g., without performing any additional operations).

The processor 110 is coupled to the memory 130 and is configured to, after obtaining the sensor data 108 from the one or more sensors 102 (or the data storage device 104), store the sensor data 108 in the memory 130 in accordance with one or more storage schemes. In some implementations, the one or more storage schemes includes a first storage scheme 112 and a second storage scheme 114. The processor 110 is configured to determine which storage scheme to use for storing the sensor data 108 (or a portion thereof) based on amounts of storage space used to store the sensor data 108 (or a portion thereof) in the one or more storage schemes, as further described herein. In a particular implementation, the memory 130 is configured to store one or more instructions that, when executed by the processor 110, cause the processor 110 to perform one or more of the operations described herein. Additionally, or alternatively, the memory 130 is configured to store data, such as the sensor data 108, to enable access to and analysis of the data by the processor 110, as further described herein.

In a particular implementation, the first storage scheme 112 includes or corresponds to a "fast compact" storage scheme, and the processor 110 is configured to store the sensor data 108 (or a portion thereof) in accordance with the first storage scheme 112 by storing, in the memory 130, the sensor data 108 (or a portion thereof) as a first data structure. One or more entries of the first data structure include a starting timestamp, an ending timestamp, an accumulative time count, and a parameter value. The fast compact storage scheme is described in further detail with reference to FIG. 2. In another particular implementation, the first storage scheme 112 includes or corresponds to a "split compact" storage scheme, and the processor 110 is configured to store the sensor data 108 (or a portion thereof) in accordance with the first storage scheme 112 by storing, in the memory 130, the sensor data 108 (or a portion thereof) as a second data structure, as a third data structure, or both. One or more entries of the second data structure include a timestamp and an accumulative time count that corresponds to the timestamp, and one or more entries of the third data structure include a parameter value and an accumulative value count that corresponds to the parameter value. The split compact storage scheme is described in further detail with reference to FIG. 3. In some implementations, the second storage scheme 114 includes or corresponds to a "direct" storage scheme, and the processor 110 is configured to store the sensor data 108 (or a portion thereof) in accordance with the second storage scheme 114 by storing, in the memory 130, the sensor data 108 (or a portion thereof) as a fourth data structure. One or more entries of the fourth data structure include a timestamp and a parameter value. The direct storage scheme is described in further detail with reference to FIG. 4.

The interface device 140 is coupled to the processor 110 and is configured to receive one or more user inputs from a user and to provide one or more inputs based on the one or more user inputs to the processor 110. For example, the interface device 140 may include a keyboard, a mouse, a touchscreen, or another type of interface device capable of receiving user input from a user.

The display device 150 is coupled to the processor 110 and configured to display an output based on information from the processor 110. For example, the display device 150 may include a monitor, a touchscreen, a television screen, or another type of display device capable of displaying an output based on information from the processor 110. In a particular implementation, the display device 150 is configured to display a reporting output after the sensor data 108 is stored and analyzed, as further described herein.

Before, during, and/or after operation of the vehicle, the one or more sensors 102 generate the sensor data 108. The sensor data 108 is associated with operation of a vehicle and is generated by the one or more sensors 102 onboard the vehicle. As a particular, non-limiting example, the vehicle includes an aircraft, and the sensor data 108 is generated by sampling measurements of one or more parameters before a flight, during the flight, after the flight, or a combination thereof. In a particular implementation, the sensor data 108 indicates one or more parameter values of a first parameter (e.g., a velocity parameter, an altitude parameter, or another parameter) measured by the one or more sensors 102 and one or more timestamps associated with the one or more parameter values.

The processor 110 obtains the sensor data 108 from the one or more sensors 102 (or the data storage device 104). For example, after the flight is complete or after enough samples have been generated, the processor 110 may obtain the sensor data 108 for storage in the memory 130, for analysis, or for both. After obtaining the sensor data 108, the processor determines one or more storage schemes for use in storing the sensor data 108. In a particular implementation, the one or more storage schemes includes the first storage scheme 112 (e.g., the fast compact storage scheme or the split compact storage scheme) and the second storage scheme 114 (e.g., the direct storage scheme).

At least some of the sensor data 108 is stored in the memory 130 in accordance with one or more of the determined storage schemes. In a particular implementation, an entirety of the sensor data 108 is stored in the memory 130 in accordance with the first storage scheme 112 or in accordance with the second storage scheme 114. In another implementation, a portion (e.g., less than an entirety) of the sensor data 108 is stored in the memory 130 in accordance with the first storage scheme 112 or in accordance with the second storage scheme 114, and a remainder of the sensor data 108 may be stored in a different manner (e.g., uncompressed, as a non-limiting example). In other implementations, the sensor data 108 is divided into portions, and the processor 110 determines which storage scheme to use on a portion-by-portion basis. As non-limiting examples, each portion may include or correspond to a particular amount of the sensor data 108 (e.g., a particular number of samples, a particular number of bytes/kilobytes/megabytes/gigabytes/terabytes of sensor data, etc.), one or more particular parameters (e.g., an elevation parameter, an acceleration parameter, a remaining fuel parameter, a state parameter, etc.), parameters measured by one or more particular sensors (e.g., parameters measured by a temperature sensor, parameters measured by an orientation sensor, parameters measured by a position sensor, parameters measured by an engine sensor, etc.), parameters measured during one or more particular operational phases (e.g., parameters measured during taxi, parameters measured during takeoff, parameters measured during ascent, parameters measured during cruise, parameters measured during descent, parameters measured during landing, etc.), one or more user-selected groupings of the sensor data 108, or a combination thereof. The processor 110 may store different portions of the sensor data 108 in accordance with different storage schemes. The determination of which storage scheme is used is based on an amount of storage space in the memory 130 used by the different storage schemes.

To illustrate, the processor 110 may determine a first amount of storage space associated with storing a first portion 132 of the sensor data 108 in the memory 130 in accordance with the first storage scheme 112. In a particular implementation, the processor 110 estimates the number of entries in one or more data structures that would be used to store the first portion 132 in accordance with the first storage scheme 112, the amount of storage space associated with storing an entry in the one or more data structures, a total amount of storage space (e.g., a product of the number of entries and the amount of storage space associated with an entry), some other estimation of storage space, or a combination thereof. The processor 110 also determines a second amount of storage space associated with storing the first portion 132 in accordance with the second storage scheme 114. In a particular implementation, the processor 110 estimates the number of entries in one or more data structures that would be used to store the first portion 132 in accordance with the second storage scheme 114, the amount of storage space associated with storing an entry in the one or more data structures, a total amount of storage space (e.g., a product of the number of entries and the amount of storage space associated with an entry), some other estimation of storage space, or a combination thereof.

The processor 110 may store the first portion 132 of the sensor data 108 in the memory 130 in accordance with the first storage scheme 112 based on the first amount of storage space satisfying a first threshold 116. In a particular implementation, the first amount of storage space satisfies the first threshold 116 if the first amount of storage space is less than the first threshold 116. In another particular implementation, the first amount of storage space satisfies the first threshold 116 if the first amount of storage space is less than or equal to the first threshold 116. The first threshold 116 is based on the second amount of storage space. In a particular implementation, the first threshold 116 is equal to the second amount of storage space. Alternatively, the first threshold 116 may be based on the second amount of storage space and a control parameter. For example, the first threshold 116 may be equal to the product of the second amount of storage space and a control parameter that corresponds to an amount of additional time associated with accessing data stored in accordance with the first storage scheme 112, as further described herein.

If the first amount of storage space satisfies the first threshold 116, the processor 110 stores the first portion 132 of the sensor data 108 in the memory 130 in accordance with the first storage scheme 112, as illustrated in FIG. 1. However, if the first amount of storage space fails to satisfy the first threshold 116, the processor 110 stores the first portion 132 of the sensor data 108 in the memory 130 in accordance with the second storage scheme 114. After storing the first portion 132 in the memory 130, the processor stores any remaining portions of the sensor data 108. To illustrate, with respect to a second portion 134 of the sensor data 108, the processor 110 determines a third amount of storage space associated with storing the second portion 134 in the memory 130 in accordance with the first storage scheme 112 and a fourth amount of storage space associated with storing the second portion 134 in the memory 130 in accordance with the second storage scheme 114. If the third amount of storage space satisfies a second threshold 118 (e.g., a threshold that is equal to or based on the fourth amount of storage space), the processor 110 stores the second portion 134 of the sensor data 108 in the memory 130 in accordance with the first storage scheme 112. However, if the third amount of storage space fails to satisfy the second threshold 118, the processor 110 stores the second portion 134 of the sensor data 108 in the memory 130 in accordance with the second storage scheme 114, as illustrated in FIG. 1. The processor 110 may store any remaining portions of the sensor data 108 in a similar manner until an entirety of the sensor data 108 is stored in the memory 130. In other implementations, the first portion 132 of the sensor data 108 corresponds to an entirety of the sensor data 108 (e.g., an entirety of the sensor data 108 is stored in accordance with the first storage scheme 112).

After storing the portions of the sensor data 108 in the memory 130, the processor 110 may access the stored portions of the sensor data 108 to perform data analysis based on the sensor data 108. In a particular implementation, the processor 110 processes the first portion 132 of the sensor data 108 by designating an iterator handle 120 configured to analyze a subset of the first portion 132 of the sensor data 108. In a particular implementation, the iterator handle 120 includes or corresponds to an object of an object-oriented programming language, or one or more other instructions that are executable to provide streamlined data analysis of the data stored in the memory 130. The iterator handle 120 is further described with reference to FIGS. 12A and 12B. The iterator handle 120 may be based on input 142 received from the interface device 140. In a particular implementation, the interface device 140 receives a user input that indicates a selected start time and a selected end time, and the interface device 140 generates the input 142 based on the user input. The iterator handle 120 is further configured to identify a starting information chunk of the stored first portion 132 (or a different portion) of the sensor data 108 and an ending information chunk associated with the first portion 132. The starting information chunk corresponds to the selected start time (indicated by the input 142) and the ending information chunk corresponds to the selected end time (indicated by the input 142). Functions associated with the iterator handle 120 are further described with reference to FIGS. 13-15.

In some implementations, after storing the portions of the sensor data 108 in the memory 130, the processor 110 analyzes the stored data to generate one or more outputs. For example, the processor 110 may analyze the stored data for different purposes, such as safety diagnosis, reliability analysis, operation cost reduction, and flight testing, as non-limiting examples. During the analysis, the processor 110 may access one or more samples of the stored data based on one or more indices corresponding to the one or more samples, based on one or more timestamps corresponding to the one or more samples, or both. Accessing samples of the first portion 132 of the sensor data 108 may be faster than accessing the same samples if the first portion 132 was stored uncompressed in the memory 130. In a particular implementation, a particular sample is able to be accessed in O (log k) time as compared to O (log n) time, where k is an integer equal to the total number of informational "chunks" of the first portion 132, and n is an integer equal to the total number of samples of the first portion 132. Accessing samples from the memory 130 is further described with reference to FIGS. 9-11. Additionally or alternatively, in some implementations, the processor 110 generates a report 152 based on the analysis performed on the stored data, and the report 152 is provided to the display device 150 for display to a user.

Thus, the system 100 enables storage of operational parameter data (e.g., the sensor data 108) using less storage space in the memory 130 than other systems that store operational parameter data or other sensor data. For example, if the sensor data 108 corresponds to parameters that do not change very often (or are sampled without many gaps between samples), the sensor data 108 (or portions thereof) is stored in the memory 130 in accordance with the first storage scheme 112, which can substantially reduce the memory footprint associated with storing the sensor data 108. However, in some situations, such as if the sensor data 108 includes parameter values that change frequently (or are sampled with many gaps between samples), storing the sensor data 108 (or portions thereof) in accordance with the first storage scheme 112 may use larger amounts of storage space, and accordingly in these situations, the sensor data 108 (or portions thereof) is stored in the memory 130 in accordance with the second storage scheme 114. In this manner, the system 100 is configured to adaptively store sensor data in a more efficient manner (e.g., using less storage space). Thus, samples of a parameter having unknown characteristics can be stored using less storage space without pre-processing the samples.

Although described as adaptively storing the sensor data 108 in the memory 130, in some implementations, the system 100 may be configured to store an entirety of the sensor data 108 (or a portion thereof) in accordance with a pre-selected storage scheme. For example, if a particular parameter is known to change infrequently, the portion of the sensor data 108 corresponding to the particular parameter is stored in the memory 130 in accordance with the first storage scheme 112 (without estimating the amount of storage space associated with storing the portion). Alternatively, if the particular parameter is known to change frequently, the portion of the sensor data 108 corresponding to the particular parameter is stored in the memory 130 in accordance with the second storage scheme 114 (without estimating the amount of storage space associated with storing the portion). In this manner, the system 100 may store the portion of the sensor data 108 faster (e.g., without estimating amounts of storage space) for particular portions of the sensor data 108 having known or expected characteristics, and the system 100 may adaptively determine which storage scheme to use for portions of the sensor data 108 that corresponds to parameters having unknown characteristics. By selectively storing portions of the sensor data 108 in accordance with the first storage scheme 112 (and the second storage scheme 114), the system 100 reduces a memory footprint associated with storage of the sensor data 108 in the memory 130. Additionally, as further described herein, at least some implementations of the first storage scheme 112 enable faster accessing of stored samples, thereby improving speed and decreasing processing resources associated with analyzing stored sensor data, as compared to other systems that store uncompressed sensor data.

Figure 2:
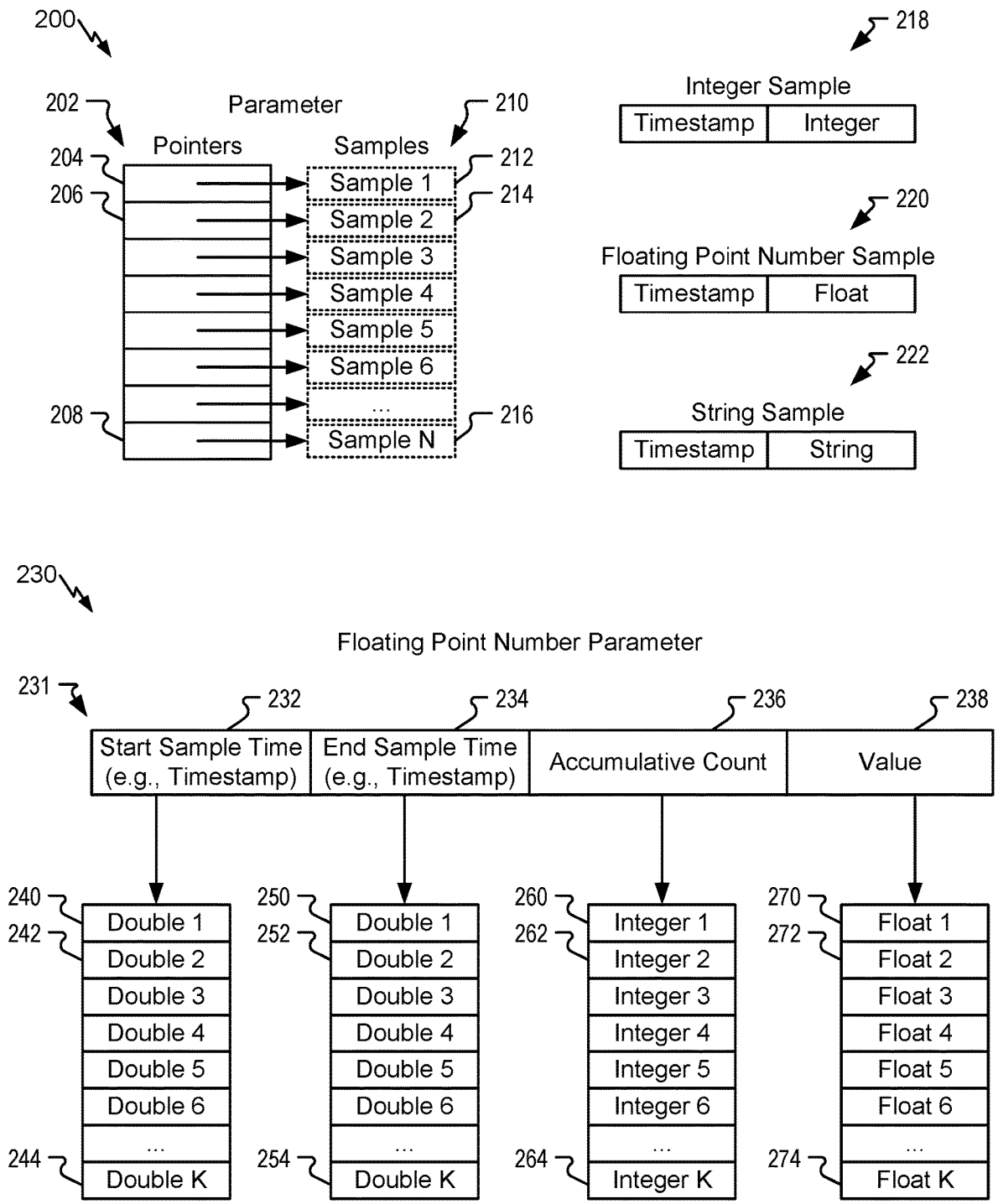
FIG. 2 illustrates a first example of a first storage scheme for storing sensor data from a vehicle.

FIG. 2 illustrates a first example a first storage scheme for storing sensor data from a vehicle. FIG. 2 illustrates an example of a "simple" (e.g., uncompressed) storage scheme 200 and a first example a first storage scheme. The first example of the first storage scheme may be referred to as a "fast compact" storage scheme 230. In a particular implementation, the fast compact storage scheme 230 includes or corresponds to the first storage scheme 112 of FIG. 1.

The simple storage scheme 200 represents a conventional technique for storing a single parameter of flight sensor data. For example, during operation of a vehicle, sensors (e.g., the one or more sensors 102 of FIG. 1) may record N samples of a parameter as sensor data, where N is any integer greater than zero. In the simple storage scheme 200, the sensor data (e.g., the samples) corresponding to the parameter is stored in a memory (such as the memory 130 of FIG. 1) by storing each sample (e.g., each combination of timestamp and sample value) in the memory in addition to storing a data structure 202. In a particular implementation, the data structure 202 includes an array of pointers, and each pointer of the array points to a single sample. To illustrate, the data structure 202 includes a first pointer 204 that points to a first sample 212, a second pointer 206 that points to a second sample 214, and an Nth pointer 208 that points to an Nth sample 216. Although seven entries are illustrated in FIG. 2, in other implementations, the data structure 202 includes fewer than seven or more than seven entries.

One or more samples include a timestamp (or time field) and a corresponding sample value (e.g., parameter value) field. In some implementations, the timestamp indicates a time at which the corresponding sample value is sampled (e.g., measured or recorded, such as by the one or more sensors 102 of FIG. 1). In a particular implementation, the timestamp stores a relative time from a fixed origin time using a single number and assuming a given time zone. For example, a double precision floating point number having a value 3662.3 may represent the number of seconds since 1970/01/01 in the GMT time zone, which corresponds to the time 1970/01/01 01:01:02.3 GMT.

The sample value field indicates a value of the parameter at a time indicated by the timestamp. Each parameter may be a particular type (e.g., integer, floating point number value, string, etc.), and thus each sample value may be a particular type. As an illustrative example, the parameter is an integer parameter, and each of the samples 212-216 is an integer sample, such as illustrative integer sample 218 that includes a timestamp and an integer sample value. As another example, the parameter is a floating point number parameter, and each of the samples 212-216 is a floating point number sample, such as illustrative floating point number sample 220 that includes a timestamp and a floating point number sample value. As another example, the parameter is a string parameter, and each of the samples 212-216 is a string sample, such as illustrative string sample 222 that includes a timestamp and a string sample value.

The simple storage scheme 200 is generic for different types of parameters and enables common processing logic for different types of parameters. However, each pointer is a four-byte value (in 32-bit computing systems) or an eight-byte value (in 64-bit computing systems), thus, the amount of storage space used to store the sensor data in accordance with the simple storage scheme 200 is the amount of storage space associated with storing each sample plus the amount of storage space associated with storing N four-byte (or eight-byte) values. In some implementations, additional bookkeeping space overhead is also needed, which further increases the amount of storage space used. As a particular example, if each pointer is an eight-byte value, each timestamp eight-byte floating point number value, and each sample value is a four-byte floating point number, storing one billion samples in accordance with the simple storage scheme 200 uses at least 20 gigabytes (GB) of memory. Additionally, allocating each pointer and following each pointer to a corresponding memory location to extract a value requires significant processing time. Thus, the simple storage scheme 200 of conventional systems may associated with large memory footprint and slow processing times.

One technique for decreasing the amount of storage space used to store the sensor data is to store samples according to the direct storage scheme, as further described with reference to FIG. 4. Another technique for decreasing the amount of storage space used to store the sensor data is to group continuous samples having the same inter-sample time span and the same value as "chunks." For example, the sensor data may be stored as a data structure where one or more entries include a starting timestamp, an ending timestamp, a count (e.g., a total number of samples in the chunk), and a sample value. This storage scheme may be referred to as a "simple compact" storage scheme, and an example of storing samples in accordance with the simple compact storage scheme is shown below in Table 1.

TABLE 1

| Start | End | Count | Value |
|---|---|---|---|
| 1.5 | 10.5 | 10 | 3 |
| 11.5 | 25.5 | 15 | 7 |
| 27.0 | 30.0 | 4 | 7 |
| ... | ... | ... | ... |
| 7200.5 | 7210.5 | 11 | 6 |
| 7212.0 | 7220.0 | 2 | 4 |

Table 1 includes 5 chunks: a first chunk with a starting timestamp of 1.5, a second chunk with a starting timestamp of 11.5, a third chunk with a starting timestamp of 27.0, a fourth chunk with a starting timestamp of 7200.5, and a fifth chunk with a starting timestamp of 7212.0. In the particular example of Table 1, the samples corresponding to the first four chunks are sampled at a rate of 1 hertz (Hz), and the samples corresponding to the fifth chunk are sampled at ⅛ Hz. To illustrate, the first chunk corresponds to 10 samples that are sampled at a rate of 1 Hz starting at a start time of 1.5 and that each have the same parameter value 3. To further illustrate, the first chunk corresponds to a first sample recorded at time 2.5 and having a sample value of 3, a second sample recorded at time 3.5 and having a sample value of 3, a third sample recorded at time 4.5 and having a sample value of 3, a fourth sample recorded at time 5.5 and having a sample value of 3, a fifth sample recorded at time 6.5 and having a sample value of 3, a sixth sample recorded at time 7.5 and having a sample value of 3, a seventh sample recorded at time 8.5 and having a sample value of 3, an eighth sample recorded at time 9.5 and having a sample value of 3, a ninth sample recorded at time 10.5 and having a sample value of 3, and a tenth sample recorded at time 11.5 and having a sample value of 3. The second chunk corresponds to 15 samples that are sampled at rate of 1 Hz starting at a start time of 11.5 and that each have the same sample value of 7. There is a 0.5 second gap between the second chunk and the third chunk (e.g., the last sample of the second chunk has a timestamp of 26.5 and the start time of the third chunk is 27.0). Similarly, there is a 0.5 gap between the fourth chunk and the fifth chunk. The fifth chunk is sampled at the different rate of ⅛ Hz (e.g., the fifth chunk corresponds to two samples having a sample value of 4 and timestamps of 7220.0 and 7228.0).

Figure 4:
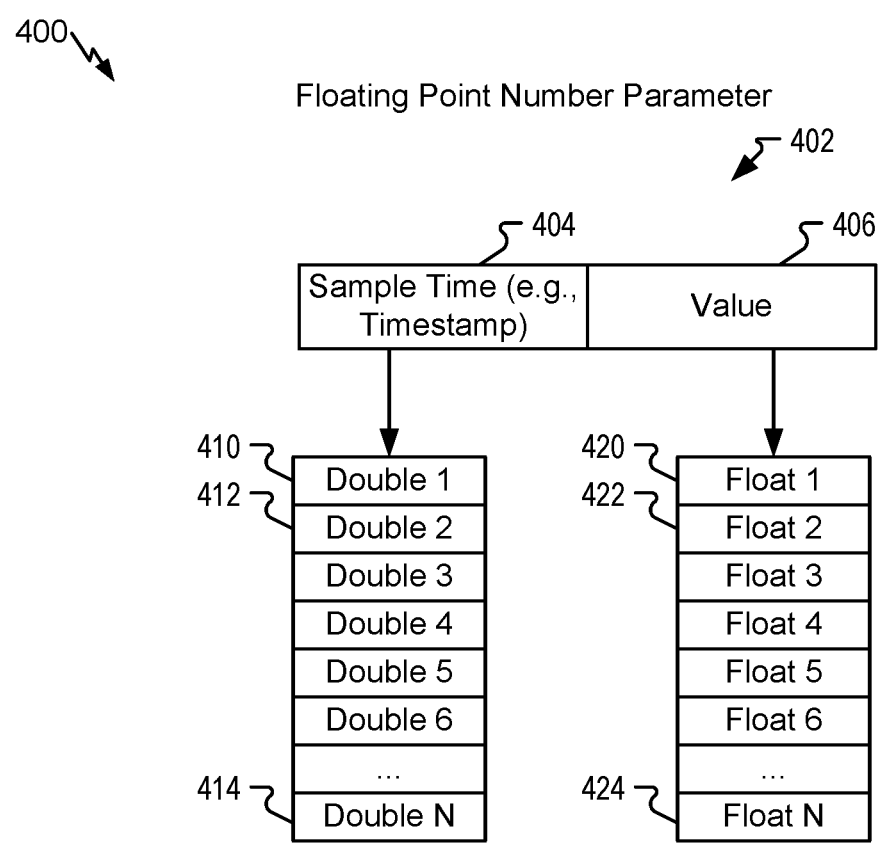
FIG. 4 illustrates examples of a second storage scheme for storing sensor data from a vehicle.

Storing sensor data in accordance with the simple compact storage scheme can reduce the amount of storage space used to store the sensor data as compared to the simple storage scheme 200 (and the direct storage scheme 400 of FIG. 4). However, accessing a sample by index may be computationally expensive. To illustrate, if the indexed sample is one of the last stored samples, the processor may access all of the samples while searching for the indexed sample. Thus, accessing a sample by index has a speed of O(N), where N is the total number of samples that are stored. Because N can range from a few thousand to a few million, depending on flight length and sampling rate, the simple compact storage scheme is associated with significant processing times.

The fast compact storage scheme 230 provides improvements over the simple storage scheme 200 and the simple compact storage scheme of Table 1. FIG. 2 illustrates the fast compact storage scheme 230 for a floating point number parameter. In other implementations, the fast compact storage scheme 230 can be used to store sensor data corresponding to other types of parameters, such as integers, strings, etc.

As illustrated in FIG. 2, storing sensor data (e.g., the sensor data 108 of FIG. 1, or a portion thereof) in accordance with the fast compact storage scheme 230 includes storing a first data structure 231 in a memory (e.g., the memory 130 of FIG. 1). The first data structure 231 includes an array, a list, a linked list, a stack, a queue, or a combination thereof, as non-limiting examples. In a particular implementation, the first data structure 231 includes an array, and one or more entries of the array include four fields. In this implementation, a single pointer is allocated and points to the first data structure. In other implementations, the entries of the first data structure 231 is a data structure. As a particular example, the first data structure 231 corresponds to four data structures: a first data structure (e.g., a first array) that corresponds to a first field, a second data structure (e.g., a second array) that corresponds to a second field, a third data structure (e.g., a third data array) that corresponds to a third field, and a fourth data structure (e.g., a fourth array) that corresponds to a fourth field. In this example, four pointers are allocated, and each pointer points to one of the four data structures.

In a particular implementation, the first data structure 231 includes K entries (where K is any integer greater than zero), and one or more entries of the first data structure 231 include a start sample time field 232 (e.g., a starting timestamp), an end sample time field 234 (e.g., an ending timestamp), an accumulative count field 236, and a value field 238. The one or more entries are associated with a particular sampling rate, and the sampling rates associated with one entry may be the same or different than sampling rates associated with other entries. Each of the one or more entries corresponds to a "chunk" (e.g., a grouping) of one or more consecutive samples having the same parameter value (e.g., sample value) and being sampled at the same sampling rate. For example, a chunk that is associated with the sampling rate of X and that has a parameter value of Y may include a first sample having a timestamp of t and a parameter value of Y, a second sample having a timestamp of t+X and a parameter value of Y, a third sample having a timestamp of t+2X and a parameter value of Y, etc. In a particular implementation, each starting timestamp includes a double value, each ending timestamp includes a double value, each accumulative count value includes an integer value, and each parameter value includes a floating point number value. In other implementations, the fields 232-238 include other types of values.

In the particular implementation illustrated in FIG. 2, the first data structure 231 includes a first entry (including a first starting timestamp 240, a first ending timestamp 250, a first accumulative count 260, and a first parameter value 270), a second entry (including a second starting timestamp 242, a second ending timestamp 252, a second accumulative count 262, and a second parameter value 272), and a Kth entry (including a Kth starting timestamp 244, a Kth ending timestamp 254, a Kth accumulative count 264, and a Kth parameter value 274), where K any integer greater than zero. Although seven entries are illustrated in FIG. 2, in other implementations, the first data structure 231 includes fewer than seven entries or more than seven entries. In some implementations, the entries of the first data structure 231 are sorted in ascending order by accumulative count. One or more of the starting timestamps 240-244 indicate a starting time corresponding to the first sample of the chunk, one or more of the ending timestamps 250-254 indicate a starting time corresponding to the last sample of the chunk, one or more of the accumulative count values 260-264 equal the sum of the total number of samples in the chunk and accumulative count value of the previous chunk, and one or more of the parameter values 270-274 indicate the parameter value (e.g., the sample value) of the samples in the chunk. To illustrate, the first accumulative count 260 of the first chunk (e.g., the first entry) is based on a total number of samples that correspond to the first chunk, and the second accumulative count 262 of the second chunk (e.g., the second entry) is based on a total number of samples that correspond to the second chunk and the first accumulative count 260. For example, a first chunk may include or correspond to 10 samples and have an accumulative count of 10, and a second chunk that is subsequent to the first chunk may include or correspond to 5 samples and have an accumulative count of 15. In this manner, the number of samples that are included in a particular chunk can be determined by subtracting the accumulative count of the previous chunk from the accumulative count of the particular chunk.

The starting timestamp and the ending timestamp correspond to a start time of sampling associated with the first sample of the chunk and the last sample of the chunk, respectively, and not to the timestamp of the first sample or the timestamp of the last sample. As a particular example, a first chunk that includes three samples has a starting timestamp of 1.5, an ending timestamp 4.5, and is associated with a sampling rate of 1 Hz. In this example, the first chunk includes a first sample associated with a start time of 1.5, a second sample associated with a start time of 2.5, and a third sample associated with a start time of 3.5. However, the first sample has a timestamp of 2.5 (e.g., the first sample is measured or determined at 2.5 seconds), the second sample has a timestamp of 3.5 (e.g., the second sample is measured or determined at 3.5 seconds), and the third sample has a timestamp of 4.5 (e.g., the third sample is measured or determined at 4.5 seconds). Thus, as used herein, a starting timestamp of a chunk and an ending timestamp of a chunk indicate the start times associated with a first sample of the chunk and a last sample of the chunk, respectively, and the timestamps of the first sample and the last sample indicate the times at which the first sample and the last sample are measured or determined, which is based on the respective start time and the sampling rate. In some implementations, the start times of one or more samples are received from the sensors (e.g., the one or more sensors 102 of FIG. 1), and the timestamps of the one or more samples are determined by a processor (e.g., the processor 110 of FIG. 1). In some implementations, the timestamps are received from the sensors, and the start times are determined by the processor. In other implementations, the start times and the timestamps are received from the sensors.

In a particular example, the sensor data of Table 1 is stored in accordance with the fast compact storage scheme 230, as shown below in Table 2.

TABLE 2

| Start | End | Acc. Count | Value |
|---|---|---|---|
| 1.5 | 10.5 | 10 | 3 |
| 11.5 | 25.5 | 25 | 7 |
| 27.0 | 30.0 | 30 | 7 |
| . . . | . . . | . . . | . . . |
| 7200.5 | 7210.5 | 7010 | 6 |
| 7212.0 | 7220.0 | 7012 | 4 |

Table 2 includes 5 entries (e.g., corresponding to 5 chunks). The second chunk and the third chunk are stored as separate chunks even though all of the samples in both chunks have the same parameter value due to the 0.5 second gap between the start time of the third chunk (27.0) and the start time of a next sample of the second chunk (26.5). Each of the first four chunks is associated with the same sampling rate, as the ratio of the chunk time period (e.g., the difference between the corresponding ending timestamp and the corresponding starting timestamp) to the number of samples in the chunk is the same for the first four chunks. The fifth chunk is associated with a different sampling rate (e.g., ⅛ Hz as compared to 1 Hz), and accordingly, the above-described ratio is different for the fifth chunk than for the first four chunks.

The fast compact storage scheme 230 reduces the amount of storage space used to store sensor data. Instead of storing each sample (as is done in accordance with the simple storage scheme 200), only a starting timestamp and an ending timestamp are stored for each chunk. As long as many chunks include more than two samples, the fast compact storage scheme 230 reduces the amount of storage space used to store sensor data as compared to the simple storage scheme 200. Thus, sensor data may be stored using a smaller memory footprint, which may reduce the cost of systems that store the sensor data. Additionally, sensor data that is stored in accordance with the fast compact storage scheme 230 may be accessed faster by index value than sensor data stored in accordance with the compact storage scheme of Table 1. To illustrate, because entries in the first data structure 231 are sorted in ascending order of accumulative counts, a binary search may be performed on the accumulative count values to identify the chunk containing an indexed sample in O (log K) time, where K is the number of entries (e.g., chunks), and the relative position within the chunk is determined by a simple subtraction operation (e.g., subtracting the accumulative count of the previous entry from the index of the sample being searched). Because O (log K) is faster than O (N), where N is the number of samples that are stored, the fast compact storage scheme 230 enables increased processing speeds and uses reduced processing resources as compared to the compact storage scheme of Table 1. However, sensor data with constantly changing parameter values (e.g., altitude data, position data, speed data, acceleration data, etc.) may result in increased memory footprints when stored in accordance with the fast compact storage scheme 230. To reduce the memory footprint associated with storing such values, a split compact storage scheme may be used, as described with reference to FIG. 3.

Figure 3:
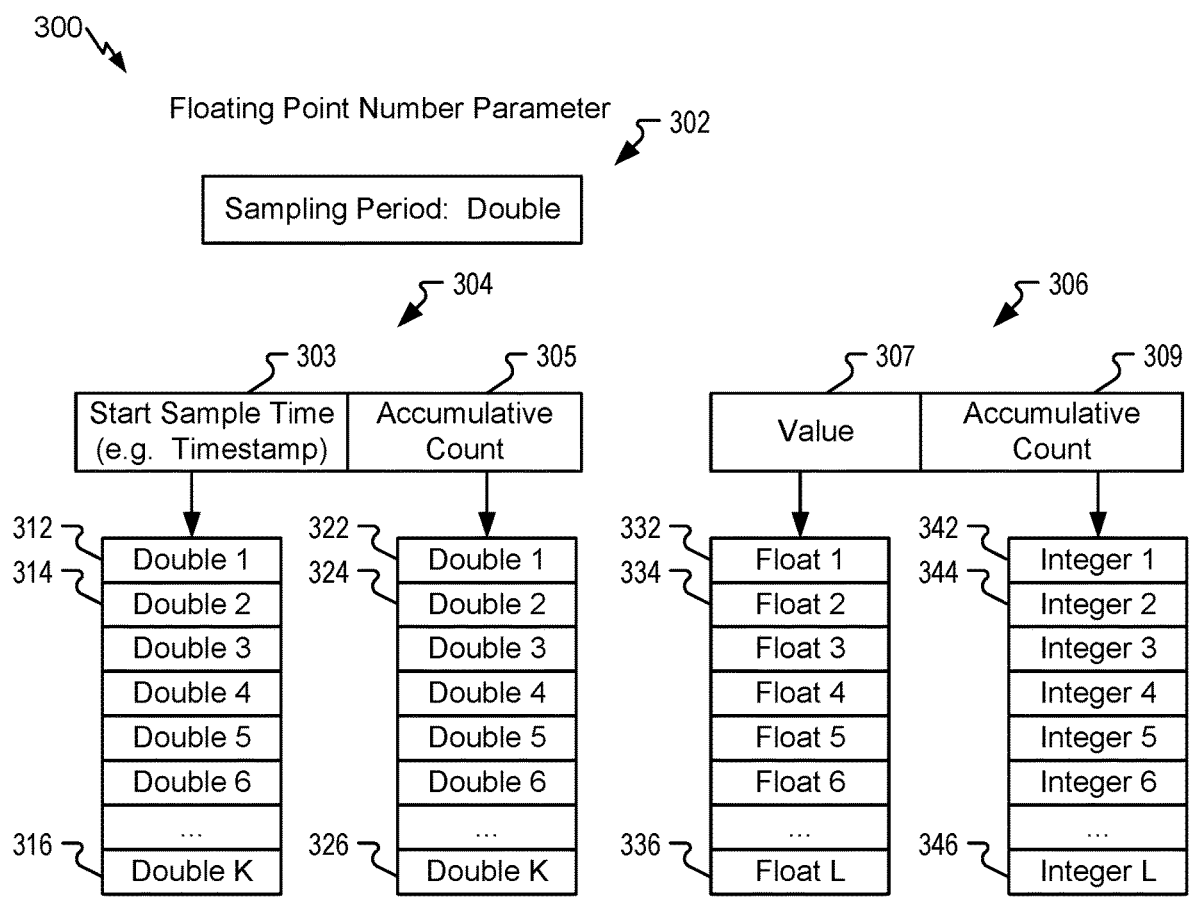
FIG. 3 illustrates a second example of the first storage scheme for storing sensor data from a vehicle.

FIG. 3 illustrates a second example a first storage scheme for storing sensor data from a vehicle. The second example of the first storage scheme may be referred to as a "split compact" storage scheme 300. In a particular implementation, the split compact storage scheme 300 includes or corresponds to the first storage scheme 112 of FIG. 1.

FIG. 3 illustrates the split compact storage scheme 300 for a floating point number parameter. In other implementations, the split compact storage scheme 300 can be used to store sensor data corresponding to other types of parameters, such as integers, strings, etc. The split compact storage scheme 300 is associated with a dominating sampling rate 302 that is a single value that indicates the dominant inter-sample time span. In a particular implementation, the dominating sampling rate 302 is a double value (e.g., a value having double precision).

As illustrated in FIG. 3, storing sensor data (e.g., the sensor data 108 of FIG. 1, or a portion thereof) in accordance the split compact storage scheme 300 includes storing, in a memory (e.g., the memory 130 of FIG. 1), a second data structure 304, a third data structure 306, or both. The data structures 304, 306 include arrays, lists, linked lists, stacks, queues, or a combination thereof, as non-limiting examples. In a particular implementation, the second data structure 304 includes an array, where one or more entries of the array includes two fields, and the third data structure 306 includes an array, where one or more entries of the array includes two fields. In this implementation, two pointers are allocated: a first pointer that points to the second data structure 304 and a second pointer that points to the third data structure 306. In other implementations, each entry of the data structures 304, 306 is a data structure. As a particular example, the second data structure 304 corresponds to a pair of data structures: includes a first data structure (e.g., a first array) that corresponds to a first field and a second data structure (e.g., a second array) that corresponds to a second field. In this example, the third data structure 306 also corresponds to a pair of data structures: a third data structure (e.g., a third array) that corresponds to a first field and a fourth data structure (e.g., a fourth array) that corresponds to a second field. In this example, four pointers are allocated, and one of the four pointers points to each of the four data structures.

In a particular implementation, the second data structure 304 includes K entries (where K is any integer greater than zero), and one or more of the K entries of the second data structure 304 include a start sample time field 303 (e.g., a starting timestamp) and an accumulative time count field 305. In a particular implementation, the third data structure 306 includes L entries (where L is any integer greater than zero), and one or more of the L entries of the third data structure 306 include a parameter value field 307 and an accumulative value count field 309. One or more of the K entries of the second data structure 304 corresponds to a "chunk" (e.g., a grouping) of one or more consecutive samples (two samples are "consecutive" if the difference between the starting time of the second sample and the starting time of the first sample is equal to the dominating sampling rate 302). Samples corresponding to a single entry (e.g., a single chunk) of the second data structure 304 may have different parameter values. One or more of the L entries of the third data structure 306 corresponds to a "chunk" (e.g., a grouping) of one or more consecutive samples having the same parameter value (e.g., sample value).

In the particular implementation illustrated in FIG. 3, the second data structure 304 includes a first entry (including a first starting timestamp 312 and a first accumulative time count 322), a second entry (including a second starting timestamp 314 and a second accumulative time count 324), and a Kth entry (including a Kth starting timestamp 316 and a Kth accumulative time count 326), where K any integer greater than zero. In a particular implementation, each starting timestamp includes a double value and each accumulative time count includes a double value. In other implementations, the fields 303, 305 include other types of values. Although seven entries are illustrated in FIG. 3, in other implementations, the second data structure 304 includes fewer than seven entries or more than seven entries. In some implementations, the entries of the second data structure 304 are sorted in ascending order by accumulative time count. One or more of the starting timestamps 312-316 indicate a starting time corresponding to the first sample of the chunk, and one or more of the accumulative time counts 322-326 equal the sum of the total number of samples in the chunk and accumulative time count of the previous chunk. In this manner, the number of samples that are included in a particular chunk can be determined by subtracting the accumulative time count of the previous chunk from the accumulative time count of the particular chunk. For example, the second accumulative time count 324 is equal to a sum of the first accumulative time count 322 and a number of consecutive samples that are associated with a time period beginning at a time of the second starting timestamp 314.

In the particular implementation illustrated in FIG. 3, the third data structure 306 includes a first entry (including a first parameter value 332 and a first accumulative value count 342), a second entry (including a second parameter value 334 and a second accumulative value count 344), and a Lth entry (including a Lth parameter value 336 and a Lth accumulative value count 346), where L any integer greater than zero. L may be equal to or different than K. In a particular implementation, each parameter value includes a floating point number value and each accumulative value count includes an integer value. In other implementations, the fields 307-309 include other types of values. Although seven entries are illustrated in FIG. 3, in other implementations, the third data structure 306 includes fewer than seven entries or more than seven entries. In some implementations, the entries of the third data structure 306 are sorted in ascending order by accumulative value count. One or more of the parameter values 332-336 indicate a common parameter value of the samples of the chunk, and one or more of the accumulative value counts 342-346 equal the sum of the total number of samples in the chunk and accumulative value count of the previous chunk. In this manner, the number of samples that are included in a particular chunk can be determined by subtracting the accumulative value count of the previous chunk from the accumulative value count of the particular chunk. For example, the second accumulative value count 344 is equal to a sum of the first accumulative value count 342 and a number of consecutive samples that have the second parameter value 334.

Storage of sensor data in accordance with the split compact storage scheme 300 may include storage of the second data structure 304, storage of the third data structure 306, or both. As a particular example, time information can be stored as the second data structure 304, and parameter value information can be stored in accordance with the direct storage method, as described with reference to FIG. 4. As another example, parameter value information can be stored as the third data structure 306, and time information can be stored in accordance with the direct storage method, as described with reference to FIG. 4. As another example, time information can be stored as the second data structure 304, and parameter value information can be stored as the third data structure 306. The determination for storing each type of information may be static (e.g., preprogrammed) or dynamic (as further described herein).

As a particular example, the sensor data of Tables 1 and 2 is stored in accordance with the split compact method 300 as shown below in Tables 3 and 4. Table 3 shows storage of time chunks as entries in the second data structure 304, and Table 4 shows storage of parameter value chunks as entries in the third data structure 306.

TABLE 3

| Start | Acc. Time Count |
|---|---|
| 1.5 | 25 |
| 27.0 | 29 |
| . . . | . . . |
| 7200.5 | 7010 |
| 7212.0 | 7011 |
| 7220.0 | 7012 |

TABLE 4

| Value | Acc. Value Count |
|---|---|
| 3 | 10 |
| 7 | 29 |
| . . . | . . . |
| 6 | 7010 |
| 4 | 7012 |

Table 3 shows time chunks corresponding to samples of a parameter, and Table 4 shows parameter value chunks corresponding to the same samples of the parameter. The time chunks and the parameter value chunks may be separate from each other. For example, some of the samples that are included in the second parameter value chunk of Table 4 are included in the first time chunk of Table 3, and others of the samples that are included in the second parameter value chunk of Table 4 are included in the second time chunk of Table 3. Additionally, the last chunk of Table 1 and Table 2 is split into two different time chunks because the sampling period is different than the dominating sampling period (e.g., the sampling period of ⅛ Hz is different than the dominating sampling period of 1 Hz).

The split compact storage scheme 300 reduces the amount of storage space used to store sensor data as compared to the fast compact storage scheme 230 of FIG. 2. For example, replacing the ending timestamp with the accumulative time count may reduce the amount of storage space used to store the sensor data by approximately 25%. Additionally, for a parameter that has varying parameter values over time, such as a speed parameter or an acceleration parameter, storing time information using the second data structure 304 may reduce storage space used by approximately ⅔. Additionally, the split compact storage scheme 300 enables the same performance benefits as the fast compact storage scheme 230 of FIG. 2. However, for parameters that have highly varying parameter values, the split compact storage scheme may use larger amounts of storage space than the simple storage scheme 200 of FIG. 2. For these parameters, storage according to a direct storage scheme is more efficient.

FIG. 4 illustrates examples a second storage scheme for storing sensor data from a vehicle. The second storage scheme may be referred to as a "direct" storage scheme 400. In a particular implementation, the direct storage scheme includes or corresponds to the second storage scheme 114 of FIG. 1. FIG. 4 illustrates the direct storage scheme 400 for a floating point number parameter. In other implementations, the direct storage scheme 400 can be used to store sensor data corresponding to other types of parameters, such as integers, strings, etc.

As illustrated in FIG. 4, storing sensor data (e.g., the sensor data 108 of FIG. 1, or a portion thereof) in accordance the direct storage scheme 400 includes storing a fourth data structure 402 in a memory (e.g., the memory 130 of FIG. 1). The fourth data structure 402 includes an array, a list, a linked list, a stack, a queue, or a combination thereof, as non-limiting examples. In a particular implementation, the fourth data structure 402 includes an array, and one or more entries of the array includes two fields. In this implementation, a single pointer is allocated and points to the fourth data structure 402. In other implementations, one or more entries of the fourth data structure 402 is a data structure. As a particular example, the fourth data structure 402 corresponds to a pair of data structures: a first data structure (e.g., a first array) that corresponds to a first field and a second data structure (e.g., a second array) that corresponds to a second field. In this example, two pointers are allocated, and the two pointers point to the two data structures.

In a particular implementation, the fourth data structure 402 includes N entries (where N is any integer greater than zero), and one or more of the N entries of the fourth data structure 402 includes a sample time field 404 (e.g., a timestamp) and a parameter value field 406. The timestamps indicate a time at which the corresponding parameter value is determined (from a fixed time origin). In a particular implementation, each timestamp includes a double value and each parameter value includes a floating point number value. In other implementations, the fields 404-406 include other types of values.

In the particular implementation illustrated in FIG. 4, the fourth data structure 402 includes a first entry (including a first timestamp 410 and a first parameter value 420), a second entry (including a second timestamp 412 and a second parameter value 422), and an Nth entry (including an Nth timestamp 414 and an Nth parameter value 424), where N any integer greater than zero. Although seven entries are illustrated in FIG. 4, in other implementations, the fourth data structure 402 includes fewer than seven entries or more than seven entries. In some implementations, the entries of the fourth data structure 402 are sorted in ascending order by timestamp.

Time information, parameter value information, or both, can be stored in accordance with the direct storage scheme 400, similar to the split compact storage scheme 300 of FIG. 3. As a particular example, the time information can be stored in accordance with the direct storage scheme 400 and the parameter value information can be stored in accordance with the split compact storage scheme 300 of FIG. 3. As another example, the time information can be stored in accordance with the split compact storage scheme 300 of FIG. 3 and the parameter value information can be stored in accordance with the direct storage scheme 400. As another example, the time information and the parameter value information can be stored in accordance with the direct storage scheme 400.

The direct storage scheme 400 reduces the amount of storage space used to store sensor data as compared to the simple storage scheme 200 of FIG. 2. For example, only one or two pointers are allocated (e.g., for the array of timestamps, the array of parameter values, or both) instead of allocating a pointer for each sample. To illustrate, storing tens of millions of samples in accordance with the direct storage scheme 400 may use 12 GB of memory, as compared to 20 GB if the samples are stored in accordance with the simple storage scheme 200 of FIG. 2. Additionally, for a parameter associated with high variability of sampling rate or high variability of parameter value, the direct storage scheme 400 reduces the amount of storage space used as compared to the fast compact storage scheme 230 of FIG. 2 or the split compact storage scheme 300 of FIG. 3 (e.g., multiple timestamps and/or accumulative values are not stored). Additionally, an indexed sample may be accessed from data stored in accordance with the direct storage scheme 400 in O (1) time (e.g., by determining whether the index corresponds to an entry in the fourth data structure 402). However, if a parameter does not change parameter values at nearly every sample, storing the parameter in accordance with the fast compact storage scheme 230 of FIG. 2 or the split compact storage scheme 300 of FIG. 3 may use less storage space.

In some implementations, the split compact storage scheme 300 of FIG. 3 reduces the amount of memory used to store flight sensor data by 10 times or more, with little or no computation time overhead when accessing a single stored sample. Additionally, a reduction in computation time overhead when accessing a large number of stored samples may be enabled, as further described herein. Additionally, storing sample times (e.g., timestamps) separately from parameter values decouples the sample time (e.g., timestamp) storage from the parameter value storage, thereby enabling each type of information to be stored using whichever storage scheme is more efficient. The direct storage scheme 400 of FIG. 4 stores time samples, parameter values, or both, in a computationally efficient manner.

The compact sample time storage format leverages the insight that parameters are often sampled at fixed rates in flight sensor data. As a result, the compact time storage format stores time points as a list of chunks (e.g., as an array in which one or more entries include a timestamp field and an accumulative time count field, or as individual arrays for the timestamps and the accumulative time counts). The compact parameter value storage format leverages the insight that many parameters in flight sensor data do not frequently change parameter values (e.g., sample values). As a result, the compact parameter value storage format stores parameter values as a list of chunks (e.g., as an array in which one or more entries include a parameter value field and an accumulative value count field, or as individual arrays for the parameter values and the accumulative value counts).

FIGS. 5-15 describe methods that are performed in accordance with an adaptive storing system. To illustrate, the methods describe operations performed to store sensor data, on a parameter-level granularity, in accordance with the split compact storage scheme 300 of FIG. 3 or the direct storage scheme 400 of FIG. 4. For example, sensor data corresponding to a first parameter may be stored in accordance with the split compact storage scheme 300 of FIG. 3, and sensor data corresponding to a second parameter may be stored in accordance with the direct storage scheme 400 of FIG. 4. In other implementations, the sensor data is stored by other levels of granularity, such as by types of parameters, by sensor (or group of sensors), by operational phase, etc. Additionally, although compact storage is described with reference to the split compact storage scheme 300 of FIG. 3, in other implementations, sensor data that is selected for compact storage is stored in accordance with the fast compact storage scheme 230 of FIG. 2. Although adaptive selection of storage schemes for sensor data is described with reference to FIGS. 5-15, in other implementations, sensor data is partitioned and designated for storage using various storage schemes in a fixed manner. For example, a processor may be configured to select a storage scheme to be used to store a portion of sensor data prior to receiving the portion of sensor data. In this example, the selection may be based on estimated sample values, estimated sample rates, previous sensor data (e.g., sensor data of the parameter from a previous flight), availability of storage space or processing resources, user input, or a combination thereof.

Figure 5:
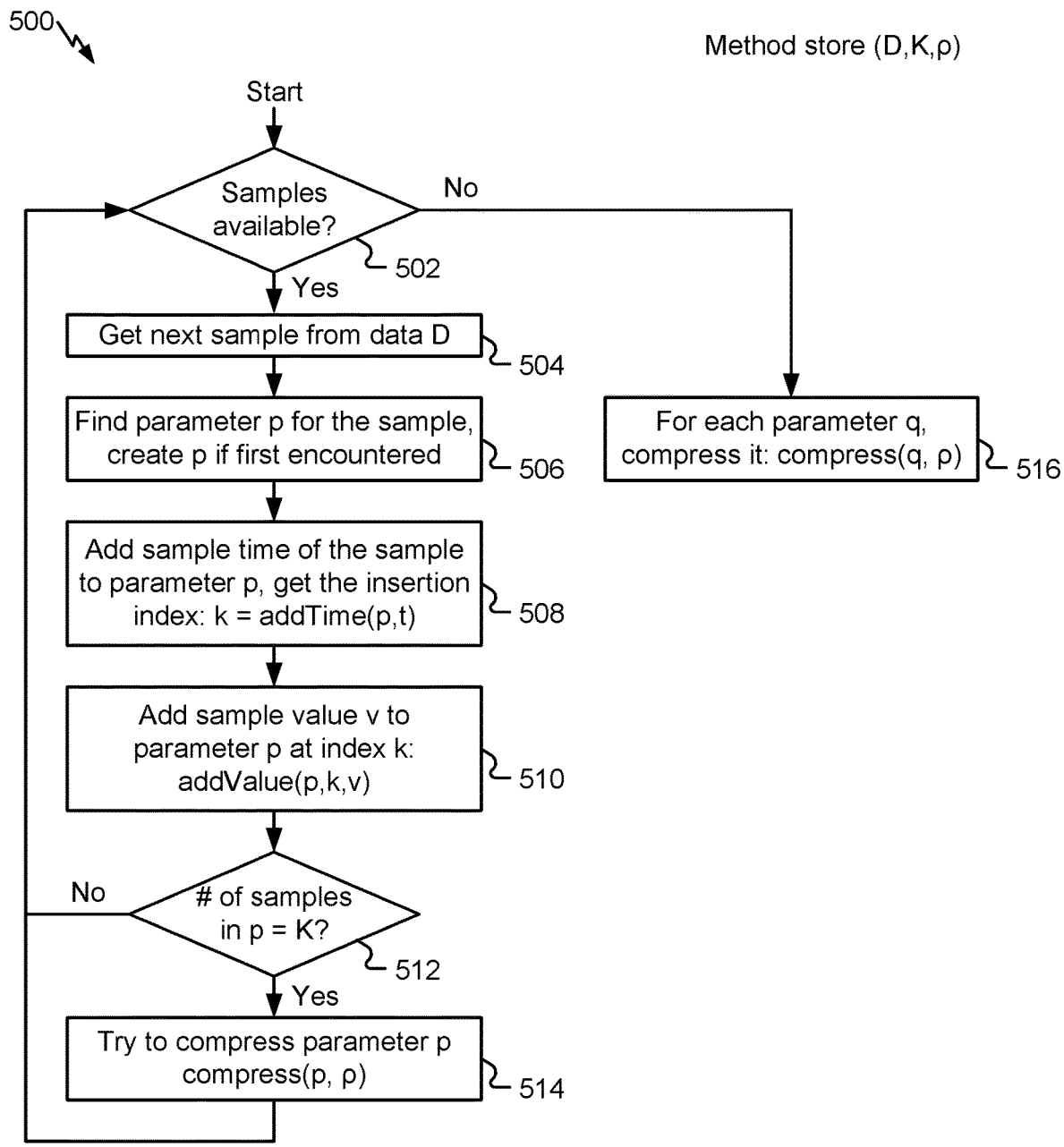
FIG. 5 is a flow chart of an example of a method of storing sensor data.

FIG. 5 illustrates a method 500 of storing flight sensor data. In some implementations, the method 500 is performed by the processor 110 to store the sensor data 108 (or portions thereof) in the memory 130 of FIG. 1. In a particular implementation, the method 500 is performed during execution of a "store (D, K, ρ)" instruction. In this implementation, parameter D represents the full flight sensor data to be stored (e.g., D includes sensor data representing samples of one or more parameters measured before a flight, during a flight, after a flight, or a combination thereof), parameter K represents a threshold for early try of the split compact method, and parameter p represents a control parameter to determine whether to use the split compact storage scheme versus the direct storage scheme. Although the data D is described as flight sensor data, in other implementations, the data D includes sensor data from other vehicles or other types of sensor data. In some implementations, p has a value between 0 and 1, and the value represents the amount of extra processing time used to extract sample times or parameter values from sensor data stored in accordance with the split compact storage scheme 300 of FIG. 3 (as compared to the amount of time to extract sample times or parameter values from sensor data stored in accordance with the direct storage scheme 400 of FIG. 4).

The method 500 includes determining whether more samples are available, at 502. For example, with reference to FIG. 1, the processor 110 determines whether sensor data 108 includes any sensor data (e.g., any samples) that has not already been obtained. If at least one sample remains, the method 500 continues to 504, otherwise the method 500 proceeds to 516.

The method 500 includes obtaining a next sample from flight sensor data D, at 504. For example, the processor 110 obtains a next sample of the sensor data 108 (e.g., from the one or more sensors 102, from the data storage device 104, from a network, etc.). The method 500 includes finding parameter p for the sample, at 506. The parameter of the sample may be identified by a unique name or identifier that is indicated by the sensor data. If sensor data corresponding to the parameter p have already been stored in a memory, such as the memory 130 of FIG. 1, the parameter p is "found". If no sensor data corresponding to the parameter p has been stored, a new parameter is "created" for storage. For example, a new data structure corresponding to the parameter p is created and stored in accordance with a default storage scheme. The new data structure may include or correspond to the fourth data structure 402 of FIG. 4 or to one or both of the second data structure 304 and the third data structure 306 of FIG. 3. In a particular implementation, the default storage scheme is the direct storage scheme 400 of FIG. 4. In an alternate implementation, the default storage scheme is the split compact storage scheme 300 of FIG. 3.

The method 500 includes adding a sample time of the sample to the stored sensor data corresponding to the parameter p, at 508. As an example, if time information corresponding to the parameter p is stored as the second data structure 304 of FIG. 3, a new entry is added to the second data structure 304. As another example, if time information corresponding to the parameter p is stored as the fourth data structure 402 of FIG. 4, a new entry is added to the fourth data structure 402. In a particular implementation, storing the sample time includes executing a k=addTime (p, t) instruction, as further described with reference to FIGS. 6A and 6B. In this implementation, execution of the addTime instruction returns an index k associated with the sample being added.

The method 500 includes adding sample value v (e.g., parameter value) to the stored sensor data corresponding to the parameter p at index k, at 510. As an example, if parameter values corresponding to the parameter p are stored as the third data structure 306 of FIG. 3, a new entry is added to the third data structure 306. As another example, if parameter values corresponding to the parameter p are stored as the fourth data structure 402 of FIG. 4, a new entry is added to the fourth data structure 402. In a particular implementation, storing the sample value v includes executing an addValue (p, k, v) instruction, as further described with reference to FIGS. 7A and 7B.

The method 500 includes determining whether the number of samples stored for parameter p is equal to K, at 512. If the number of samples is less than K, the method 500 returns to 502, and it is determined whether additional samples are available. If the number of samples is equal to K (or exceeds K), the method 500 continues to 514, where compression of the stored sensor data corresponding to parameter p is attempted. In a particular implementation, attempting to compress the stored sensor data corresponding to parameter p includes executing a compress (p, p) instruction is executed, as further described with reference to FIG. 8. After attempting to compress the stored sensor data corresponding to the parameter p, the method 500 returns to 502, and it is determined whether additional samples are available. If no more samples are available, the method 500 proceeds to 516. The method 500 includes, for each parameter q, attempting to compress the parameter q, at 516. In a particular implementation, attempting to compress each parameter q includes, for each parameter q for which there is stored sensor data, executing the compress (q, p) instruction, as further described with reference to FIG. 8.

In this manner, the method 500 stores the flight sensor data D in accordance with one or more storage schemes at a parameter-level granularity. Additionally, the method 500 attempts to compress (e.g., store in accordance with the split compact storage scheme 300 of FIG. 3) portions of sensor data corresponding to different parameters. For example, once a particular number (e.g., K) of samples have been stored for a parameter, the method 500 includes trying to compress the parameter, at 514. Additionally, once an entirety of the flight sensor data D has been stored, the method 500 includes compressing each of the parameters, at 516. As further described with reference to FIG. 8, compressing a parameter refers to storing a portion of sensor data corresponding to the parameter in accordance with the storage scheme that uses less storage space to store the portion of sensor data. In this manner, the method 500 enables portions of the flight sensor data D corresponding to one or more parameters to be stored in accordance with the storage scheme that uses less storage space to store the portion. Thus, the method 500 reduces a memory footprint associated with storing the flight sensor data D, as compared to other methods of storing flight sensor data.

Figure 6A:
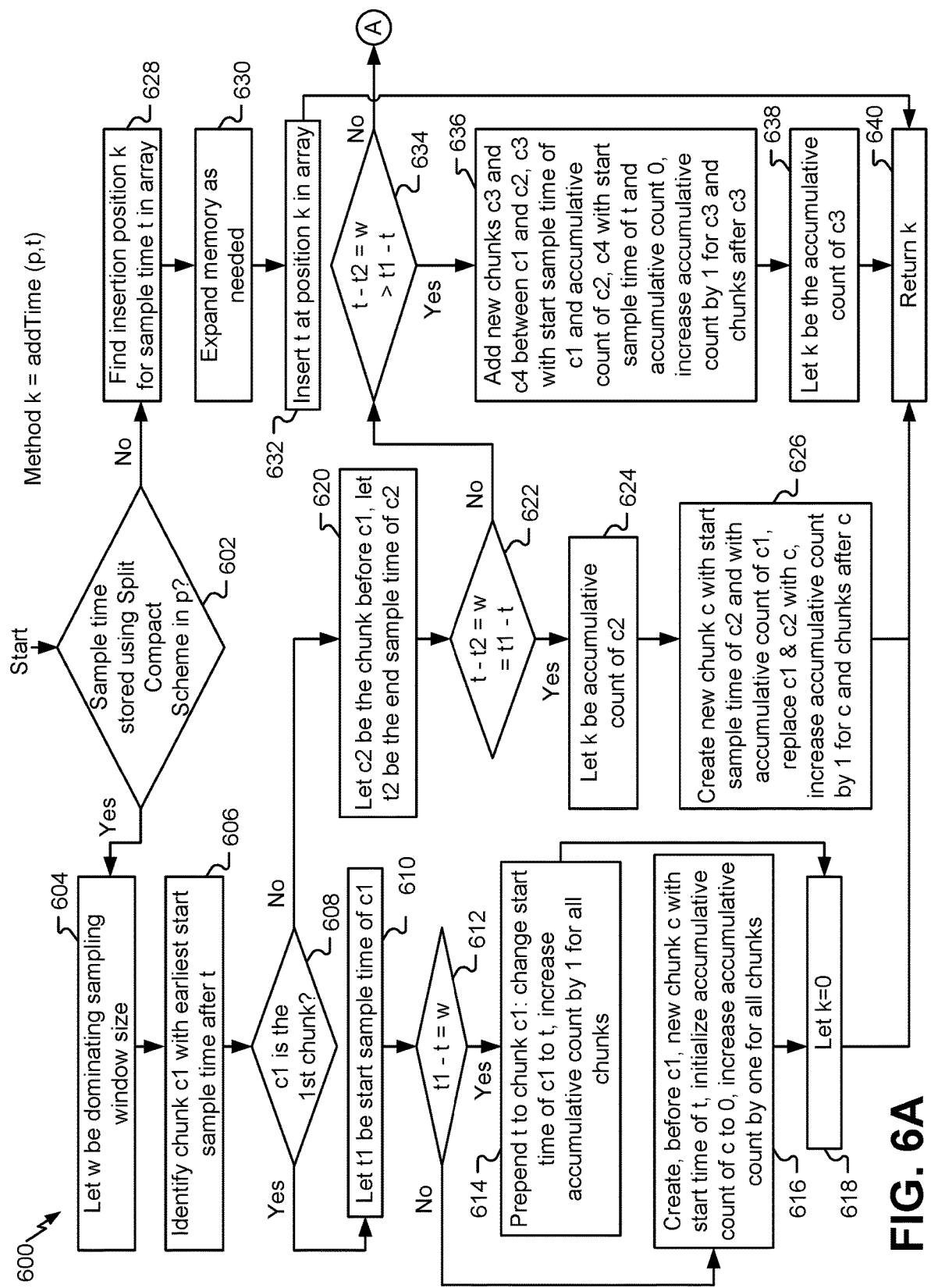
FIGS. 6A and 6B are a flow chart of an example of a method of adding a sample time of a sample to stored sensor data.
Figure 6B:
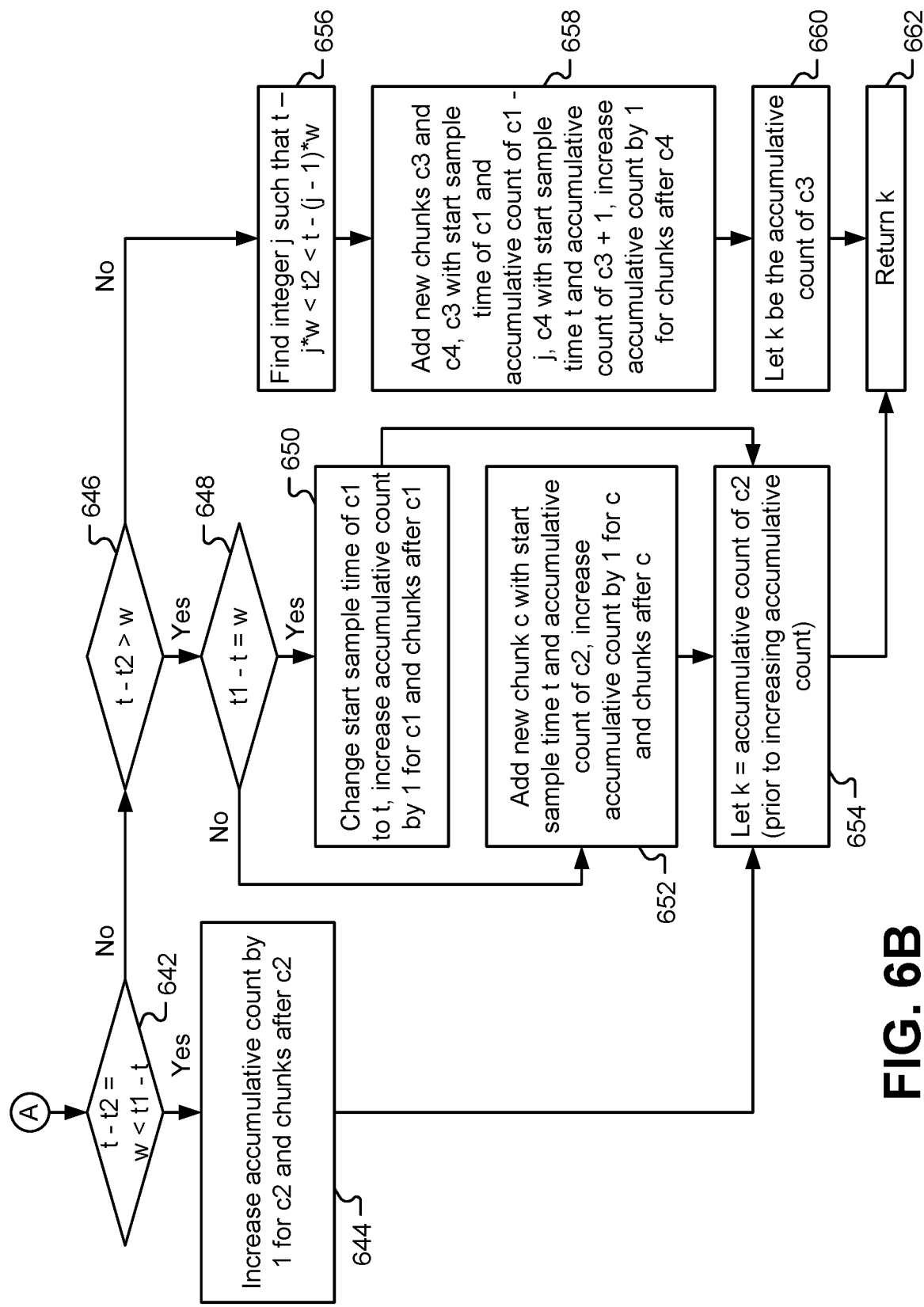

FIGS. 6A and 6B illustrate a method 600 of adding a sample time of a sample to stored sensor data. In some implementations, the method 600 is performed by the processor 110 as part of storing the sensor data 108 (or a portion thereof) in the memory 130 of FIG. 1. In a particular implementation, the method 600 is performed during execution of a "k=addTime (p, t)" instruction. In this implementation, t is sample time of a sample to be added to the stored sensor data corresponding to parameter p, and k is the index (e.g., position, starting from 0) of t in the ordered sequence of all time samples currently stored for parameter p.

The method 600 includes determining whether sample times are stored in accordance with the split compact storage scheme, at 602. For example, the processor 110 of FIG. 1 determines whether time information associated with the parameter p is stored using the second data structure 304 of FIG. 3. If the samples times are stored in accordance with the split compact storage scheme, the method 600 continues to 604. Alternatively, if the sample times are not stored in accordance with the split compact storage scheme (e.g., if the samples times are stored in accordance with the direct storage scheme 400 of FIG. 4), the method 600 continues to 628.

The method 600 includes determining a dominating sampling window size, at 604. For example, the processor 110 determines w based on the dominating sampling rate 302 of FIG. 3 corresponding to the parameter p. The method 600 includes identifying (e.g., finding) chunk c1 having the earliest starting sample time (e.g., starting timestamp) that is after the sample time t, at 606. For example, the processor 110 searches the second data structure 304 for the chunk c1 (e.g., the entry) with the start sample times field 303 having the earliest (e.g., lowest) value that is after (e.g., greater than) the starting time t.

The method 600 includes determining whether c1 is the first chunk, at 608. For example, the processor 110 determines whether c1 is the first chunk (e.g., the first entry) in the second data structure 304 of FIG. 3. If c1 is the first chunk, the method 600 continues to 610, and t1 is set equal to the starting sample time (e.g., the starting timestamp) of c1. The method 600 includes determining whether t1−t is equal to w, at 612. If t1−t is equal to w, the method 600 continues to 614, and sample time t is "prepended" to c1. Prepending the sample time t to c1 includes changing the starting sample time of c1 from t1 to t, in addition to increasing the accumulative time count of all chunks by 1. For example, with reference to Table 3, if w=1 and t=0.5, the starting sample time of the first entry is changed from 1.5 to 0.5, and the accumulative time counts of all five entries are each increased by 1, such that the first entry now has a start time of 0.5 and an accumulative time count of 26 (e.g., the first entry corresponds to 26 samples: the 25 original samples and the newly added sample). The method 600 continues to 618, which includes setting k equal to 0, before terminating at 640, where k (e.g., 0) is returned.

However, if t1−t is not equal to w, the method 600 proceeds from 612 to 616, and a new chunk is created before c1. The starting sample time of the new chunk is set equal to the sample time t, and the accumulative time count of the new chunk is initialized to 0. Additionally, after adding the new chunk, the accumulative time counts of all chunks are increased by 1. For example, with reference to Table 3, if w=1 and t=0.3, a new entry before the first entry is created, the new entry having a starting sample time of 0.3 and an accumulative time count of 0. After adding the new entry, the accumulative time counts of all six entries (including the new entry) are increased by 1, such that the first entry has a starting sample time of 0.3 and an accumulative time count of 1, and the second entry has a starting sample time of 1.5 and an accumulative time count of 26. The second entry corresponds to 25 samples, as indicated by the difference between the accumulative time count of the second entry and the accumulative time count of the first entry (e.g., 26−1=25). The method 600 continues to 618, which includes setting k equal to 0, before terminating at 640, where k (e.g., 0) is returned.

Returning to 608, if c1 is not the first chunk, the method 600 proceeds to 620, c2 is identified as the chunk that precedes c1, and t2 is set equal to the ending sample time (e.g., the ending timestamp). In some implementations, the ending sample time is included in each chunk, as described with reference to FIG. 2. Alternatively, the ending sample time is determined based on the starting sample time of c2, the accumulative time count of c2, and the accumulative time count of the chunk that precedes c2. The method 600 includes determining if t−t2 is equal to w and is equal to t1−t, at 622. If t−t2 is equal to t1−1, and both are equal to w, the method 600 continues to 624. The method 600 includes setting k equal to the accumulative time count of c2, at 624, and creating a new chunk c and replacing c1 and c2 with c, at 626. C has a starting sample time equal to the starting sample time of c2 and an accumulative time count equal to the accumulative time count of c1. Additionally, after replacing c1 and c2 with c, the accumulative time count for c and all chunks subsequent to c is increased by 1. To illustrate, if c1 has a starting sample time of 27.5 and an accumulative time count of 29, c2 has a starting sample time of 1.5, an ending sample time of 25.5, and an accumulative time count of 25, and t is 26.5, the two chunks c1 and c2 are replaced by a single chunk c having a starting sample time of 1.5 and an accumulative time count of 29, and after the replacement, the accumulative time count of c is increased to 30 (and the accumulative time counts of any chunks subsequent to c are increased by 1). The method 600 terminates at 640, and k is returned.

Returning to 622, if t−t2 is not equal to w or if t−t2 is not equal to t1−t, the method 600 proceeds to 634, and it is determined if t−t2 is equal to w and is greater than t1−t. If t−t2 is equal to w and if t−t2>t1−t, the method continues to 636, and new chunks c3 and c4 are created and added. C3 has a starting sample time equal to the starting sample time of c1 and an accumulative time count equal to the accumulative time count of c2. C4 has a starting sample time equal to the sample time t and an accumulative time count equal to 0. Additionally, after adding c3 and c4, the accumulative time counts of c3 and all chunks subsequent to c3 (including c4 and c1) are increased by 1. In this manner, c3 and c4 are inserted between c2 and c1. The method 600 includes setting k equal to the accumulative time count of c3, at 638. The method 600 terminates at 640 and k is returned.

Returning to 634, if t−t2 is not equal to w or if t−t2<=t1−t, the method 600 proceeds to 642, and it is determined whether t−t2 is equal to w and whether t−t2 is <t1−t. If t−t2 is equal to w and if t−t2<t1−t, the method 600 continues to 644 and the accumulative time counts of c2 and all chunks subsequent to c2 are increased by 1. In this manner, the sample time t is "appended" to c2, such that, after increasing the accumulative time counts, c2 includes or corresponds to the sample having the sample time t. The method 600 includes setting k equal to the accumulative time count of c2 prior to the increase at 654. The method 600 terminates at 662, and k is returned.

Returning to 642, if t−t2 is not equal to w or if t1−t is not greater than w, the method 600 proceeds to 646, and it is determined if t−t2>w. If t−t2>w, the method 600 continues to 648, and it is determined if t1−t is equal to w. If t1−t is equal to w, the method 600 continues to 650, and the starting sample time of c1 is changed from t1 to t. Additionally, the accumulative time counts of c1 and all chunks subsequent to c1 are increased by 1. In this manner, the sample time t is "prepended" to c1, such that, after the modifications, c1 includes or corresponds to the sample having the sample time t. The method 600 continues to 654, and k is set equal to the accumulative time count of c2 prior to the increase by 1. The method 600 terminates at 662, and k is returned. If t1−t is not equal to w, at 648, the method 600 proceeds to 652, and a new chunk c is created and added before c1. C has a starting sample time equal to the sample time t and an accumulative time count equal to the accumulative time count of c2. Additionally, after adding c, the accumulative time counts of c and all chunks subsequent to c are increased by 1. In this manner, new chunk c is inserted between c2 and c1. The method 600 continues to 654, and k is set equal to the accumulative time count of c2 prior to the increase by 1. The method 600 terminates at 662, and k is returned.

Returning to 646, if t−t2<w, the method 600 proceeds to 656, and an integer j is identified such that t−j*w<t2<t−(j−1)*w. The method 600 includes adding new chunks c3 and c4, at 658. C3 has a starting sample time equal to the starting sample time of c1 and an accumulative time count equal to the accumulative time count of c1−j. C4 has a starting sample time equal to the sample time t and an accumulative time count equal to the accumulative time count of c3+1. Additionally, after c3 and c4 are added, the accumulative time counts of chunks subsequent to c4 are increased by 1. The method 600 includes setting k equal to the accumulative time count of c3, at 660. The method 600 terminates at 662, and k is returned.

Returning to 628, if the sample times are stored in accordance with the direct storage scheme 400 of FIG. 4, the method 600 includes finding an insertion position k for sample time t in the array (e.g., in the fourth data structure 402 of FIG. 4). The method 600 includes expanding memory allocation for the array (as needed) to insert a new entry, at 630. The method 600 includes inserting the sample time t at position k in the array, at 632. For example, a new entry having a sample time (e.g., timestamp) field equal to the sample time t is added to the fourth data structure 402 of FIG. 4. After inserting the sample time t, the method 600 continues to 640, and the insertion point k is returned.

Thus, the method 600 enables insertion of a sample time t into a data structure that stores sensor data corresponding to parameter p, regardless of whether the sensor data corresponding to parameter p is stored in accordance with the split compact storage scheme 300 of FIG. 3 or the direct storage scheme 400 of FIG. 4.

Figure 7A:
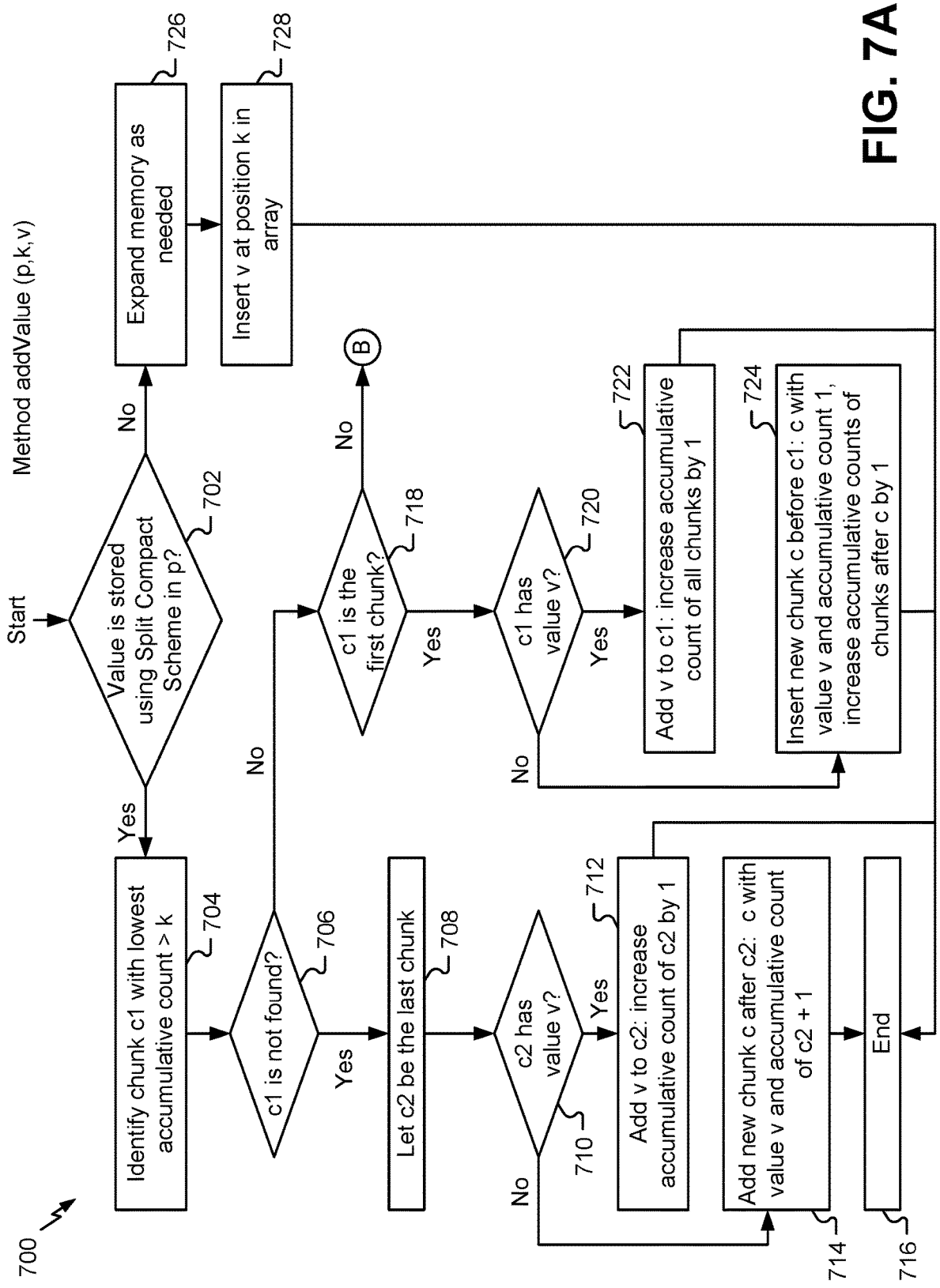
FIGS. 7A and 7B are a flow chart of an example of a method of adding a parameter value of a sample to stored sensor data.
Figure 7B:
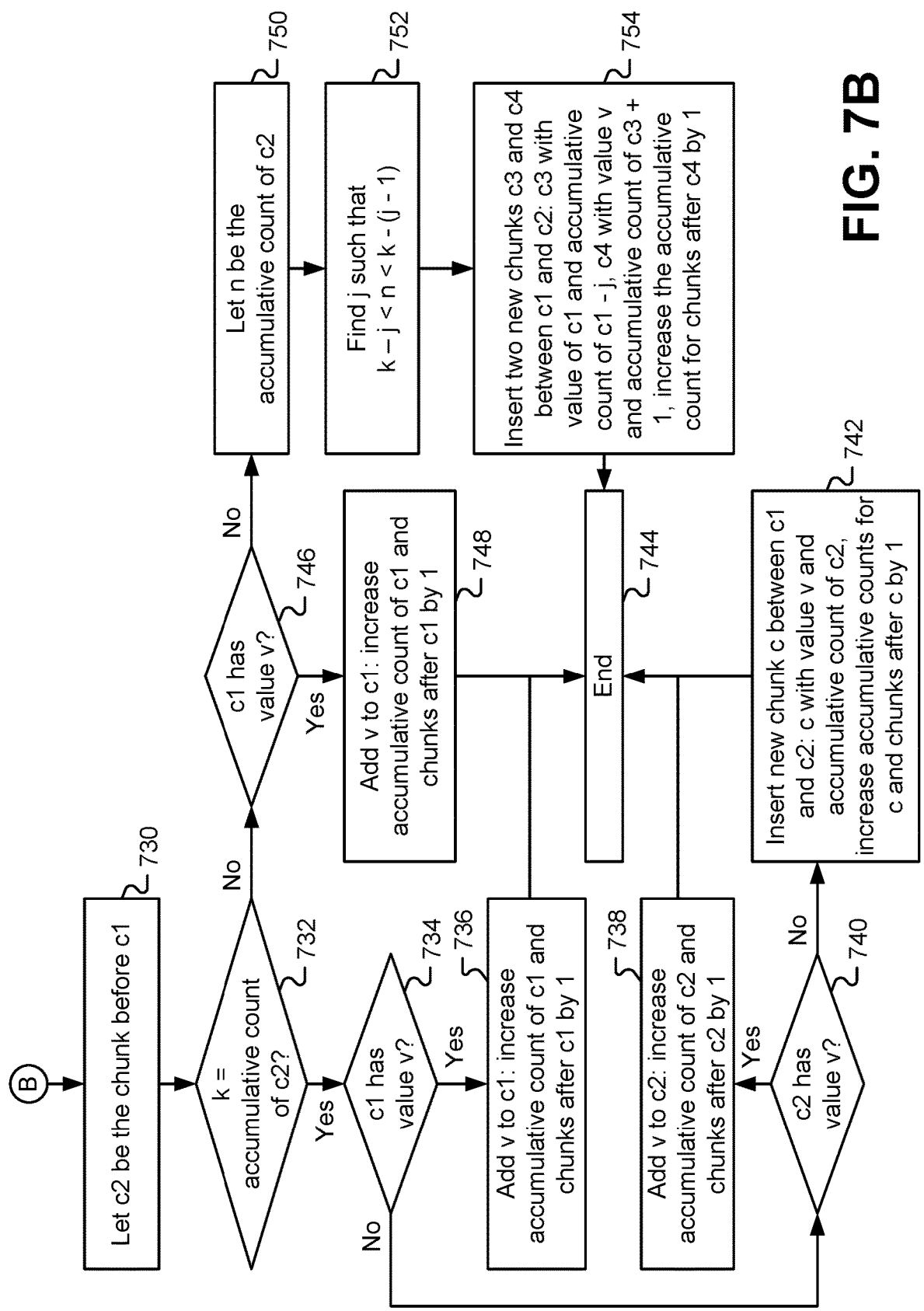

FIGS. 7A and 7B illustrate a method 700 of adding a parameter value of a sample to stored sensor data. In some implementations, the method 700 is performed by the processor 110 to store the sensor data 108 (or portions thereof) in the memory 130 of FIG. 1. In a particular implementation, the method 700 is performed during execution of an "addValue (p, k, v)" instruction. In this implementation, v is sample value (e.g., the parameter value) of a sample to be added to the stored sensor data corresponding to parameter p, and k is the index (e.g., position, starting from 0) of the sample to be added in the ordered sequence of all samples currently stored for parameter p.

The method 700 includes determining whether sample values (e.g., parameter values) are stored using the split compact storage scheme, at 702. For example, the processor 110 of FIG. 1 determines whether parameter values associated with the parameter p are stored using the third data structure 306 of FIG. 3. If the parameter values are stored in accordance with the split compact storage scheme, the method 700 continues to 704. Alternatively, if the parameter values are not stored in accordance with the split compact storage scheme (e.g., if the parameter values are stored in accordance with the direct storage scheme 400 of FIG. 4), the method 700 proceeds to 726.

The method 700 includes attempting to identify chunk c1 with the lowest accumulative value count that is greater than k, at 704. For example, the processor 110 performs a binary search on the third data structure 306 of FIG. 3 to identify an entry (e.g., a chunk) having the lowest accumulative value count that is greater than k. The method 700 includes determining whether c1 could be identified, at 706. If c1 is not identified, the method 700 continues to 708, and the last chunk (e.g., corresponding to the last entry in the data structure) is identified as c2. The method 700 includes determining whether the parameter value of c2 is equal to the sample value v, at 710. If the parameter value of c2 is equal to the sample value v, the method 700 continues to 712, and the accumulative value count of c2 is increased by 1. In this manner, the sample value v is "added" to c2 (e.g., after the increase, c2 includes or corresponds to the sample having the sample value v). The method 700 terminates at 716. However, if the parameter value of c2 is not equal to the sample value v, the method 700 proceeds from 710 to 714, and a new chunk c is added. C has a parameter value equal to the sample value v and an accumulative value count equal to the accumulative value count of c2+1. In this manner, the new chunk c is subsequent to c2. The method 700 terminates at 716.

Returning to 706, if c1 is identified, the method 700 proceeds to 718, and it is determined if c1 is the first chunk. For example, the processor 110 determines if c1 corresponds to the first entry of the third data structure 306 of FIG. 3. If c1 is the first chunk, the method 700 continues to 720, and it is determined if the parameter value of c1 is equal to the sample value v. If the parameter value of c1 is equal to the sample value v, the method 700 continues to 722, and the accumulative value count of all chunks subsequent to c1 are increased by 1. In this manner, the sample value v is "added" to chunk c1. The method 700 terminates at 716. However, at 720, if the parameter value of c1 is not equal to the sample value v, the method 700 proceeds from 720 to 724, and a new chunk c is added. C has a parameter value equal to the sample value v and an accumulative value count equal to 1. Additionally, after adding c, the accumulative value counts of all chunks subsequent to c (including c1) are increased by 1. In this manner, c is inserted before c1. The method 700 terminates at 716.

Returning to 718, if c1 is not the first chunk, the method 700 proceeds to 730, and the preceding chunk to c1 is identified as c2. The method 700 includes determining whether k is equal to the accumulative value count of c2, at 732. If k is equal to the accumulative value count of c2, the method 700 continues to 734, and it is determined if c1 has a parameter value equal to the sample value v. If c1 has a parameter value equal to the sample value v, the method 700 continues to 736, and the accumulative value count of c1 and all chunks subsequent to c1 is increased by 1. In this manner, the sample value v is "added" to c1 (e.g., after the increase, c1 includes or corresponds to the sample having the sample value v). The method 700 terminates at 744.

Returning to 734, if the parameter value of c1 is not equal to the sample value v, the method 700 continues to 740, and it is determined whether the parameter value of c2 is equal to the sample value v. If the parameter value of c2 is equal to the sample value v, the method 700 continues to 738, and the accumulative value counts of c2 and all chunks subsequent to c2 are increased by 1. In this manner, the sample value v is "added" to c2 (e.g., after the increase, c2 includes or corresponds to the sample having the sample value v). The method 700 terminates at 744. If the parameter value of c2 is not equal to the sample value v, the method 700 proceeds from 740 to 742, and a new chunk c is added (e.g., is inserted between c1 and c2). The new chunk c has a parameter value equal to the sample value v and an accumulative value count equal to the accumulative value count of c2. Additionally, accumulative value counts for c and all chunks subsequent to c are increased by 1. The method 700 terminates at 744.

Returning to 732, if k is not equal to the accumulative value count of c2, the method 700 proceeds from 732 to 746, and it is determined whether the parameter value of c1 is equal to the sample value v. If the parameter value of c1 is equal to the sample value v, the method 700 continues to 748, and the accumulative value count of c1 and all chunks subsequent to c1 is increased by 1. In this manner, the sample value v is "added" to c1 (e.g., after the increase, c1 includes or corresponds to the sample having the sample value v). The method 700 terminates at 744.

Returning to 746, if the parameter value of c1 is not equal to the sample value v, the method 700 proceeds to 750, and n is set equal to the accumulative value count of c2. The method 700 includes identifying an integer j such that $k-j<n<k-(n-1)$, at 752, and adding new chunks c3 and c4, at 754. C3 has a parameter value equal to the parameter value of c1 and an accumulative value count equal to the accumulative value count of c1−j. C4 has a parameter value equal to the sample value v and an accumulative value count equal to the accumulative value count of c3+1. Additionally, after adding c3 and c4, the accumulative value counts of all chunks subsequent to c4 are increased by 1. In this manner, c3 and c4 are inserted between c2 and c1. The method 700 terminates at 744.

Returning to 702, if the parameter values are not stored in accordance with the split compact storage scheme, the method 700 proceeds to 726, and the memory is expanded (as needed) to add a new entry the data structure corresponding to the parameter values of parameter p. For example, the processor 110 allocates additional memory (if necessary) to add a new entry to the fourth data structure 402 of FIG. 4. The method 700 includes inserting the sample value v at position k in the data structure (e.g., the array), at 728. For example, the processor 110 adds a new entry having the sample value v to the fourth data structure 402 of FIG. 4. The method 700 terminates at 716.

Thus, the method 700 enables insertion of a sample value v into a data structure that stores sensor data corresponding to parameter p, regardless of whether the sensor data corresponding to parameter p is stored in accordance with the split compact storage scheme 300 of FIG. 3 or the direct storage scheme 400 of FIG. 4.

Figure 8:
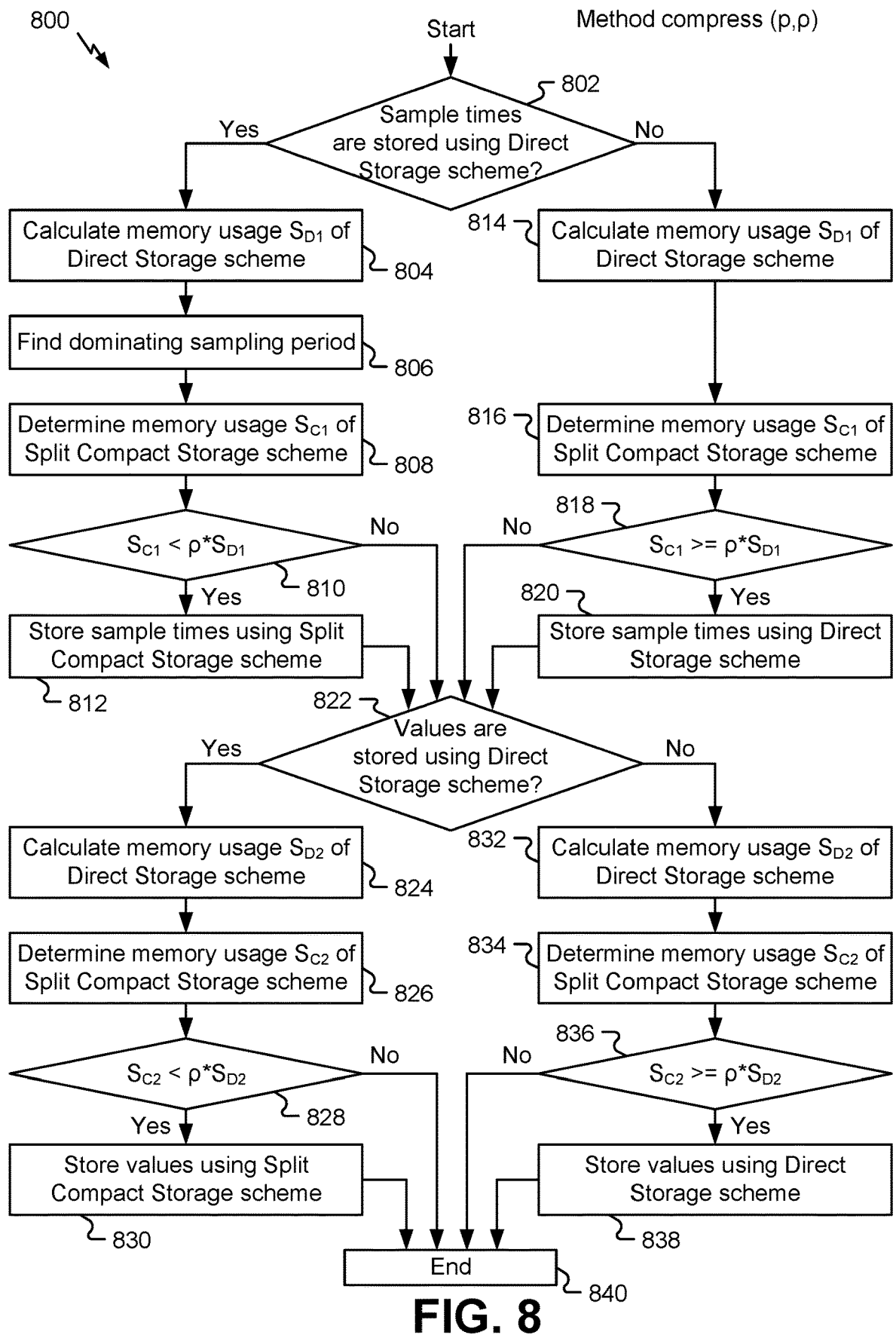
FIG. 8 is a flow chart of an example of a method of compressing stored sensor data.

FIG. 8 illustrates a method 800 of compressing stored sensor data. In some implementations, the method 800 is performed by the processor 110 after storing the sensor data 108 in the memory 130 of FIG. 1. In a particular implementation, the method 800 is performed during execution of a "compress (p, p)" instruction. In this implementation, parameter p is the parameter for which stored sensor data is to be compressed, and p is a control parameter to determine whether to use a compact storage scheme versus direct storage scheme.

In some implementations, p has a value between 0 and 1, and the value represents the amount of extra processing time used to extract sample times or parameter values from sensor data stored in accordance with the split compact storage scheme 300 of FIG. 3 (as compared to the amount of time to extract sample times or parameter values from sensor data stored in accordance with the direct storage scheme 400 of FIG. 4). If p is relatively close to 1, the amount of time used to extract sample times or parameter values from sensor data stored in accordance with the split compact scheme 300 is relatively similar to the amount of time used to extract sample times or parameter values from sensor data stored in accordance with the direct storage scheme 400 of FIG. 4. Alternatively, if p is relatively close to 0, extracting sample times or parameter values from sensor data stored in accordance with the split compact storage scheme 300 is relatively slower than extracting sample times or parameter values from sensor data stored in accordance with the direct storage scheme 400 of FIG. 4.

The method 800 includes determining whether sample times corresponding to the parameter p are stored in accordance with the direct storage scheme, at 802. For example, the processor 110 of FIG. 1 determines whether sample times (e.g., timing information) are stored in accordance with the direct storage scheme 400 of FIG. 4. If the sample times are stored in accordance with the direct storage scheme, the method 800 continues to 804, and an amount of storage space $S_{D1}$ used to store the sample times in accordance with the direct storage scheme is determined. $S_{D1}$ denotes the memory usage (e.g., of a memory, such as the memory 130 of FIG. 1) associated with storing the sample times in accordance with the direct storage scheme (e.g., the memory usage of storing an array, or other data structure, of time samples), as described with reference to FIG. 4. In a particular implementation, $S_{D1}$ is determined based on the number of stored samples and the memory usage associated with storing a sample time in accordance with the direct storage scheme.

The method 800 includes determining the dominating sampling period, at 806. For example, the processor 110 determines the most common sampling rate (e.g., the dominating sampling rate) that corresponds to the most stored samples, and the processor 110 determines the dominating sampling period by taking the inverse of the dominating sampling rate. The method 800 includes determining (e.g., estimating) an amount of storage space $S_{C1}$ used to store the sample times in accordance with the split compact storage scheme, at 808. $S_{C1}$ denotes the memory usage (e.g., of a memory, such as the memory 130 of FIG. 1) associated with storing the sample times in accordance with the split compact storage scheme (e.g., the memory usage of storing the second data structure 304 that stores time samples), as described with reference to FIG. 3. In a particular implementation, $S_{C1}$ is determined based on the number of chunks that would be used to store the sample times and the memory usage associated with storing a chunk in accordance with the split compact storage scheme. In this implementation, the number of chunks is calculated based on the dominating sampling period and each sample time of the stored samples (e.g., by grouping samples that are separated in time by the dominating sampling period and that are associated with the same sampling rate).

The method 800 includes determining whether $S_{C1}$ is less than $\rho*S_{D1}$, at 810. If $S_{C1}$ is less than $\rho*S_{D1}$, the method 800 continues to 812, and the sample times corresponding to the parameter p are stored using the split compact storage scheme. For example, the processor 110 retrieves the sample times corresponding to the parameter p (which have been stored in the memory 130 in accordance with the direct storage scheme 400 of FIG. 4, such as being stored in the fourth data structure 402) and stores the sample times in accordance with the split compact storage scheme 300 of FIG. 3 (such as by storing the sample times in the second data structure 304 of FIG. 3). The conversion from storage in accordance with the direct storage scheme 400 of FIG. 4 to storage in accordance with the split compact storage scheme 300 of FIG. 3 reduces the amount of storage space (e.g., in the memory 130) used to store the sample times corresponding to the parameter p, as determined at 810. After the change in storage scheme, the method 800 proceeds to 822. Alternatively, if $S_{C1}$ is not less than $\rho*S_{D1}$ (e.g., if $S_{C1}>=\rho*S_{D1}$), the method 800 proceeds to 822 (e.g., the sample times corresponding to the parameter p remain stored in accordance with the direct storage scheme 400 of FIG. 4).

Returning to 802, if the sample times are not stored in accordance with the direct storage scheme (e.g., if the sample times are stored in accordance with the split compact storage scheme), the method 800 proceeds to 814, and the amount of storage space $S_{D1}$ used to store the sample times in accordance with the direct storage scheme is determined (e.g., estimated). For example, the processor 110 of FIG. 1 determines $S_{D1}$ based on the accumulative time count of the last chunk and the amount of storage space associated with storing a sample time in accordance with the direct storage method. The method 800 includes determining the amount of storage space $S_{C1}$ used to store the sample times in accordance with the split compact storage scheme, at 816. For example, the processor 110 of FIG. 1 determines $S_{C1}$ based on the amount of stored chunks and the amount of storage space associated with storing a chunk in accordance with the split compact method.

The method 800 includes determining whether $S_{C1}$ is greater than or equal to $\rho*S_{D1}$, at 818. If $S_C$ is greater than or equal to $\rho*S_{D1}$, the method 800 continues to 820, and the sample times corresponding to the parameter p are stored using the direct storage scheme. For example, the processor 110 retrieves the sample times corresponding to the parameter p (which have been stored in the memory 130 in accordance with the split compact storage scheme 300 of FIG. 3, such as being stored in the second data structure 304) and stores the sample times in accordance with the direct storage scheme 400 of FIG. 4 (such as by storing the sample times in the fourth data structure 402 of FIG. 4). The conversion from storage in accordance with the split compact storage scheme 300 of FIG. 3 to storage in accordance with the direct storage scheme 400 of FIG. 4 reduces the amount of storage space (e.g., in the memory 130) used to store the sample times corresponding to the parameter p, as determined at 818. After the change in storage scheme, the method 800 proceeds to 822. Alternatively, if $S_{C1}$ is not greater than or equal to $\rho*S_{D1}$ (e.g., if $S_{C1}<\rho*S_{D1}$), the method 800 proceeds to 822 (e.g., the sample times corresponding to the parameter p remain stored in accordance with the split compact storage scheme 300 of FIG. 3).

The method 800 includes determining whether parameter values corresponding to the parameter p are stored in accordance with the direct storage scheme, at 822. For example, the processor 110 of FIG. 1 determines whether parameter values are stored in accordance with the direct storage scheme 400 of FIG. 4. If the parameter values are stored in accordance with the direct storage scheme, the method 800 continues to 824, and the amount of storage space $S_{D2}$ used to store the sample times in accordance with the direct storage scheme is determined. $S_{D2}$ denotes the memory usage (e.g., of a memory, such as the memory 130 of FIG. 1) associated with storing the parameter values in accordance with the direct storage scheme (e.g., the memory usage of storing an array, or other data structure, of parameter values), as described with reference to FIG. 4. In a particular implementation, the processor 110 determines $S_{D2}$ based on the number of stored parameter values (e.g., the length of the fourth data structure 402 of FIG. 4) and the amount of storage space associated with storing a parameter value in accordance with the direct storage scheme.

The method 800 includes determining (e.g., estimating) the amount of storage space $S_{C2}$ used to store the parameter values in accordance with the split compact storage scheme, at 826. $S_{C2}$ denotes the memory usage (e.g., of a memory, such as the memory 130 of FIG. 1) associated with storing the parameter values in accordance with the split compact storage scheme (e.g., the memory usage of storing the third data structure 306 that stores parameter values), as described with reference to FIG. 3. In a particular implementation, the processor 110 determines $S_{C2}$ by determining the number of groups of consecutive samples having the same parameter value and multiplying the number of groups by the amount of storage space associated with storing a chunk in accordance with the direct storage scheme.

The method 800 includes determining whether $S_{C2}$ is less than $\rho^*S_{D2}$, at 828. If $S_{C2}$ is less than $\rho^*S_{D2}$, the method 800 continues to 830, and the parameter values corresponding to the parameter p are stored using the split compact storage scheme. For example, the processor 110 retrieves the parameter values corresponding to the parameter p (which have been stored in the memory 130 in accordance with the direct storage scheme 400 of FIG. 4, such as being stored in the fourth data structure 402) and stores the parameter values in accordance with the split compact storage scheme 300 of FIG. 3 (such as by storing the parameter values in the third data structure 306 of FIG. 3). The conversion from storage in accordance with the direct storage scheme 400 of FIG. 4 to storage in accordance with the split compact storage scheme 300 of FIG. 3 reduces the amount of storage space (e.g., in the memory 130) used to store the parameter values corresponding to the parameter p, as determined at 828. After the change in storage scheme, the method 800 terminates at 840. Alternatively, if $S_{C2}$ is not less than $\rho^*S_{D2}$ (e.g., if $S_{C2}>=\rho^*S_{D2}$), the parameter values corresponding to the parameter p remain stored in accordance with the direct storage scheme 400 of FIG. 4, and the method 800 terminates at 840.

Returning to 822, if the parameter values are not stored in accordance with the direct storage scheme (e.g., if the parameter values are stored in accordance with the split compact storage scheme), the method 800 proceeds to 832, and the amount of storage space $S_{D2}$ used to store the parameter values in accordance with the direct storage scheme is determined (e.g., estimated). For example, the processor 110 of FIG. 1 determines $S_{D2}$ based on the accumulative value count of the last chunk and the amount of storage space associated with storing a parameter value in accordance with the direct storage method. The method 800 includes determining the amount of storage space $S_{C2}$ used to store the parameter values in accordance with the split compact storage scheme, at 834. For example, the processor 110 of FIG. 1 determines $S_{C2}$ based on the amount of stored chunks and the amount of storage space associated with storing a chunk in accordance with the split compact method.

The method 800 includes determining whether $S_{C2}$ is greater than or equal to $\rho^*S_{D2}$, at 836. If $S_{C2}$ is greater than or equal to $\rho^*S_{D2}$, the method 800 continues to 838, and the parameter values corresponding to the parameter p are stored using the direct storage scheme. For example, the processor 110 retrieves the parameter values corresponding to the parameter p (which have been stored in the memory 130 in accordance with the split compact storage scheme 300 of FIG. 3, such as being stored in the third data structure 306) and stores the parameter values in accordance with the direct storage scheme 400 of FIG. 4 (such as by storing the parameter values in the fourth data structure 402 of FIG. 4). The conversion from storage in accordance with the split compact storage scheme 300 of FIG. 3 to storage in accordance with the direct storage scheme 400 of FIG. 4 reduces the amount of storage space (e.g., in the memory 130) used to store the parameter values corresponding to the parameter p, as determined at 838. After the change in storage scheme, the method 800 terminates at 840. Alternatively, if $S_{C2}$ is not greater than or equal to $\rho^*S_{D2}$ (e.g., if $S_{C2}<\rho^*S_{D2}$), the parameter values corresponding to the parameter p remain stored in accordance with the split compact storage scheme 300 of FIG. 3, and the method 800 terminates at 840.

In this manner, the method 800 enables time samples and parameter values corresponding the parameter p to be stored in accordance with the storage scheme that uses fewer memory resources (e.g., less storage space and processing time). Thus, the sensor data corresponding to parameter p is stored in a manner that reduces the memory footprint through selection of one or more storage schemes.

Figure 9:
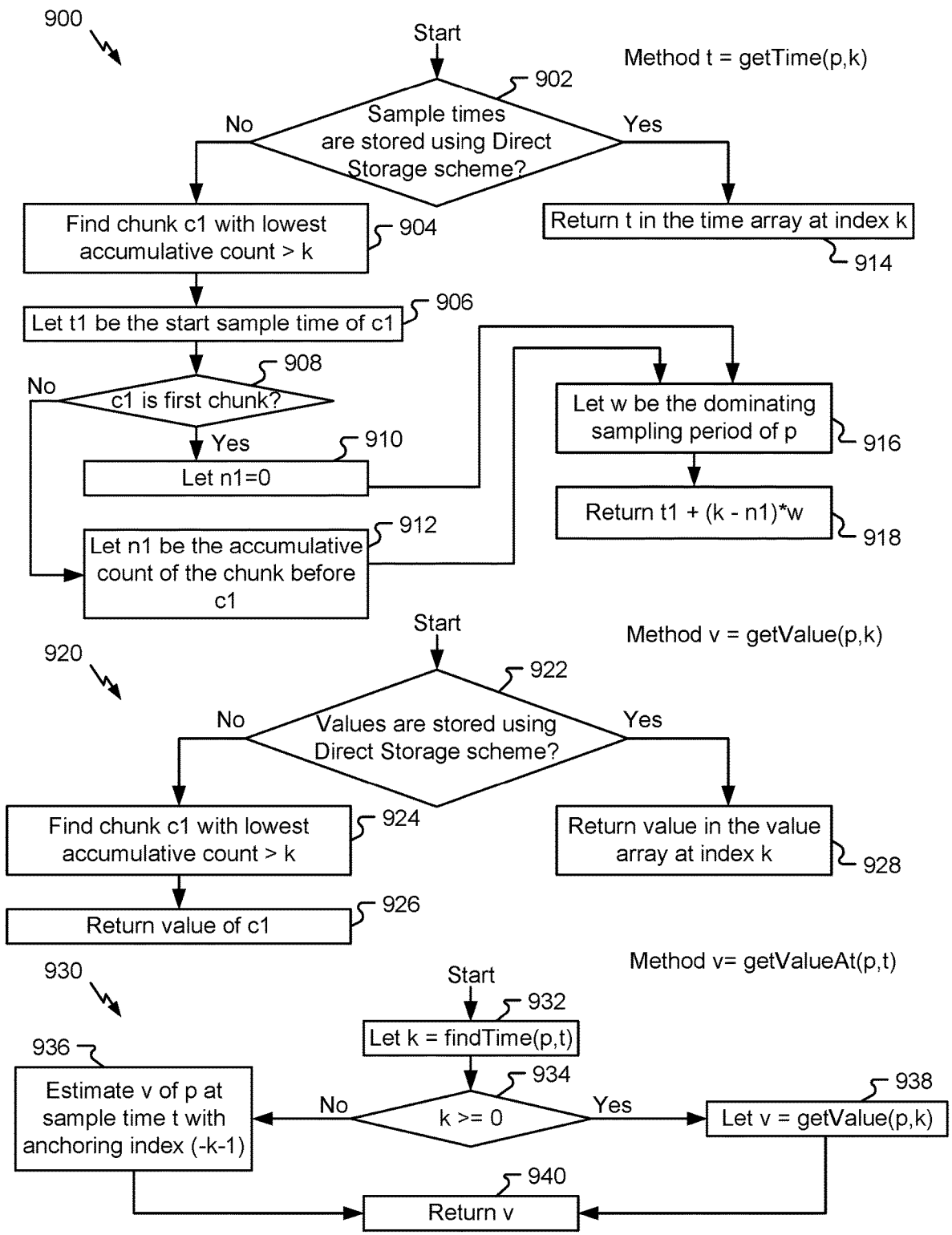
FIG. 9 includes flow charts of example methods of accessing stored sensor data.

FIG. 9 illustrates methods of accessing flight sensor data. In some implementations, the methods are performed by the processor 110 to access data, such as the sensor data 108, stored in the memory 130 of FIG. 1.

FIG. 9 illustrates a method 900 of accessing a sample time by index. In a particular implementation, the method 900 is performed during execution of a "t=getTime (p, k)" instruction. In this implementation, execution of the instruction returns the sample time t of a stored sample of parameter p at index k (starting from 0, where the index represents the position of the sample relative to the other samples, not time chunks). The sample time t is returned in at most O (log K) time. To illustrate, if sample times of the parameter p are stored in accordance with the split compact storage scheme, the sample time t is returned in at most O (log K) time, where K is the total number of stored chunks. Alternatively, if the sample times of the parameter p are stored in accordance with the direct storage scheme, the sample time t is returned in O (1) time.

The method 900 includes determining whether the sample times corresponding to the parameter p are stored in accordance with the direct storage scheme, at 902. For example, the processor 110 determines whether sample times corresponding to the parameter p are stored in the memory 130 in accordance with the direct storage scheme 400 of FIG. 4. If the samples times are stored in accordance with the direct storage scheme, the method 900 continues to 914, and the sample time t stored in the sample time array at index k is returned. For example, the processor 110 of FIG. 1 accesses the entry of the fourth data structure 402 having the index k and returns the sample time of the entry. This takes O (1) time. The method 900 terminates at 914.

Returning to 902, if the sample times are not stored in accordance with the direct storage scheme, the method 900 proceeds to 904, and chunk c1 having the lowest accumulative time count that is greater than k is identified. For example, the processor 110 performs a binary search on the second data structure 304 of FIG. 3 to identify a chunk with an accumulative time count that is greater than the index k. The method 900 includes setting t1 equal to the starting sample time of c1, at 906. This takes O (log N) time, where N is the number of stored sample time chunks.

The method 900 includes determining whether c1 is the first chunk, at 908. For example, the processor 110 determines whether c1 is the first chunk of the second data structure 304 of FIG. 3. If c1 is the first chunk, the method 900 continues to 910, and n1 is set equal to 0. If c1 is not the first chunk, the method 900 continues to 912, and n1 is set equal to the accumulative time count of the chunk that precedes c1. For example, the processor 110 identifies a particular chunk that precedes c1 in the second data structure 304, and the processor 110 sets n1 equal to the accumulative time count of the identified preceding chunk.

The method 900 proceeds, from either 910 or 912, to 916, and w is set to the dominating sampling period associated with parameter p. For example, the processor 110 of FIG. 1 determines the dominating sampling period by determining an inverse of the dominating sampling rate 302 of FIG. 3. The method 900 also includes returning t1+(k−n1)*w, at 918. The method 900 terminates at 918.

FIG. 9 also illustrates a method 920 of accessing a parameter value by index. In a particular implementation, the method 920 is performed during execution of a "v=getValue (p, k)" instruction. In this implementation, execution of the instruction returns the parameter value v (e.g., sample value) of a stored sample of parameter p at index k (starting from 0, where the index represents the position of the sample relative to the other samples, not parameter value chunks). The sample value v is returned in at most O (log K) time. To illustrate, if parameter values of the parameter p are stored in accordance with the split compact storage scheme, the sample value v is returned in at most O (log K) time, where K is the total number of stored chunks. Alternatively, if the parameter values of the parameter p are stored in accordance with the direct storage scheme, the sample value v is returned in O (1) time.

The method 920 includes determining whether the parameter values corresponding to the parameter p are stored in accordance with the direct storage scheme, at 922. For example, the processor 110 determines whether parameter values corresponding to the parameter p are stored in the memory 130 in accordance with the direct storage scheme 400 of FIG. 4. If the parameter values are not stored in accordance with the direct storage scheme, the method 920 continues to 924, and chunk c1 having the lowest accumulative value count that is greater than k is identified. For example, the processor 110 performs a binary search on the third data structure 306 of FIG. 3 to identify a chunk with an accumulative value count that is greater than the index k. This takes at most O (log N) time, where N is the number of stored parameter value chunks. The method 920 also includes returning the parameter value of c1, at 926. The method 900 terminates at 926. If the parameter values are stored in accordance with the direct storage scheme, the method 920 proceeds from 922 to 928, and the parameter value stored in the parameter array at index k is returned. For example, the processor 110 of FIG. 1 accesses the entry of the fourth data structure 402 having the index k and returns the parameter value of the entry. This takes O (1) time. The method 920 terminates at 928.

FIG. 9 also illustrates a method 930 of accessing a parameter value by sample time (instead of index). The method 930 enables estimation of a parameter value v that corresponds to a sample time at which a selected parameter was not sampled. Many analytics tasks require parameter values to be sampled at a specific rate and/or at a specific sample time, for example to get parameter values of a selected parameter at 1 Hz into a tabular format. As a result, if the parameter is not sampled at the specific sample time, an estimated value corresponding to the specific sample time is used. In a particular implementation, the method 930 is performed during execution of a "v=getValueAt (p, t)" instruction. In this implementation, execution of the instruction returns the parameter value v (e.g., sample value), which is either the parameter value of a sample of the parameter p having a sample time t or an estimated parameter value that corresponds to sample time t (if there is no sample of the parameter p having the sample time t).

The method 930 includes determining the index k of the sample of the parameter p having the sample time t, at 932. For example, the processor 110 executes the instruction findTime (p, t) to determine k, as further described with reference to FIG. 10. If there is a sample having the sample time t, k is a positive integer and is equal to the index of the sample after execution of the findTime instruction. If there is no sample having the sample time t, k is a negative integer after execution of the findTime instruction, as further described with reference to FIG. 10.

The method 930 includes determining whether k is greater than or equal to 0, at 934. If k is not greater than or equal to 0, the method 930 continues to 936, and the parameter value v of the parameter p corresponding to the sample time t is estimated based on the anchoring index (−k−1). In a particular implementation, the processor 110 executes one of the estimation instructions described with reference to FIG. 11 with the sample time t and the anchoring index (−k−1) as inputs to estimate the parameter value v. If k is greater than or equal to 0, the method 930 proceeds to 938, and the parameter value of v of the parameter p having sample time t is determined. In a particular implementation, the processor 110 executes the getValue instruction associated with the method 920 using the parameter p and k as inputs to determine the parameter value v. After the parameter value v is estimated (at 936) or determined (at 938), the method 930 continues to 940, and the parameter value v is returned. The method 930 terminates at 940.

Thus, the methods of FIG. 9 enable stored sensor data to be accessed by index or by sample time. In some implementations, accessing a stored sample time or a stored parameter value takes at most O (log K) time, where K is the number of stored chunks (if the stored sample time or the stored parameter value is stored in accordance with the split compact storage scheme 300 of FIG. 3). This reduces the amount of time to access stored samples by sample time from O (log N) time, where N is the number of stored samples. Because K is often times 10 times smaller than N, the reduction in processing time can be significant.

Figure 10:
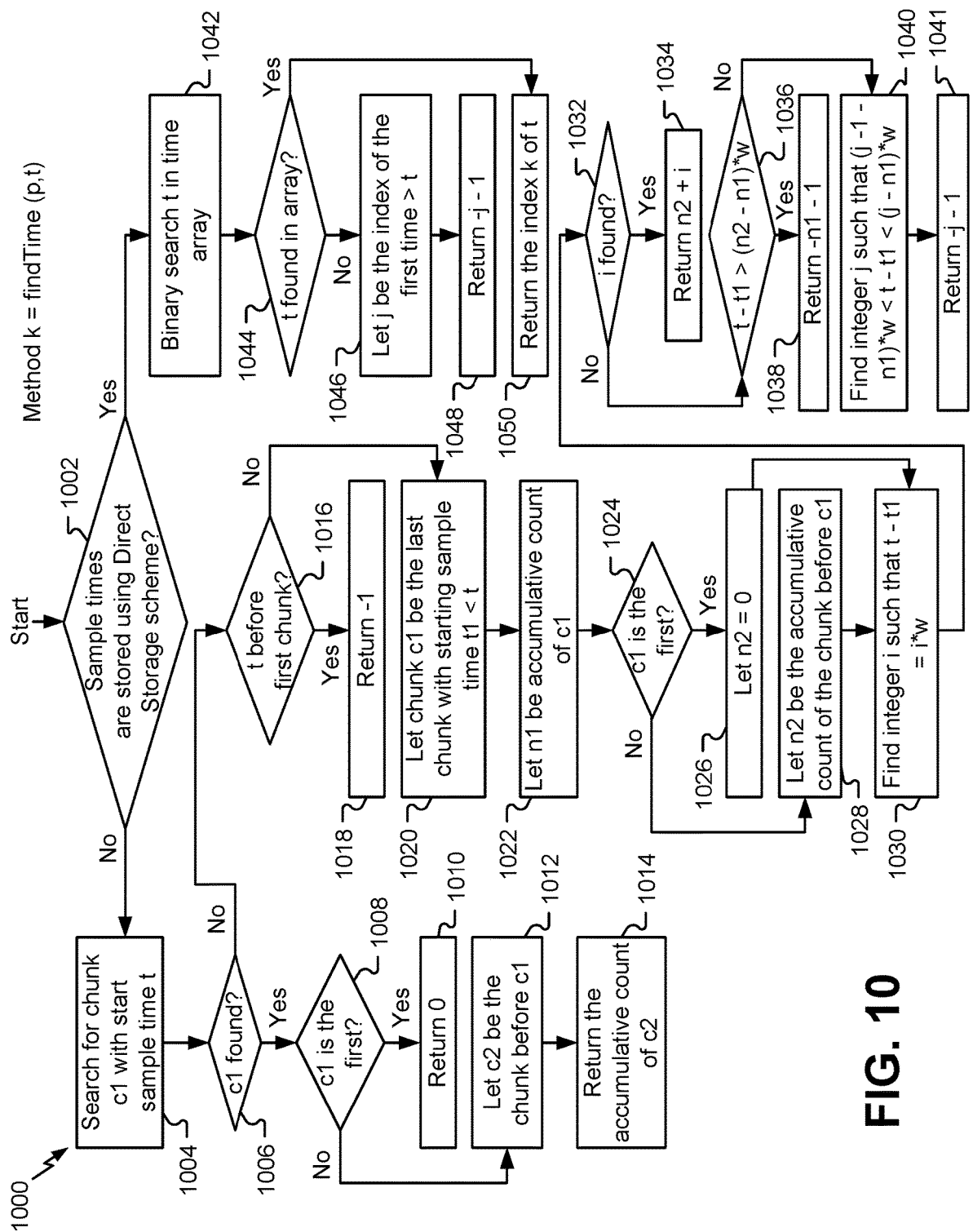
FIG. 10 is a flow chart of an example of a method of accessing stored sensor data.

FIG. 10 illustrates a method 1000 of accessing stored sensor data. The method 1000 enables determination of an index of sample of a selected parameter that has a selected sample time. In some implementations, the method 1000 is performed by the processor 110 to access data, such as the sensor data 108 (or portions thereof), stored in the memory 130 of FIG. 1. In a particular implementation, the method 1000 is performed during execution of a "k=findTime (p, t)"

instruction. In this implementation, execution of the instruction returns the index k of a sample of the parameter p that has the sample time t, or a negative value if no such sample of the parameter p is stored.

The method 1000 includes determining whether the sample times corresponding to the parameter p are stored in accordance with the direct storage scheme, at 1002. For example, the processor 110 determines whether sample times corresponding to the parameter p are stored in the memory 130 in accordance with the direct storage scheme 400 of FIG. 4. If the samples times are stored in accordance with the direct storage scheme, the method 1000 continues to 1042, and a binary search of the array (e.g., the data structure) storing sample times is performed for the sample time t. For example, the processor 110 of FIG. 1 performs a binary search of the fourth data structure 402 for the sample time t. The method 1000 includes determining whether the sample time t is found in the array, at 1044. If the sample time t is found, the method 1000 continues to 1050, and the index k of the entry having the sample time t is returned. The method 1000 terminates at 1050. If the sample time is not found at 1044, the method 1000 proceeds to 1046, and j is set equal to the index of the first sample having a sample time that is greater than the sample time t. For example, the processor 110 determines the first entry of the fourth data structure 402 of FIG. 2 that has a sample time that is greater than the sample time t. The method 1000 also includes returning −j−1, at 1048. The method 1000 terminates at 1048.

Returning to 1002, if the sample times corresponding to the parameter p are not stored in accordance with the direct storage scheme (e.g., the sample times are stored in accordance with the split compact storage scheme), the method 1000 proceeds to 1004, and a chunk c1 having a starting sample time equal to the sample time t is searched for. For example, the processor 110 performs a binary search on the second data structure 304 of FIG. 3 to search for a chunk (e.g., an entry) having a starting sample time (e.g., starting timestamp) equal to the sample time t. The method 1000 includes determining whether c1 is found, at 1006. If c1 is found (e.g., if a chunk exists that has a starting sample time equal to the sample time t), the method 1000 continues to 1008, and it is determined whether c1 is the first chunk. For example, the processor 110 determines whether c1 is the first chunk (e.g., the first entry) in the second data structure 304 of FIG. 3. If c1 is the first chunk, the method 1000 proceeds to 1010, and 0 is returned. The method 1000 terminates at 1010. If c1 is not the first chunk, the method 1000 proceeds to 1012, and a chunk c2 that precedes the chunk c1 is identified. For example, the processor 110 identifies c2 as the chunk (e.g., the entry) that precedes c1 in the second data structure 304. The method 1000 also includes returning the accumulative time count of c2, at 1014. The method 1000 terminates at 1014.

Returning to 1006, if c1 is not found, the method 1000 proceeds to 1016, and it is determined whether the sample time t is before the first chunk. For example, the processor 110 determines whether sample time t is less than the starting sample time of the first chunk (e.g., the first entry) of the second data structure 304 of FIG. 3. If the sample time t is before the starting sample time of the first chunk, the method 1000 continues to 1018, and −1 is returned. The method 1000 terminates at 1018. If the sample time t is not before the starting sample time of the first chunk, the method 1000 proceeds to 1020, and chunk c1 is identified as the chunk with the largest starting sample time t1 that is less than the sample time t. For example, the processor 110 identifies the chunk (e.g., the entry) of the second data structure 304 of FIG. 3 having the largest (e.g., latest) starting sample time t1 that is less than (e.g., before) the sample time t.

The method 1000 includes setting n1 equal to the accumulative time count of c1, at 1022. The method 1000 includes determining whether c1 is the first chunk, at 1024. For example, the processor 110 determines whether c1 is the first chunk (e.g., the first entry) in the second data structure 304 of FIG. 3. If c1 is the first chunk, the method 1000 continues to 1026, and n2 is set equal to 0. If c1 is not the first chunk, the method 1000 proceeds to 1028, and n2 is set equal to the accumulative time count of the chunk before c1.

The method 1000 proceeds, either from 1026 or 1028, to 1030, and an integer i is searched for such that t−t1 equals i*w. For example, the processor 110 determines whether t−t1 is fully divisible (e.g., divisible with no remainder) by the dominating sample window w. t−t1 is fully divisible if (t−t1)/w or (t−t1)/(i*w) does not result in a remainder. In a particular implementation, the dominating sampling window w is equal to the inverse of the dominating sampling rate 302 of FIG. 3. The method 1000 includes determining whether i is found, at 1032. For example, the processor determines whether there is any integer i (including 1) such that t−t1 equals i*w. If i is found (e.g., t−t1 is fully divisible by w), the method 1000 continues to 1034, and n2+i is returned. The method 1000 terminates at 1034.

If i is not found (e.g., t−t1 is not fully divisible by w), the method 1000 proceeds to 1036, and it is determined whether t−t1 is greater than (n2−n1)*w. If t−t1 is greater than (n2−n1)*w, the method 1000 continues to 1038, and −n1−1 is returned. The method 1000 terminates at 1038. If t−t1 is less than or equal to (n2−n1)*w, the method 1000 proceeds to 1040, and an integer j is identified such that (j−1−n1)*w is less than t−t1 and t−t1 is less than (j−n1)*w. The method 1000 also includes returning −j−1, at 1041. The method 1000 terminates at 1041.

In this manner, the method 1000 enables determination of an index value of a sample of the parameter p having the sample time t or a negative value that is used to estimate a parameter value that corresponds to the sample time t if no sample having the sample time t exists. Estimation of the parameter value is further described with reference to FIG. 11.

Figure 11:
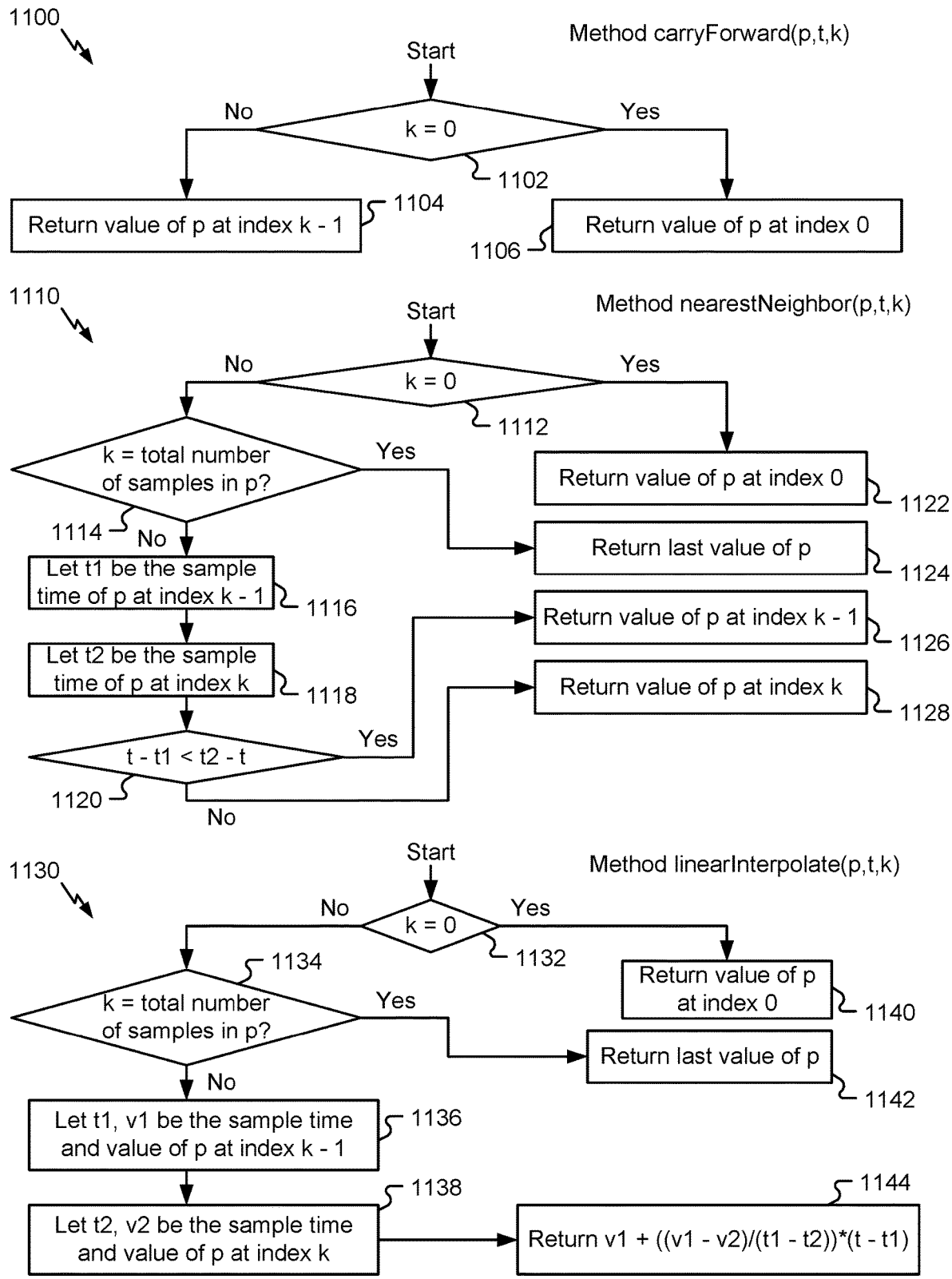
FIG. 11 includes flow charts of example methods of estimating sample values based on stored sensor data.

FIG. 11 illustrates methods of estimating a sample value based on stored sensor data. In some implementations, the methods are performed by the processor 110 to estimate sample values (e.g., parameter values) based on stored sensor data, such as the sensor data 108 (or portions thereof), stored in the memory 130 of FIG. 1.

FIG. 11 illustrates a method 1100 of carry forward estimation. In a particular implementation, the method 1100 is performed during execution of a "carryForward (p, t, k)" instruction. In this implementation, an estimation of the sample value (e.g., parameter value) of a sample of the parameter p having the sample time t and the anchoring index k is returned.

The method 1100 includes determining whether k is equal to 0, at 1102. For example, the processor 110 of FIG. 1 determines whether k is equal to 0. If k is not equal to 0, the method 1100 continues to 1104, and the parameter value of the parameter p at index k−1 is returned. For example, the processor 110 executes the v=getValue (p, k−1) instruction, as described with reference to the method 920 of FIG. 9, and v is returned. In this manner, the parameter value of the sample before the sample time t is "carried forward" as the estimation. The method 1100 terminates at 1104. If k is equal to 0, the method 1100 proceeds to 1106, and the parameter value of the parameter p at index 0 is returned. For example, the processor 110 executes the v=getValue (p, 0) instruction, as described with reference to the method 920 of FIG. 9, and v is returned. In this manner, k=0 is a special case in which the parameter value of the first sample of the parameter p is "carried backward" as the estimation if the sample time t is before the starting sample time of any stored chunk. The method 1100 terminates at 1106.

FIG. 11 also illustrates a method 1110 of nearest neighbor estimation. In a particular implementation, the method 1110 is performed during execution of a "nearestNeighbor (p, t, k)" instruction. In this implementation, an estimation of the sample value (e.g., parameter value) of a sample of the parameter p having the sample time t and the anchoring index k is returned.

The method 1110 includes determining whether k is equal to 0, at 1112. For example, the processor 110 of FIG. 1 determines whether k is equal to 0. If k is equal to 0, the method 1110 proceeds to 1122, and the value of p at index 0 is returned. For example, the processor 110 executes the v=getValue (p, 0) instruction, as described with reference to the method 920 of FIG. 9, and v is returned. In this manner, k=0 is a special case in which the parameter value of the first sample is "carried backward" as the estimation for situations in which the sample time t is before the staring sample time of any stored sample. The method 1110 terminates at 1122.

If k is not equal to 0, the method 1110 continues to 1114, and it is determined if k is equal to the total number of stored samples corresponding to the parameter p. If k is equal to the total number of stored samples corresponding to the parameter p, the method 1110 proceeds to 1124, and the parameter value of the last stored sample is returned. For example, the processor 110 executes the v=getValue (p, num_samples) instruction, as described with reference to the method 920 of FIG. 9, and v is returned. In this manner, k=total number of stored samples is a special case in which the parameter value of the last sample is "carried forward" as the estimation for situations in which the sample time t is after the ending sample time of any stored sample. The method 1110 terminates at 1124.

If k is not equal to the total number of stored samples corresponding to the parameter p, the method 1110 proceeds to 1116, and t1 is set equal to the sample time (e.g., the timestamp) of the sample of the parameter p at index k−1. For example, the processor 110 executes the instruction t1=getTime (p, k−1), as described with reference to the method 900 of FIG. 9. The method 1110 includes setting t2 equal to the sample time (e.g., the timestamp) of the sample of the parameter p at index k, at 1118. For example, the processor 110 executes the instruction t2=getTime (p, k), as described with reference to the method 900 of FIG. 9.

The method 1110 includes determining whether t−t1 is less than t2−t, at 1120. If t−t1 is less than t2−t, the method 1110 continues to 1126, and the value of p at index k−1 is returned. For example, the processor 110 executes v=getValue (p, k−1), as described with reference to the method 920 of FIG. 9, and v is returned. The method 1110 terminates at 1126. If t−t1 is greater than or equal to t2−t, the method 1110 proceeds to 1128, and the parameter value of the sample of the parameter p at index k is returned. For example, the processor 110 executes v=getValue (p, k), as described with reference to the method 920 of FIG. 9, and v is returned. The method 1110 terminates at 1128.

FIG. 11 also illustrates a method 1130 of linear interpolation estimation. In a particular implementation, the method 1130 is performed during execution of a "linearinterpolate (p, t, k)" instruction. In this implementation, an estimation based on linear interpolation of the sample value (e.g., parameter value) of a sample of the parameter p having the sample time t and the anchoring index k is returned.

The method 1130 includes determining whether k is equal to 0, at 1132. For example, the processor 110 of FIG. 1 determines whether k is equal to 0. If k is equal to 0, the method 1130 proceeds to 1140, and the value of p at index 0 is returned. For example, the processor 110 executes the v=getValue (p, 0) instruction, as described with reference to the method 920 of FIG. 9, and v is returned. In this manner, k=0 is a special case in which the parameter value of the first sample is "carried backward" as the estimation for situations in which the sample time t is before the staring sample time of any stored sample. The method 1130 terminates at 1140.

If k is not equal to 0, the method 1130 continues to 1134, and it is determined if k is equal to the total number of stored samples corresponding to the parameter p. If k is equal to the total number of stored samples corresponding to the parameter p, the method 1130 proceeds to 1142, and the parameter value of the last stored sample is returned. For example, the processor 110 executes the v=getValue (p, num_samples) instruction, as described with reference to the method 920 of FIG. 9, and v is returned. In this manner, k=total number of stored samples is a special case in which the parameter value of the last sample is "carried forward" as the estimation for situations in which the sample time t is after the ending sample time of any stored sample. The method 1130 terminates at 1142.

If k is not equal to the total number of stored samples corresponding to the parameter p, the method 1130 proceeds to 1136, and t1 is set equal to the sample time (e.g., the timestamp) of the sample of the parameter p at index k−1. For example, the processor 110 executes the instruction t1=getTime (p, k−1), as described with reference to the method 900 of FIG. 9, and the instruction v1=getValue (p, k−1), as described with reference to the method 920 of FIG. 9. The method 1130 includes setting t2 equal to the sample time (e.g., the timestamp) of the sample of the parameter p at index k, at 1138. For example, the processor 110 executes the instruction t2=getTime (p, k), as described with reference to the method 900 of FIG. 9, and the instruction v2=getValue (p, k), as described with reference to the method 920 of FIG. 9.

The method 1130 includes returning v1+((v1−v2)/(t1−t2))*(t−t1), at 1144. For example, the processor 110 estimates a parameter value corresponding to the sample time t by linear interpolation based on the sample times and parameter values corresponding to index k−1 and index k. The method 1130 terminates at 1144.

Thus, FIG. 11 illustrates various methods of estimating parameter values corresponding to sample times for which no samples of the parameter p are stored. The estimated parameter values may be used to perform various data analytics tasks on the stored sensor data.

Figure 12A:
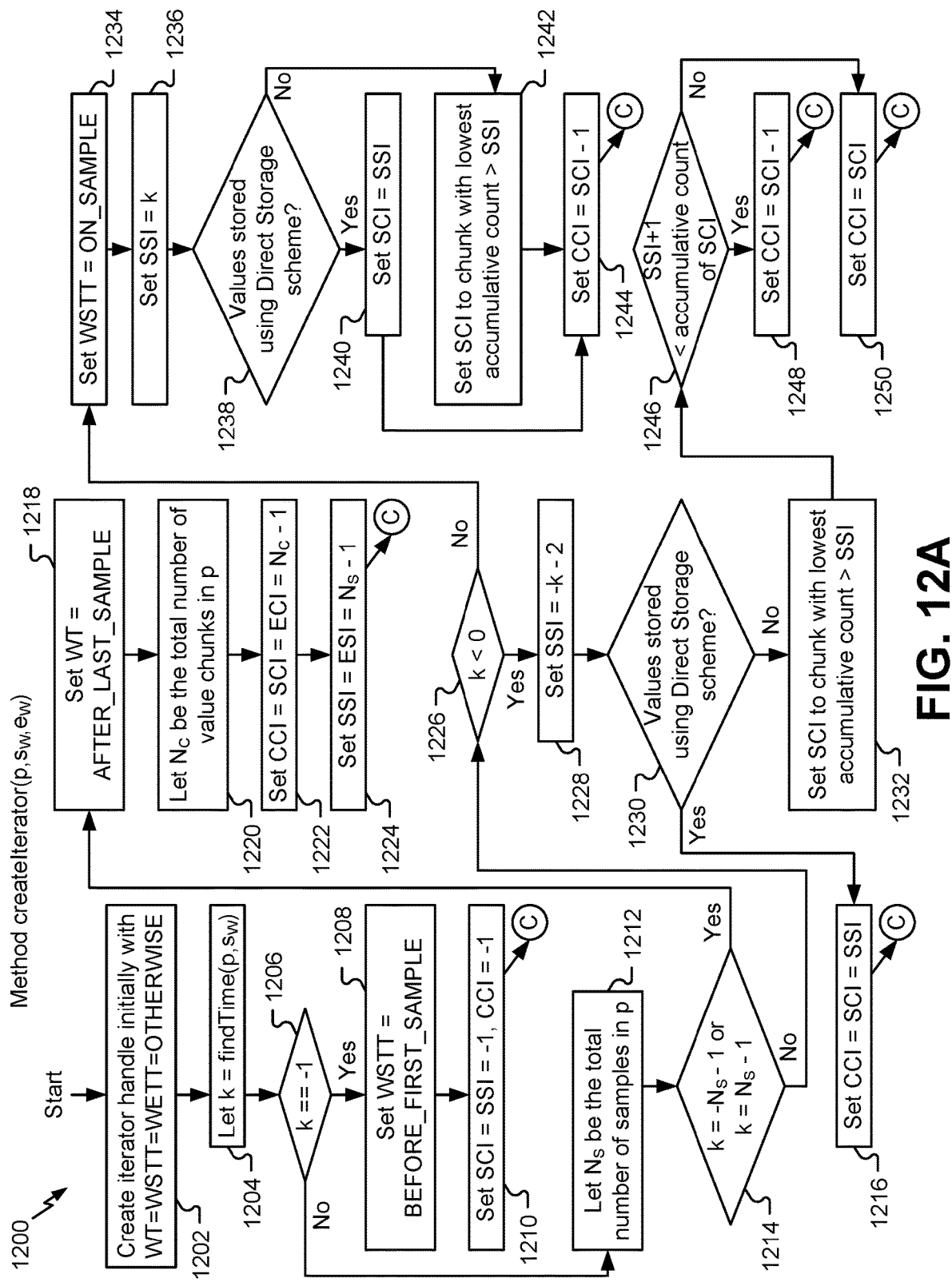
FIGS. 12A and 12B are a flow chart of an example of a method of creating an iterator handle.
Figure 12B:
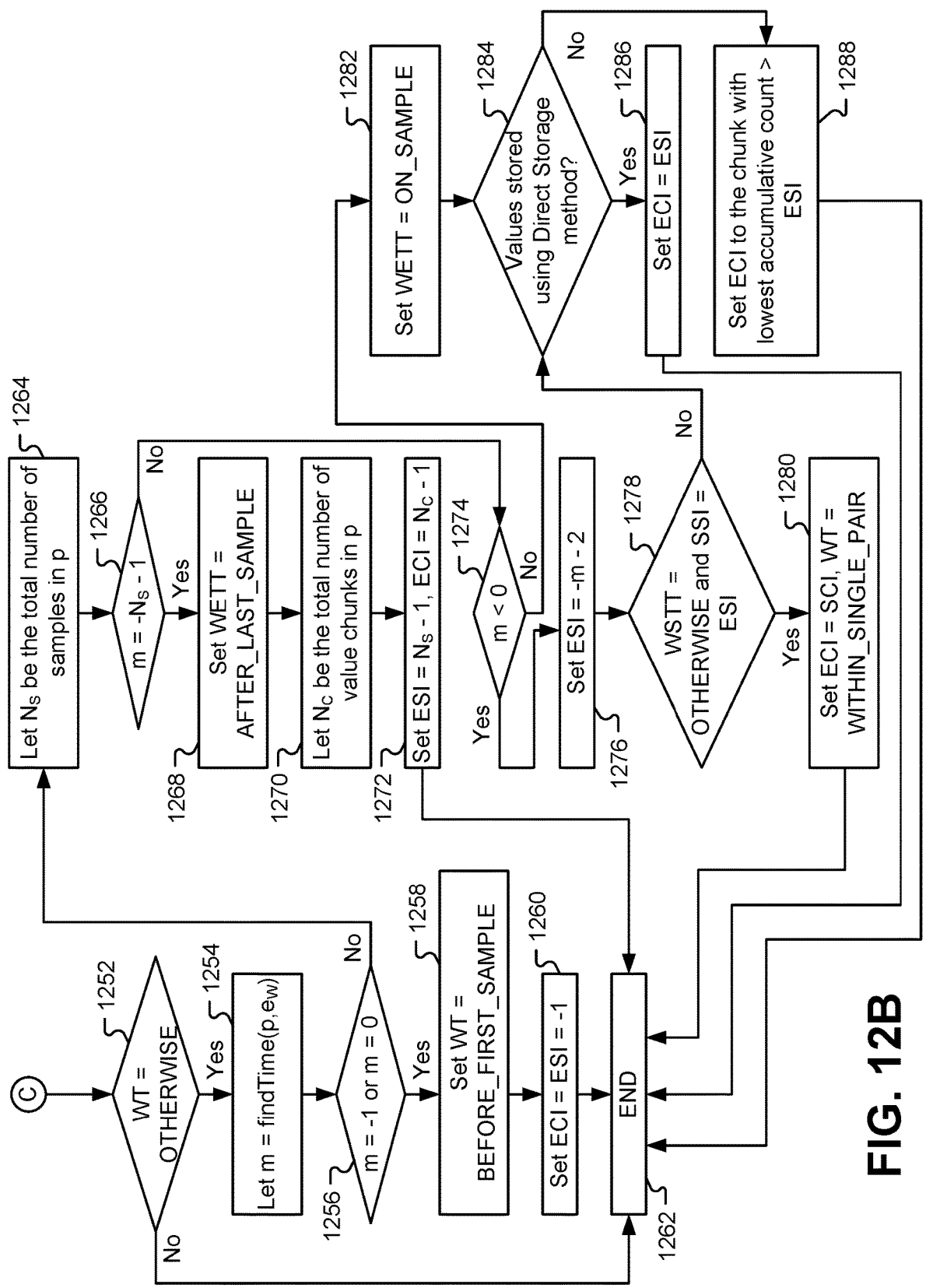

FIGS. 12A and 12B illustrate a method 1200 of creating an iterator handle. In some implementations, the method 1200 is performed by the processor 110 to generate (or designate) the iterator handle 120 of FIG. 1. In a particular implementation, the method 1200 is performed during execution of a "createIterator (p, $s_w$, $e_w$)" instruction. In this implementation, the iterator handle is created for stored sensor data corresponding to the parameter p and corresponding to samples having sample times within a time window that begins at a starting time $s_w$ and that ends at an ending time $e_w$. In a particular implementation, the starting time $s_w$ of the time window is inclusive (e.g., samples that have a starting sample time that is the same as the starting time $s_w$ are included) and the ending time $e_w$ is exclusive (e.g., samples that have a starting sample time that is the same as the ending time $e_w$ are not included). In a particular implementation, the starting time $s_w$ and the ending time $e_w$ are indicated by input from a user interface device, such as the input 142 from the interface device 140 of FIG. 1.

In a particular implementation, the iterator handle includes or corresponds to an object in an object-oriented programming language that is defined to traverse samples of stored sensor data that correspond to the time window. The iterator handle keeps track of information related to the stored sensor data that enables a user to traverse the stored sensor data corresponding to the time window. For example, the iterator handle is associated with one or more functions (or instructions) that access samples of the stored sensor data corresponding to the time window or that perform analysis on the samples that correspond to the time window. The iterator handle enables specific analytics tasks. For example, an iterator handle can be defined for engine parameters for a time window within two minutes of engine start, which enables analysis of engine startup conditions.

In at particular implementation, the iterator handle keeps track of the following information: window type (WT), window starting time type (WSTT), window ending time type (WETT), starting sample index (SSI), ending sample index (ESI), starting chunk index (SCI), ending chunk index (ECI), and current chunk index (CCI). WT can be one of four types: BEFORE_FIRST_SAMPLE—the entirety of the time window is before the sample time of the first stored sample of the parameter p, i.e., $e_w <= t$ for the sample time t of all stored samples of the parameter p; AFTER_LAST_ SAMPLE—the entirety of the time window is no earlier than the sample time of the last stored sample, i.e., $s_w >= t$ for the sample time t of all stored samples of the parameter p; WITHIN_SINGLE_PAIR—the entirety of the time window is in between the samples times of two consecutive pairs of stored samples (in ascending time order) for the parameter p; and OTHERWISE—at least one stored sample of the parameter p has a sample time t such that $s_w < t < e_w$.

WSTT can be one of three types: BEFORE_FIRST_ SAMPLE—$s_w$ is before the sample time of the first stored sample of the parameter p; ON_SAMPLE—$s_w$ is the same as the sample time of at least one stored sample of the parameter p; and OTHERWISE—$s_w$ is between two consecutive pairs of stored samples (in ascending time order) for the parameter p. WETT can be one of three types: AFTER_ LAST_SAMPLE—$e_w$ is after the sample time of the last stored sample of the parameter p; ON_SAMPLE—$e_w$ is the same as the sample time of at least one stored sample of the parameter p; and OTHERWISE—$e_w$ is between two consecutive pairs of the stored samples (in ascending time order) of the parameter p. WSTT and WETT are meaningful only if WT is OTHERWISE.

SSI is the index of the stored sample having the latest sample time that is less than or equal to $s_w$. For example, getTime (SSI)$<= s_w <$ getTime (SSI+1), assuming getTime (−1) returns negative infinity and getTime ($N_S$) returns positive infinity, where $N_S$ is the total number of stored samples that correspond to the parameter p. ESI is the index of the stored sample having the latest sample time that is less than or equal to $e_w$. For example, getTime (ESI) $<= e_w <$ getTime (ESI+1).

SCI is determined as follows: if parameter values of the parameter p are stored in accordance with the direct storage scheme, SCI is the same as SSI; otherwise (e.g., if parameter values of the parameter p are stored in accordance with the split compact method), SCI is the index of the first parameter value chunk having an accumulative value count that is greater than SSI. ECI is determined as follows: if parameter values of the parameter p are stored in accordance with the direct storage scheme, ECI is the same as ESI; otherwise (e.g., if parameter values of the parameter p are stored in accordance with the split compact method), ECI is the index of the first parameter value chunk having an accumulative value count that is greater than ESI. CCI is the index of the "current chunk" (e.g., the chunk being accessed or analyzed by the iterator handle).

The method 1200 includes creating an iterator handle with WT, WSTT, and WETT initialized to OTHERWISE, at 1202. The method 1200 includes determining an index k based on $s_w$, at 1204. For example, the processor 110 executes the instruction k=findTime (p, $s_w$), as described with reference to FIG. 10. The method 1200 includes determining whether k is equal to −1, at 1206. If k is equal to −1, the method 1200 continues to 1208, and WSTT is set to BEFORE_FIRST_SAMPLE. The method 1200 also includes setting SCI and SSI equal to −1 and setting CCI equal to −1, at 1210. CCI may be equal to −1 when an iterator handle is formed, however, CCI will be changed to 0 by the first execution of a next instruction, as further described herein. After the values of SSI, SCI, and CCI are set, the method 1200 proceeds to 1252.

Returning to 1206, if k is not equal to −1, the method 1200 proceeds to 1212, and the total number of stored samples $N_S$ that correspond to the parameter p is determined. The method 1200 also includes determining whether k is equal to $−N_S − 1$ or whether k is equal to $N_S − 1$, at 1214. If k is equal to $−N_S − 1$ or $N_S − 1$, the method 1200 continues to 1218, and WT is set to AFTER_LAST_SAMPLE. The method 1200 also includes setting $N_C$ equal to the total number of stored parameter value chunks corresponding to the parameter p (e.g., if the parameter values of the parameter p are stored in accordance with the split compact storage scheme), at 1220. The method 1200 includes setting CCI, SCI, and ECI equal to $N_C − 1$, at 1222. The method 1200 includes setting SSI and ESI equal to $N_S − 1$, at 1224. After the values of SSI and ESI are set, the method 1200 proceeds to 1252.

Returning to 1214, if k is not equal to $−N_S − 1$ or $N_S − 1$, the method 1200 proceeds to 1226, and it is determined whether k is less than 0. If k is less than 0, the method 1200 proceeds to 1228, and SSI is set equal to −k−2. The method 1200 also includes determining whether parameter values corresponding to the parameter p are stored in accordance with the direct storage method, at 1230. For example, the processor 110 of FIG. 1 determines whether the parameter values are stored in accordance with the direct storage scheme 400 of FIG. 4 (e.g., using the fourth data structure 402). If the parameter values are stored using the direct storage scheme, the method 1200 continues to 1216, CCI and SCI are set equal to SSI. After CCI and SCI are set, the method 1200 proceeds to 1252. If the parameter values are not stored in accordance with the direct storage scheme (e.g., the parameter values are stored in accordance with the split compact storage scheme), the method 1200 proceeds to 1232 and SCI is set to the index of the first parameter value chunk having an accumulative value count that is greater than SSI. For example, the processor 110 searches the third data structure 306 of FIG. 3 for the first entry (e.g., chunk) having an accumulative value count that is greater than SSI, and SCI is set equal to the index of the identified chunk. The method 1200 also includes determining whether SSI+1 is less than the accumulative value count corresponding to SCI, at 1246. If SSI+1 is less than the accumulative value count corresponding to SCI, the method 1200 continues to 1248, and CCI is set equal to SCI−1. After the value of CCI is set, the method 1200 proceeds to 1252. If SSI+1 is not less than the accumulative value count corresponding to SCI, the method 1200 continues to 1250, and CCI is set equal to SCI. After setting the value of CCI, the method 1200 continues to 1252.

Returning to 1226, if k is greater than or equal to 0, the method 1200 proceeds to 1234, and WSTT is set to ON_SAMPLE. The method 1200 also includes setting SSI equal to k, at 1236. The method 1200 includes determining whether parameter values corresponding to the parameter p are stored in accordance with the direct storage scheme, at 1238. For example, the processor 110 of FIG. 1 determines whether the parameter values are stored in accordance with the direct storage scheme 400 of FIG. 4 (e.g., using the fourth data structure 402). If the parameter values are stored in accordance with the direct storage scheme, the method 1220 continues to 1240, and SCI is set equal to SSI. After setting the value of SCI, the method 1200 proceeds to 1244, and CCI is set equal to SCI−1. After setting the value of CCI, the method 1200 proceeds to 1252.

Returning to 1238, if the parameter values are not stored in accordance with the direct storage scheme (e.g., if the parameter values are stored in accordance with the split compact storage scheme), the method 1200 proceeds to 1242, and SCI is set equal to the index of the chunk having the lowest accumulative value count that is greater than SSI. For example, the processor 110 searches the third data structure 306 of FIG. 3 for the first entry (e.g., chunk) having an accumulative value count that is greater than SSI, and SCI is set equal to the index of the identified chunk. The method 1200 also includes setting CCI equal to SCI−1, at 1244. After setting the value of CCI, the method 1200 proceeds to 1252.

The method 1200 includes determining whether WT is OTHERWISE, at 1252. If WT is not OTHERWISE, the method 1200 terminates at 1262. If WT is OTHERWISE, the method 1200 continues to 1254, and an index m is determined based on $e_w$. For example, the processor 110 executes the instruction m=findTime (p, $e_w$), as described with reference to FIG. 10. If m is equal to −1 or 0 at 1256, the method 1200 continues to 1258, and WT is set to BEFORE_FIRST_SAMPLE. The method 1200 includes setting ECI and ESI equal to −1, at 1260. After setting the values of ECI and ESI, the method 1200 terminates at 1262.

Returning to 1256, if m is not equal to −1 or 0, the method 1200 proceeds to 1264, and $N_S$ is set equal to the total number of stored samples that correspond to the parameter p. The method 1200 also includes determining whether m is equal to −$N_S$−1, at 1266. If m is equal to −$N_S$−1, the method 1200 continues to 1268, and WETT is set to AFTER_LAST_SAMPLE. The method 1200 also includes determining the total number of stored parameter value chunks $N_C$ that correspond to the parameter p, at 1270. For example, the processor 110 determines the total number of entries in the third data structure 306 of FIG. 3. The method 1200 includes setting ESI equal to $N_S$−1 and setting ECI equal to $N_C$−1, at 1272. After setting the values of ESI and ECI, the method 1200 terminates at 1262.

Returning to 1266, if m is not equal to −$N_S$−1, the method 1200 proceeds to 1274, and it is determined whether m is less than 0. If m is less than 0, the method 1200 continues to 1276, and ESI is set equal to −m−2. The method 1200 also includes determining whether WSTT is OTHERWISE and whether SSI is equal to ESI, at 1278. If WSTT is OTHERWISE and SSI is equal to ESI, the method 1200 continues to 1280, ECI is set equal to SCI, and WT is set to WITH-IN_SINGLE_PAIR. After the values of ECI and WT are set, the method 1200 terminates at 1262. If WSTT is not OTHERWISE or if SSI is not equal to ESI at 1278, the method 1200 proceeds to 1284, and it is determined whether parameter values corresponding to the parameter p are stored using the direct storage scheme. If the parameter values are stored in accordance with the direct storage scheme, the method 1200 continues to 1286, and ECI is set equal to ESI. After setting the value of ECI, the method 1200 terminates at 1262. If the parameter values are not stored in accordance with the direct storage scheme at 1284 (e.g., the parameter values are stored in accordance with the split compact storage scheme), the method 1200 proceeds to 1288, and ECI is set equal to the index of the parameter value chunk with the lowest accumulative value count that is greater than ESI. For example, the processor 110 identifies the first entry (e.g., chunk) of the third data structure 306 of FIG. 3 having an accumulative value count that is greater than ESI. After setting the value of ECI, the method 1200 terminates at 1262.

Returning to 1274, if m is greater than or equal to 0, the method 1200 proceeds to 1282, and WETT is set to ON_SAMPLE. The method 1200 proceeds to 1284, and the above-described operations are performed in association with steps 1284 and 1286 or 1288 before termination of the method 1200 at 1262.

Thus, the method 1200 enables creation of an iterator handle that maintains track of various information (e.g., WT, WSTT, WETT, SSI, ESI, SCI, ECI, and CCI) that are associated with stored samples of the parameter p that correspond to the time window indicated by $s_w$ and $e_w$. The iterator handle can "loop through" (e.g., traverse) the stored samples of the parameter p that correspond to the time window and can enable performance of various analytics tasks. The iterator handle is also able to handle chunks that are partially covered by the time window, or portions of the time window that contain no samples. Additionally, the iterator handle is able to access stored samples corresponding to the time window in at most O (L) computation time, where L is the total number of chunks associated with the iterator handle. This represents a reduction in processing time (e.g., an increase in processing speed) from O (N) computation time, where N is the total number of samples that are associated with the iterator handle. Additionally, a variety of functions or operations can be defined with respect to the iterator handle, as described with reference to FIGS. 13 and 14.

Figure 13:
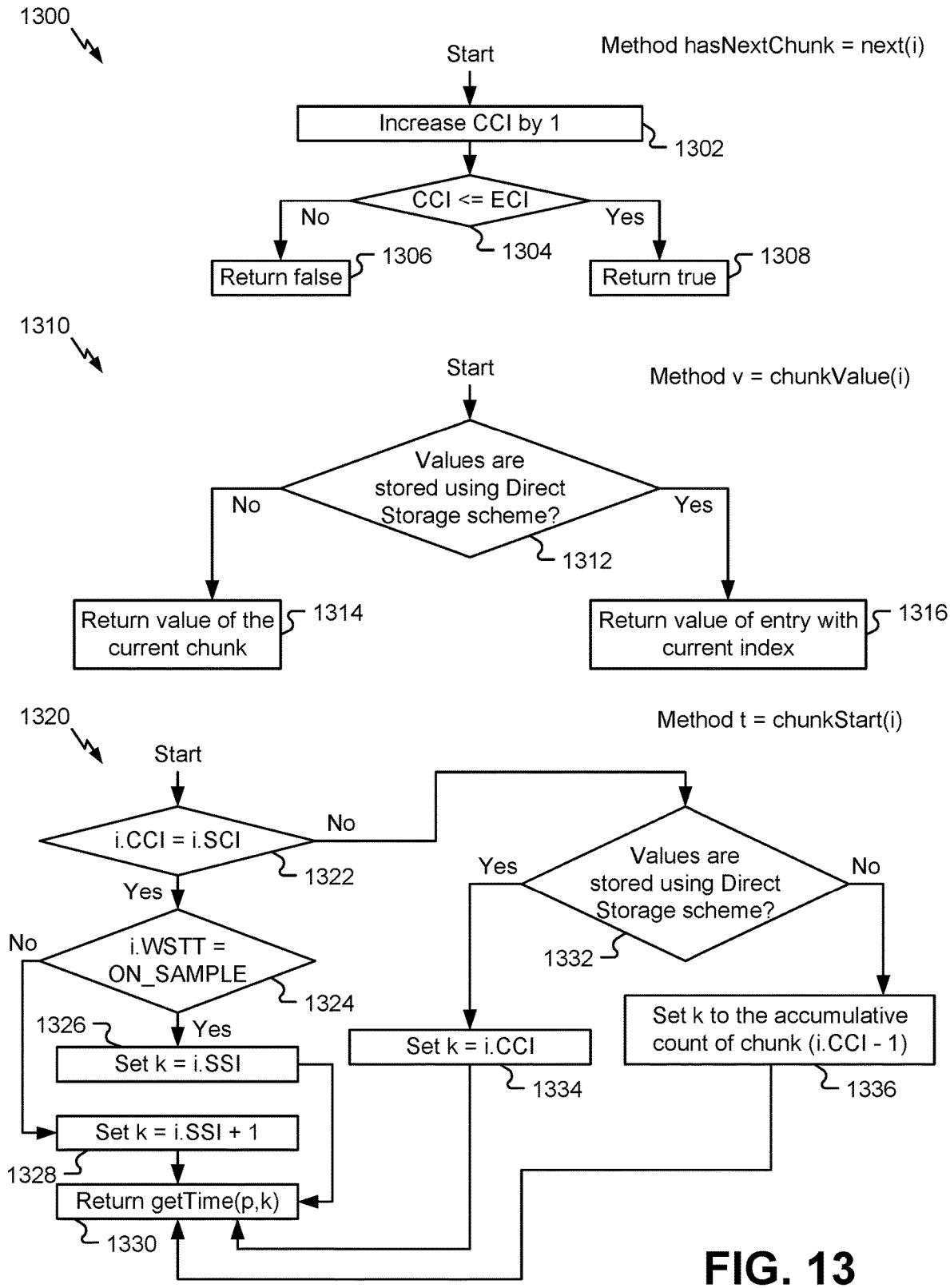
FIG. 13 includes flow charts of example methods of accessing stored sensor data supported by the iterator handle of FIGS. 12A and 12B.

FIG. 13 illustrates methods of accessing stored sensor data supported by the iterator handle described with reference to FIGS. 12A and 12B. In some implementations, the methods of FIG. 13 are performed by the processor 110 in association with the iterator handle 120 to access or analyze the sensor data 108 (or a portion thereof) stored in the memory 130 of FIG. 1.

FIG. 13 illustrates a method 1300 of determining whether a next chunk exists with respect to a current chunk indicated by an iterator handle. In a particular implementation, the method 1300 is performed during execution of a "hasNextChunk=next (i)" instruction. In this implementation, a Boolean value is returned that indicates whether there is at least one more stored parameter value chunk after the chunk having an index equal to CCI of the iterator handle i.

The method 1300 includes increasing CCI of the iterator handle i by 1, at 1302. In this manner, the iterator handle i advances through the stored parameter value chunks by 1. The method 1300 includes determining whether CCI of the iterator handle i is less than or equal to ECI of the iterator handle i, at 1304. If CCI of the iterator handle i is not less than or equal to ECI of the iterator handle i (e.g., CCI>ECI), the method 1300 continues to 1306, and false is returned. In this manner, if advancing CCI i by 1 causes CCI to match (or exceed) ECI, then CCI is the index of the last parameter value chunk analyzed by the iterator handle i (e.g., the last parameter value chunk corresponding to a time window associated with the iterator handle i), and false is returned. If CCI of the iterator handle i is less than or equal to ECI of the iterator handle i, the method 1300 proceeds to 1308, and true is returned. In this manner, if there is still at least one stored parameter value chunk subsequent to the chunk having an index equal to CCI, then true is returned.

FIG. 13 also illustrates a method 1310 of determining a current parameter value (e.g., sample value) indicated by an iterator handle. In a particular implementation, the method 1310 is performed during execution of a "v=chunkValue (i)" instruction. In this implementation, a parameter value corresponding to a current chunk (if parameter values are stored in accordance with the split compact storage scheme) indicated by the iterator handle i is returned as parameter value v.

The method 1310 includes determining whether values are stored in accordance with the direct storage scheme, at 1312. For example, the processor 110 determines whether parameter values corresponding to a parameter associated with the iterator handle i (e.g., the parameter p of FIGS. 12A and 12B) are stored in accordance with the direct storage scheme 400 of FIG. 4. If the parameter values are not stored in accordance with the direct storage scheme (e.g., the parameter values are stored in accordance with the split compact storage scheme), the method 1310 continues to 1314, and the parameter value associated with the stored parameter value chunk having an index equal to CCI of the iterator handle i is returned. If the parameter values are stored in accordance with the direct storage scheme, the method 1310 proceeds to 1316, and the parameter value having an index equal to CCI is returned.

FIG. 13 also illustrates a method 1320 of determining a sample time (e.g., a timestamp) of a first sample of a current chunk indicated by an iterator handle. In a particular implementation, the method 1320 is performed during execution of a "t=chunkStart (i)" instruction. In this implementation, a sample time corresponding to a first sample of a parameter value chunk (if parameter values are stored in accordance with the split compact storage scheme) corresponding to CCI of the iterator handle i is returned as sample time t.

The method 1320 includes determining whether CCI of the iterator handle i is equal to SCI of the iterator handle i, at 1322. If CCI is equal to SCI, the method 1320 continues to 1324, and it is determined whether WSTT of the iterator handle i is ON_SAMPLE. If WSTT is ON_SAMPLE, the method 1320 continues to 1326, and k is set equal to SSI of the iterator handle i. The method 1320 also includes returning a sample time corresponding to the index k, at 1330. For example, the processor 110 executes returns a result of executing a getTime (p, k) instruction, as described with reference to FIG. 9, where p is the parameter the corresponds to the iterator handle i. Alternatively, if WSTT is not ON_SAMPLE, the method 1320 proceeds to 1328, and k is set equal to SSI+1. The method 1320 also includes returning a sample time corresponding to the index k (e.g., returning a result of executing a getTime (p, k) instruction), at 1330.

Returning to 1322, if CCI is not equal to SCI, the method 1320 proceeds to 1332, and it is determined whether parameter values are stored in accordance with the direct storage scheme. For example, the processor 110 determines whether parameter values corresponding to a parameter associated with the iterator handle i (e.g., the parameter p of FIGS. 12A and 12B) are stored in accordance with the direct storage scheme 400 of FIG. 4. If the parameter values are stored in accordance with the direct storage scheme, the method 1320 continues to 1334, and k is set equal to CCI of the iterator handle i. The method 1320 also includes returning a sample time corresponding to the index k (e.g., returning a result of executing a getTime (p, k) instruction), at 1330. If the parameter values are not stored in accordance with the direct storage scheme (e.g., the parameter values are stored in accordance with the split compact storage scheme), the method 1320 proceeds to 1336, and k is set equal to the accumulative count of a parameter value chunk having an index equal to CCI-1. The method 1320 also includes returning a sample time corresponding to the index k (e.g., returning a result of executing a getTime (p, k) instruction), at 1330.

Figure 14:
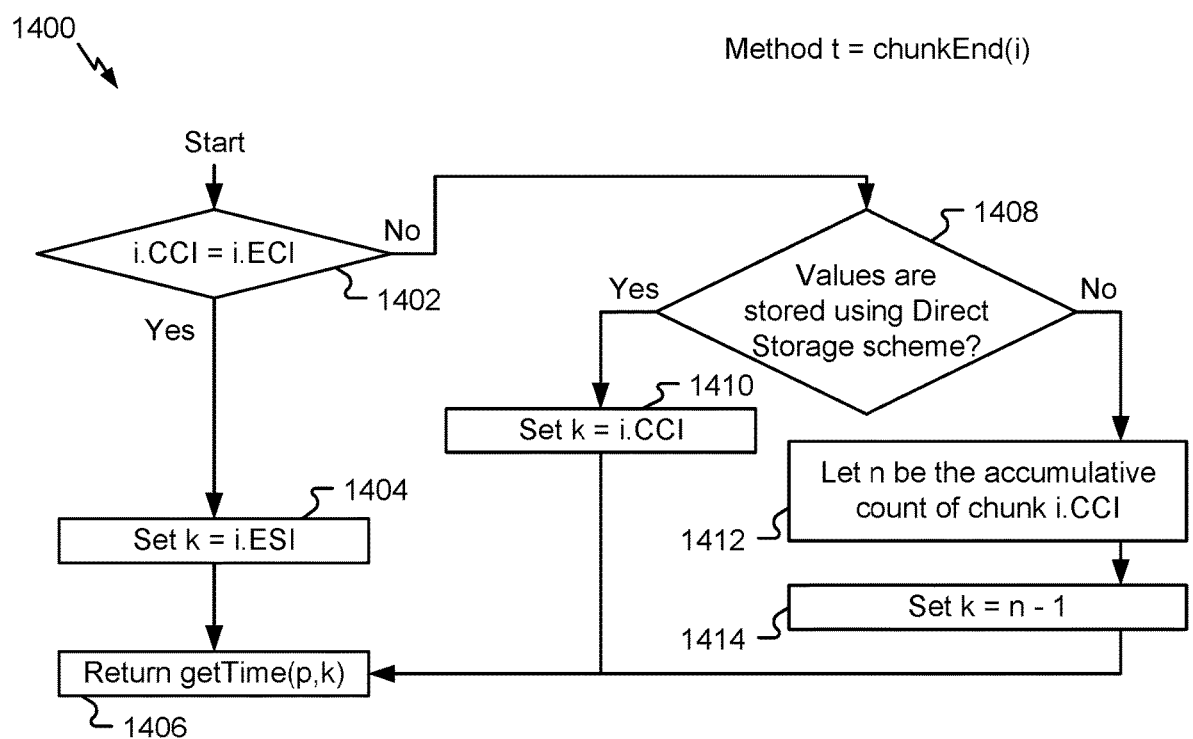
FIG. 14 is a flow chart of an example of a method of accessing stored sensor data supported by the iterator handle of FIGS. 12A and 12B.

FIG. 14 illustrates a method 1400 of accessing stored sensor data that is supported by the iterator handle described with reference to FIGS. 12A and 12B. In some implementations, the method 1400 is performed by the processor 110 in association with the iterator handle 120 of FIG. 1. The method 1400 includes a method of determining a sample time (e.g., a timestamp) of a last sample of a current chunk indicated by an iterator handle. In a particular implementation, the method 1400 is performed during execution of a "t=chunkEnd (i)" instruction. In this implementation, a sample time corresponding to a last sample of a parameter value chunk (if parameter values are stored in accordance with the split compact storage scheme) corresponding to CCI of the iterator handle i is returned as sample time t.

The method 1400 includes determining whether CCI of the iterator handle i is equal to ECI of the iterator handle i, at 1402. If CCI is equal to ECI, the method 1400 continues to 1404, and k is set equal to ESI of the iterator handle i. The method 1400 also includes returning a sample time corresponding to the index k, at 1406. For example, the processor 110 returns a result of executing a getTime (p, k) instruction, as described with reference to FIG. 9, where p is the parameter the corresponds to the iterator handle i.

Returning to 1402, if CCI is not equal to ECI, the method 1400 proceeds to 1408, and it is determined whether parameter values are stored in accordance with the direct storage scheme. For example, the processor 110 determines whether parameter values corresponding to a parameter associated with the iterator handle i (e.g., the parameter p of FIGS. 12A and 12B) are stored in accordance with the direct storage scheme 400 of FIG. 4. If the parameter values are stored in accordance with the direct storage scheme, the method 1400 continues to 1410, and k is set equal to CCI of the iterator handle i. The method 1400 also includes returning a sample time corresponding to the index k (e.g., returning a result of executing a getTime (p, k) instruction), at 1406. If the parameter values are not stored in accordance with the direct storage scheme (e.g., the parameter values are stored in accordance with the split compact storage scheme), the method 1400 proceeds to 1412, and n is set equal to the accumulative count of a parameter value chunk having an index equal to CCI. The method 1400 includes setting k equal to n-1, at 1414. The method 1400 also includes returning a sample time corresponding to the index k (e.g., returning a result of executing a getTime (p, k) instruction), at 1406.

Thus, FIGS. 13 and 14 illustrate examples of methods of accessing sample times or parameter values that may be performed using the iterator handle i of FIGS. 12A and 12B.

Use of the iterator handle may be easier for a user that is performing one or more analytic tasks based on the stored sensor data than accessing individual stored samples. In addition, other instructions (e.g., functions or operations) may be defined for use with the iterator handle i. As an example, execution of a v=startValue (i, o) instruction returns the parameter value of a sample having an index equal to o+SSI of the iterator handle i, where o is an offset value. In a particular implementation, the startValue instruction returns the result of getValue (p, i.SSI+o), where p is the parameter associated with the iterator handle i. As another example, execution of a v=endValue (i, o) instruction returns the parameter value of a sample having an index equal to o+ESI of the iterator handle i. In a particular implementation, the endValue instruction returns the result of getValue (p, i.ESI+o). As another example, execution of a t=startTime (i, o) instruction returns the sample time of a sample having an index equal to o+SSI of the iterator handle i. In a particular implementation, the startTime instruction returns the result of getTime (p, i.SSI+o). As another example, execution of a t=endTime (i, o) instruction returns the sample time of a sample having an index equal to o+ESI of the iterator handle i. In a particular implementation, the endTime instruction returns the result of getTime (p, i.ESI+o).

Figure 15:
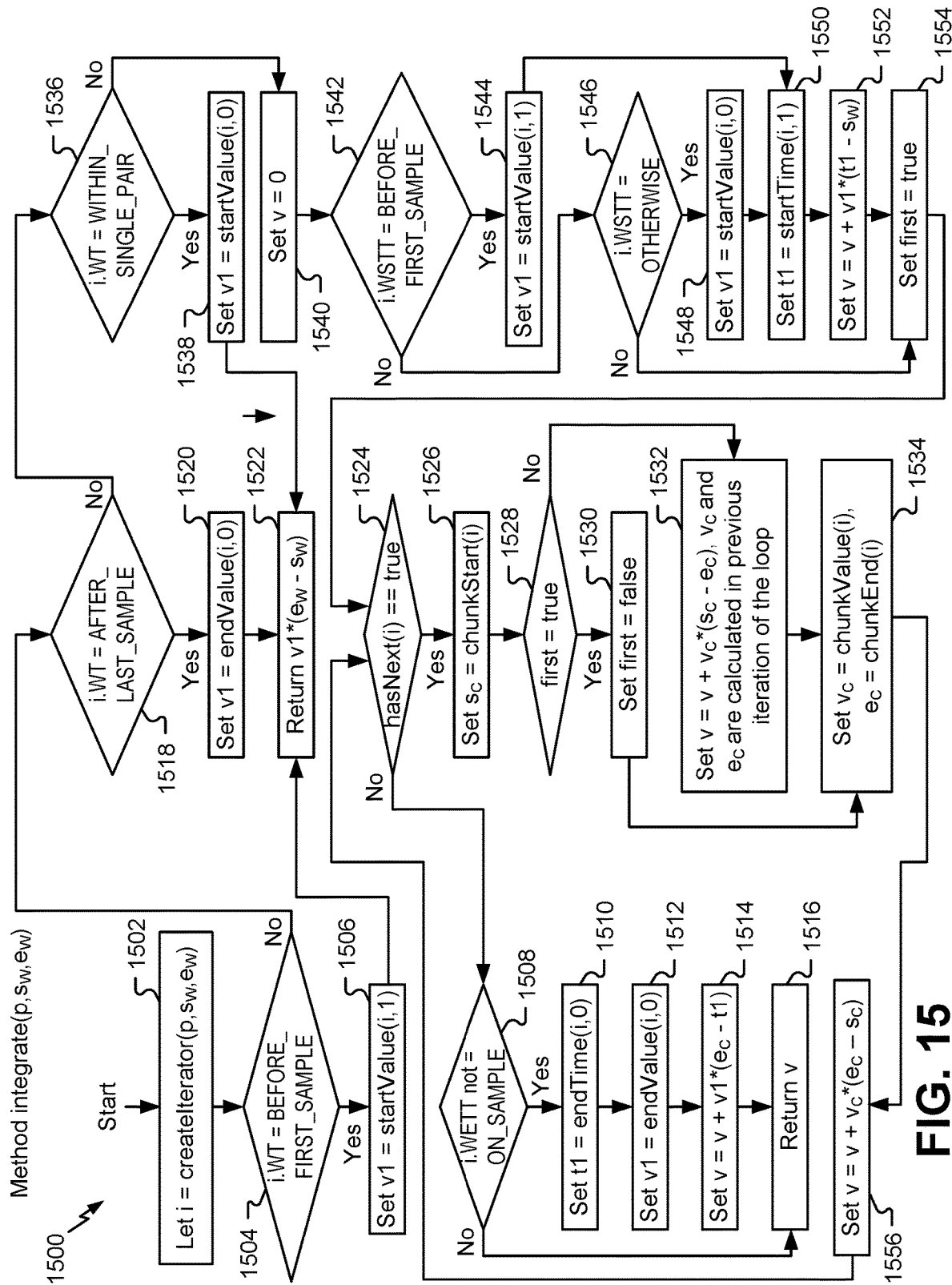
FIG. 15 is a flow chart an example of a method of analyzing stored sensor data based on an iterator handle.

FIG. 15 illustrates a method 1500 of analyzing stored sensor data based on an iterator handle. In some implementations, the method 1500 is performed by the processor 110 to analyze the sensor data 108 (or a portion thereof) stored in the memory 130 of FIG. 1. In a particular implementation, the method 1500 is performed during execution of a "v=integrate (p, $s_w$, $e_w$)" instruction. In this implementation, the method 1500 integrates the stored samples of the parameter p that correspond to a time window indicated by a start time $s_w$ an end time $e_w$. In the particular implementation illustrated in FIG. 15, estimation of parameter values corresponding to sample times for which no stored samples exist is performed using carryForward estimation, as described with reference to the method 1100 of FIG. 11. In other implementations, other types of estimation, such as nearest neighbor estimation, linear interpolation estimation, or other types of estimation are used.

The method 1500 includes creating an iterator handle i based on p, $s_w$, and $e_w$, at 1502. For example, the processor 110 of FIG. 1 executes an i=createIterator (p, $s_w$, $e_w$) instruction, as described with reference to FIGS. 12A and 12B. The method 1500 includes determining whether WT of the iterator handle i is BEFORE_FIRST_SAMPLE, at 1504. If WT is BEFORE_FIRST_SAMPLE, the method 1500 continues to 1506, and v1 is set equal to the parameter value of the first stored sample. For example, the processor 110 executes a v1=startValue (i, 1) instruction. After setting the value of v1, the method 1500 proceeds to 1522, and v1*($e_w$-$s_w$) is returned.

Returning to 1504, if WT is not BEFORE_FIRST_SAMPLE, the method 1500 proceeds to 1518, and it is determined if WT is AFTER_LAST_SAMPLE. If WT is AFTER_LAST_SAMPLE, the method 1500 continues to 1520, and v1 is set equal to the parameter value of the last stored sample. For example, the processor 110 executes a v1=endValue (i, 0) instruction. After setting the value of v1, the method 1500 proceeds to 1522, and v1*($e_w$-$s_w$) is returned.

Returning to 1518, if WT is not AFTER_LAST_SAMPLE, the method 1500 proceeds to 1536, and it is determined if WT is WITHIN_SINGLE_PAIR. If WT is WITHIN_SINGLE_PAIR, the method 1500 continues to 1538, and v1 is set equal to the parameter value of the last stored sample having a sample time before the time window. For example, the processor 110 executes a v1==startValue (i, 0) instruction. After setting the value of v1, the method 1500 proceeds to 1522, and v1*($e_w$-$s_w$) is returned.

Returning to 1536, if WT is not WITHIN_SINGLE_PAIR, the method 1500 proceeds to 1540, and v is set equal to 0. The method 1500 includes determining if WSTT is BEFORE_FIRST_SAMPLE, at 1542. If WSTT is BEFORE_FIRST_SAMPLE, the method 1500 continues to 1544, and v1 is set equal to the parameter value of the first stored sample. For example, the processor 110 executes a v1=startValue (i, 1) instruction. After setting the value of v1, the method 1500 proceeds to 1550, and t1 is set equal to the sample time of the first stored sample. For example, the processor 110 executes a t1=startTime (i, 1) instruction. The method 1500 includes adding v1*(t1-$s_w$) to v, at 1552. The method 1500 also includes setting first as true, at 1554. After setting the value of first, the method 1500 proceeds to 1524, as further described herein.

Returning to 1542, if WSTT is not BEFORE_FIRST_SAMPLE, the method 1500 proceeds to 1546, and it is determined whether WSTT is OTHERWISE. If WSTT is not OTHERWISE, the method 1500 proceeds to 1554, and first is set to true. After setting the value of first, the method 1500 proceeds to 1524, as described herein. If WSTT is OTHERWISE, the method 1500 proceeds to 1548, and v1 is set equal to the parameter value of the last stored sample having a sample time before the time window. For example, the processor 110 executes a v1==startValue (i, 0) instruction. After setting the value of v1, the method 1500 proceeds to 1550, and t1 is set equal to the sample time of the first stored sample. For example, the processor 110 executes a t1=startTime (i, 1) instruction. The method 1500 includes adding v1*(t1-$s_w$) to v, at 1552. The method 1500 also includes setting first as true, at 1554. After setting the value of first, the method 1500 proceeds to 1524.

The method 1500 includes determining whether there is a next chunk, at 1524. For example, the processor 110 executes a hasNext (i) instruction and determines if a result of executing the instruction is true. As described with reference to FIG. 13, execution of the hasNext (i) instruction advances the current chunk indicated by the iterator handle i by 1. If there is a next chunk (e.g., if hasNext(i)=true), the method 1500 continues to 1526, and $s_c$ is set equal to sample time of the first sample of the current parameter value chunk indicated by the iterator handle i. For example, the processor 110 executes a $s_c$=chunkStart (i) instruction. The method 1500 also includes determining whether this is the first iteration of the loop that traverses the samples associated with the iterator handle i (e.g., if first is true), at 1528. If this is the first iteration (e.g., first is true), the method 1500 continues to 1530, and first is set false. After setting the value of first, the method 1500 proceeds to 1534, $v_c$ is set equal to the parameter value of the current parameter value chunk indicated by the iterator handle i, and $e_c$ is set equal to the sample time of the last sample of the current parameter value chunk indicated by the iterator handle i. For example, the processor 110 executes a $v_c$=chunkValue (i) instruction and an $e_c$=chunkEnd (i) instruction. After setting the values of $v_c$ and $e_c$, the method 1500 proceeds to 1556, and $v_c$*($e_c$-$s_c$) is added to v. After adding to the value of v, the method 1500 proceeds to 1524, and it is again determined if there is a next chunk.

Returning to 1528, if this is not the first iteration (e.g., if first is false), the method 1500 proceeds to 1532, and $v_c$*($s_c$-$e_c$) is added to v. Performing this addition adds the integration of the parameter values over the gap between the current parameter value chunk and the previous parameter value chunk to v. To illustrate, $v_c$ and $e_c$ are determined during a previous iteration of the loop (e.g., at 1534), and $s_c$ is determined during the current iteration (e.g., at 1526). After adding to v, the method 1500 proceeds to 1534, $v_c$ is set equal to the parameter value of the current parameter value chunk indicated by the iterator handle i, and $e_c$ is set equal to the sample time of the last sample of the current parameter value chunk indicated by the iterator handle i. For example, the processor 110 executes a $v_c$=chunkValue (i) instruction and an $e_c$=chunkEnd (i) instruction. After setting the values of $v_c$ and $e_c$, the method 1500 proceeds to 1556, and $v_c*(e_c-s_c)$ is added to v. After adding to the value of v, the method 1500 proceeds to 1524, and it is again determined if there is a next chunk.

Returning to 1524, if there is not a next chunk (e.g., if execution of the hasNext (i) instruction returns false), the method 1500 proceeds to 1508, and it is determined whether WETT of the iterator handle i is not ON_SAMPLE. If WETT is ON_SAMPLE, the method 1500 proceeds to 1516, and v is returned. If WETT is not ON_SAMPLE, the method 1500 continues to 1510, and t1 is set equal to the sample time of the last sample before the time window ends. For example, the processor 110 executes a t1=endTime (i, 0) instruction. The method 1500 includes setting v1 equal to the parameter value of the last sample before the time window ends, at 1512. For example, the processor executes a v1=endValue (i, 0) instruction. The method 1500 includes adding $v1*(e_c-t1)$ to v, at 1514. After adding to v, the method 1500 continues to 1516, and v is returned.

Thus, the method 1500 of FIG. 15 performs integration of the parameter values of stored samples of the parameter p that correspond to the time window indicated by the start time $s_w$ and the end time $e_w$. The integration performed by the method 1500 may be used to enable a variety of analytics tasks, such as calculating the total amount of fuel burn during the cruise period of a flight using a fuel-flow-rate parameter, or calculating the flown distance during the climb period of a flight using an in-air speed parameter. Although integration is described with reference to FIG. 15, in other implementations, other calculations may be performed using an iterator handle. For example, the maximum or minimum parameter value during the time window can be calculated if, instead of adding $v_c*(s_c-e_c)$ to v at 1532, v1 is compared to v and v is updated if v is greater than v1 (if the maximum is being determined) or v is updated if v is less than v1 (if the minimum is being determined). As another example, an average parameter value for the time window can be calculated by dividing the integration result by the length of the time window. As another example, a standard deviation of the parameter values for the time window can be calculated by performing the above-described integration for the parameter values and for squares of the parameter values, and deriving the standard deviation from the integration result, the integration of squares result, and the window length. As another example, kurtosis or other high order moments can be calculated by performing the above-described integration for different powers of the parameter values corresponding to the time window.

Figure 16:
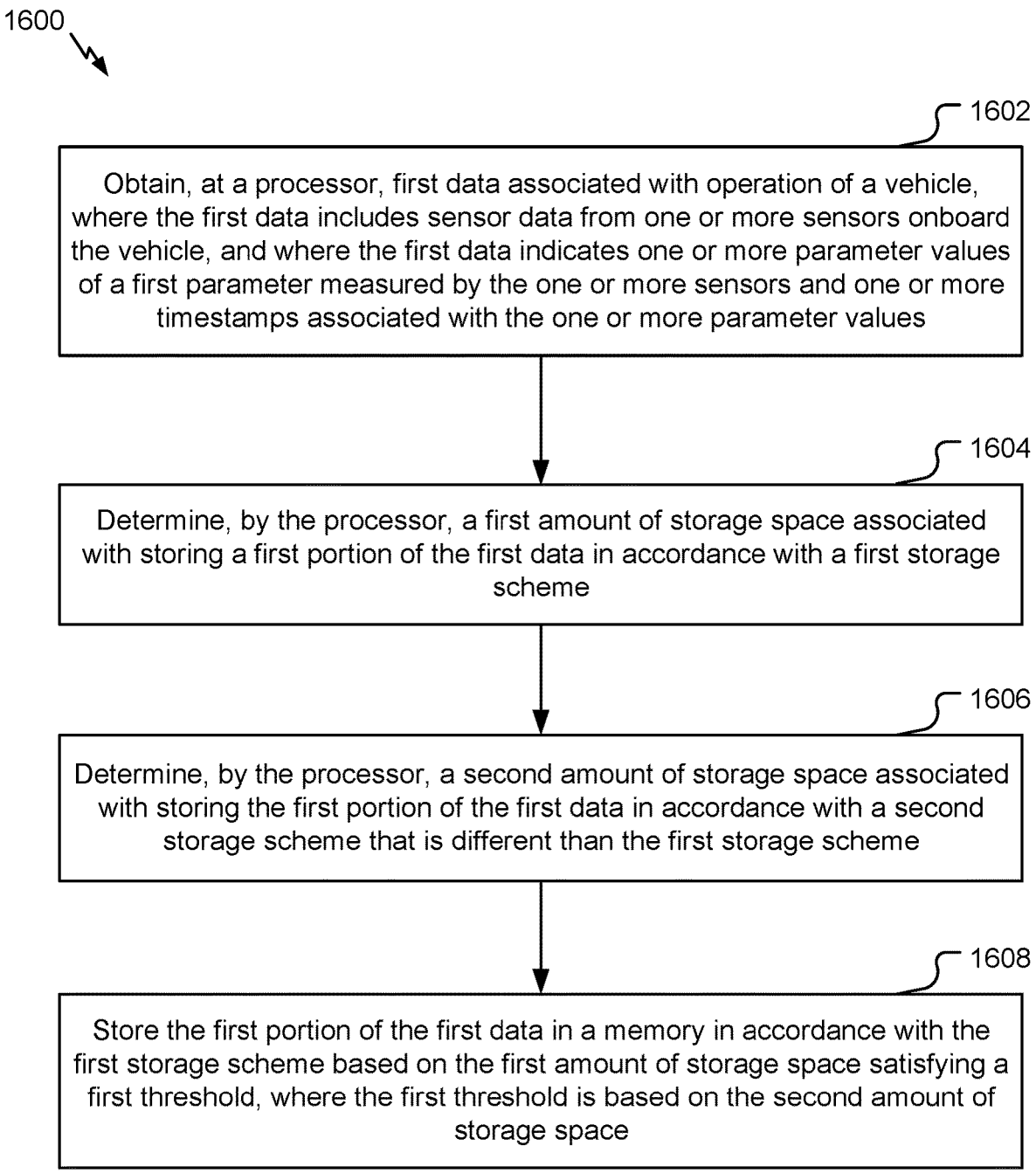
FIG. 16 is a flow chart of an example of a method of storing vehicle sensor data in accordance with one or more storage schemes.

FIG. 16 illustrates a method 1600 of storing vehicle sensor data in accordance with one or more storage schemes. In some implementations, the method 1600 is performed by the processor 110 of FIG. 1. In some implementations, the method 1600 is performed as part of a process of monitoring vehicle operation.

The method 1600 includes obtaining, at a processor, first data associated with operation of a vehicle, at 1602. For example, the processor includes or corresponds to the processor 110 of FIG. 1, and the first data includes or corresponds to the sensor data 108 of FIG. 1. In a particular implementation, the vehicle includes an aircraft. The first data includes sensor data from one or more sensors onboard the vehicle. For example, the one or more sensors include the one or more sensors 102 of FIG. 1. The first data indicates one or more parameter values of a first parameter measured by the one or more sensors and one or more timestamps associated with the one or more parameter values. For example, the sensor data 108 indicates one or more parameter values (e.g., sample values) of a first parameter and one or more timestamps (e.g., sample times) associated with the one or more parameter values.

The method 1600 includes determining, by the processor, a first amount of storage space associated with storing a first portion of the first data in accordance with a first storage scheme, at 1604. For example, the processor 110 determines the first amount of storage space associated with storing the first portion 132 of the sensor data 108 in the memory 130 in accordance with the first storage scheme 112. In a particular implementation, the first portion of the first data corresponds to the one or more timestamps, the one or more parameter values, or both. In another particular implementation, the first portion of the first data includes an entirety of the first data.

The method 1600 includes determining, by the processor, a second amount of storage space associated with storing the first portion of the first data in accordance with a second storage scheme that is different than the first storage scheme, at 1606. For example, the processor 110 determines the second amount of storage space associated with storing the first portion 132 of the sensor data 108 in the memory 130 in accordance with the second storage scheme 114.

The method 1600 further includes storing the first portion of the first data in a memory in accordance with the first storage scheme based on the first amount of storage space satisfying a first threshold, at 1608. For example, the processor 110 stores the first portion 132 of the sensor data 108 in the memory 130 in accordance with the first storage scheme 112 based on the first amount of storage space satisfying the first threshold 116. The first threshold is based on the second amount of storage space. In some implementations, the first threshold is based further on a control parameter that corresponds to an amount of additional time associated with accessing data stored in accordance with the first storage scheme. For example, the first threshold 116 may be equal to the second amount of storage space or equal to the second amount of storage space multiplied by the control parameter p described with reference to FIG. 5.

In a particular implementation, the method 1600 further includes storing the first portion of the first data in the memory in accordance with the second storage scheme based on the first amount of storage space failing to satisfy the first threshold. For example, if the first amount of storage space fails to satisfy the first threshold 116, the processor 110 stores the first portion 132 of the sensor data 108 in the memory 130 in accordance with the second storage scheme 114.

In another particular implementation, storing the first portion of the first data in accordance with the first storage scheme includes storing, in the memory, a first data structure. One or more entries of the first data structure include a starting timestamp, an ending timestamp, an accumulative count, and a parameter value. For example, the first storage scheme includes or corresponds to the fast compact storage scheme 230 of FIG. 2, and the first data structure includes or corresponds to the first data structure 231 of FIG. 2. In some implementations, the first data structure includes a first entry and a second entry that is subsequent to the first entry, a first accumulative count of the first entry is based on a total number of samples of the first parameter that correspond to the first entry, and a second accumulative count of the second entry is based on the first accumulative count and a total number of samples of the first parameter that correspond to the second entry. For example, the first data structure 231 includes a first element that includes the first accumulative count 260 and a second element that includes the second accumulative count 262. The first accumulative count 260 is based on a total number samples of the first parameter that correspond to the first entry, and the second accumulative count 262 is based on (e.g., is a sum of) the first accumulative count 260 and a total number of samples of the first parameter that correspond to the second entry, as described with reference to FIG. 2.

In another particular implementation, storing the first portion of the first data in accordance with the first storage scheme includes storing, in the memory, a second data structure. One or more entries of the second data structure include a timestamp and an accumulative time count that corresponds to the timestamp. For example, the first storage scheme includes or corresponds to the split compact storage scheme 300 of FIG. 3, and the second data structure includes or corresponds to the second data structure 304 of FIG. 3. To illustrate, the second data structure includes a first entry and a second entry subsequent to the first entry, the first entry includes a first timestamp and a first accumulative time count, the second entry includes a second timestamp and a second accumulative time count, and the second accumulative time count is equal a sum of the first accumulative time count and a number of measurements of the first parameter that occur at a fixed rate from a time corresponding to the second timestamp. For example, the second data structure 304 includes a first entry that includes the first starting timestamp 312 and the first accumulative time count 322 and a second entry that includes the second starting timestamp 314 and the second accumulative time count 324, as described with reference to FIG. 3.

In this implementation, storing the first portion of the first data in accordance with the first storage scheme further includes storing, in the memory, a third data structure. One or more entries of the third data structure include a parameter value and an accumulative value count that corresponds to the parameter value. For example, the first storage scheme includes or corresponds to the split compact storage scheme 300 of FIG. 3, and the third data structure includes or corresponds to the third data structure 306 of FIG. 3. To illustrate, the third data structure includes a third entry and a fourth entry subsequent to the third entry, the third entry includes a first parameter value and a first accumulative value count, the fourth entry includes a second parameter value and a second accumulative value count, and the second accumulative value count is equal to a sum of the first accumulative value count a number of consecutive measurements of the first parameter that have the second parameter value. For example, the third data structure 306 includes a first entry that includes the first parameter value 332 and the first accumulative value count 342 and a second entry that includes the second parameter value 334 and the second accumulative value count 344, as described with reference to FIG. 3.

In another particular implementation, storing the first portion of the first data in accordance with the second storage scheme includes storing, in the memory, the one or more timestamps in a first array and storing the one or more parameter values in a second array. For example, the second storage scheme includes or corresponds to the direct storage scheme 400 of FIG. 4, and samples are stored as the fourth data structure 402.

In another particular implementation, the method 1600 includes determining, by the processor, a third amount of storage space associated with storing a second portion of the first data in accordance with the first storage scheme. In this implementation, the method 1600 includes determining, by the processor, a fourth amount of storage space associated with storing the second portion of the first data in accordance with the second storage scheme. In this implementation, the method 1600 further includes storing the second portion of the first data in the memory in accordance with the first storage scheme based on the third amount of storage space satisfying a second threshold. The second threshold is based on the fourth amount of storage space. To illustrate, the processor 110 determines a third amount of storage space associated with storing the second portion 134 of the sensor data 108 in accordance with the first storage scheme 112 and a fourth amount of storage space associated with storing the second portion 134 of the sensor data 108 in accordance with the second storage scheme 114. The processor 110 stores the second portion 134 of the sensor data 108 in the memory 130 in accordance with the second storage scheme 114 based on the third amount of storage space failing to satisfy the second threshold 118 (which is based on the fourth amount of storage space).

In another particular implementation, the method 1600 includes, after storing the first portion of the first data in accordance with the first storage scheme, processing the first portion of the first data from the memory. Processing the first portion of data may include designating an iterator handle configured to analyze a subset of the first portion of the first data corresponding to a time period between a selected start time and a selected end time. For example, the processor 110 may create the iterator handle 120 by executing a createIterator (p, selected start time, selected end time) instruction, as described with reference to FIGS. 12A and 12B. The iterator handle is further configured to identify a starting information chunk (corresponding to the selected start time) of the first portion of the first data and an ending information chunk (corresponding to the selected end time) associated with the first portion of the first data, as described with reference to FIGS. 12A and 12B. In a particular implementation, the selected start time and the selected end time are based on a user input. For example, the interface device 140 of FIG. 1 receives a user input that indicates selection of a start time and an end time, and the interface device 140 generates the input 142 that indicates the selected start time and the selected end time.

The method 1600 enables storage of sensor data corresponding to one or more operational parameters using less storage space than other methods of storing sensor data, which reduces a memory footprint associated with the stored sensor data. Additionally, in some implementations (e.g., implementations in which at least a portion of the sensor data is stored in accordance with a split compact storage scheme), the method 1600 enables faster accessing of stored sensor data while maintaining the reduced memory footprint, which reduces processing time and resources associated with analyzing the stored sensor data.

In a particular implementation, one or more of the elements of the method 500 of FIG. 5, the method 600 of FIGS. 6A and 6B, the method 700 of FIGS. 7A and 7B, the method 800 of FIG. 8, the methods 900, 920, and 930 of FIG. 9, the method 1000 of FIG. 10, the methods 1100, 1110, and 1130 of FIG. 11, the method 1200 of FIGS. 12A and 12B, the methods 1300, 1310, and 1320 of FIG. 13, the method 1400 of FIG. 14, the method 1500 of FIG. 15, the method 1600 of FIG. 16, or a combination thereof, may be performed by a processor that executes instructions stored on a non-transitory, computer readable medium. For example, a non-transitory computer readable medium may store instructions that, when executed by a processor, cause the processor to perform operations including obtaining sensor data associated with operation of a vehicle. The sensor data is generated by one or more sensors onboard the vehicle, and the sensor data indicates one or more samples of at least one operational parameter measured by the one or more sensors and one or more timestamps associated with the one or more samples. The operations include determining a first amount of storage space associated with storing a portion of the sensor data in accordance with a first storage scheme. The operations include determining a second amount of storage space associated with storing the portion of the sensor data in accordance with a second storage scheme that is different than the first storage scheme. The operations further include storing the portion of the sensor data in a memory in accordance with the first storage scheme based on the first amount of storage space satisfying a first threshold, wherein the first threshold is based on the second amount of storage space. To illustrate, execution of the instructions causes the processor 110 of FIG. 1 to obtain the sensor data 108, to determine a first amount of storage space associated with storing the first portion 132 of the sensor data 108 in the memory 130 in accordance with the first storage scheme 112, to determine a second amount of storage space associated with storing the first portion 132 of the sensor data 108 in the memory 130 in accordance with the second storage scheme 114, and to store the first portion 132 of the sensor data 108 in the memory 130 in accordance with the first storage scheme 112 based on the first amount of storage space satisfying the first threshold 116.

In a particular implementation, the operations further include, after the portion of the sensor data is stored in accordance with the first storage scheme, accessing a particular sample of the one or more samples based on an index corresponding to the particular sample. For example, the processor 110 of FIG. 1 executes the getTime instruction associated with the method 900 of FIG. 9 or the getValue instruction associated with the method 920 of FIG. 9 to access a sample of the stored sensor data 108 in the memory 130. In another particular implementation, the operations further include, after the portion of the sensor data is stored in accordance with the first storage scheme, accessing a particular sample of the one or more samples based on a timestamp corresponding to the particular sample. For example, the processor 110 of FIG. 1 executes the getValueAt instruction associated with the method 930 of FIG. 9 to access a sample of the sensor data 108 stored in the memory 130. In another particular implementation, the particular sample is accessed in O (log k) time, and wherein the portion of the sensor data is stored as k chunks of samples, as described with reference to FIG. 9.

In another particular implementation, the operations further comprise storing a second portion of the sensor data in the memory in accordance with the second storage scheme and initiating a compress operation on the second portion of the sensor data. For example, the processor 110 of FIG. 1 stores the second portion 134 of the sensor data 108 in the memory 130 in accordance with the second storage scheme 114. To compress the second portion 134, the processor 110 executes the compress instruction described with reference to FIG. 8. The compress operation causes the second portion of the sensor data to be stored in accordance with the first storage scheme responsive to a third amount of storage space associated with storing the second portion of the sensor data in accordance with the first storage scheme failing to exceed a second threshold that is based on a fourth amount of storage space associated with storing the second portion of the sensor data in accordance with the second storage scheme, as described with reference to FIG. 8.

Figure 17:
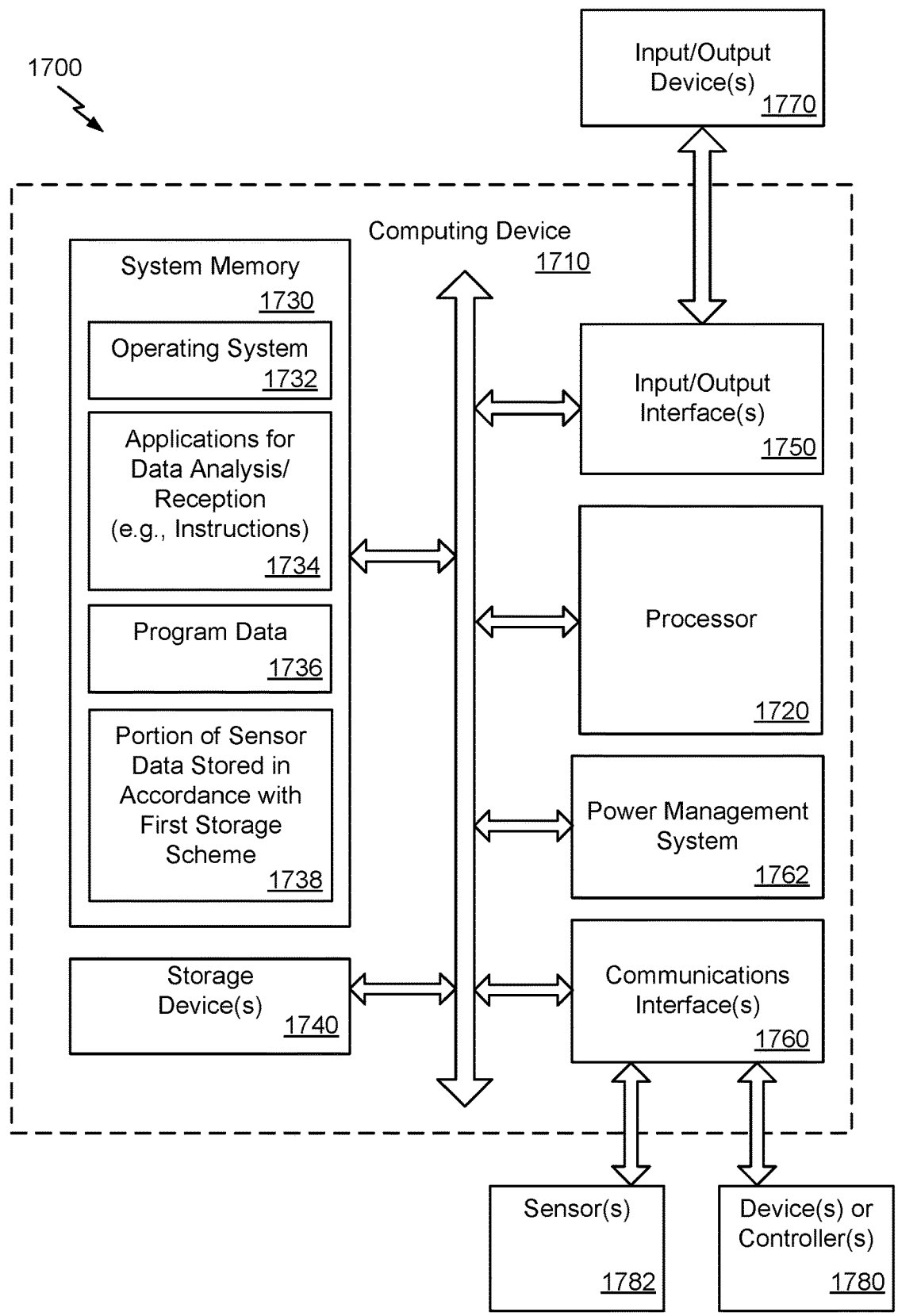
FIG. 17 is a block diagram that illustrates a particular implementation of a computing device configured to store vehicle sensor data in accordance with one or more storage schemes.

FIG. 17 is a block diagram of a computing environment 1700 including a computing device 1710 operable to store sensor data in accordance with one or more storage schemes. For example, the computing device 1710 may include one or more of the components illustrated in FIG. 1. In a particular implementation, the computing device 1710 is integrated within or included on-board a vehicle, such as an aircraft. In an alternate implementation, the computing device 1710 is external to and communicatively coupled to a vehicle, such as an aircraft.

The computing device 1710 includes at least one processor 1720. In a particular implementation, the at least one processor 1720 includes or corresponds to the processor 110 of FIG. 1. Within the computing device 1710, the at least one processor 1720 communicates with a system memory 1730, one or more storage devices 1740, one or more input/output interfaces 1750, one or more communications interfaces 1760, a power management system 1762, or a combination thereof. In a particular implementation, the system memory 1730 or the one or more storage devices 1740 include or correspond to the memory 130 of FIG. 1.

The system memory 1730 includes volatile memory devices (e.g., random access memory (RAM) devices), nonvolatile memory devices (e.g., read-only memory (ROM) devices, programmable read-only memory, and flash memory), or both. The system memory 1730 includes an operating system 1732, which in some implementations includes a basic input/output system for booting the computing device 1710 as well as a full operating system to enable the computing device 1710 to interact with users, other programs, and other devices. The system memory 1730 also includes one or more applications 1734 (e.g., instructions) for data generation/reception, program data 1736, and a portion 1738 of sensor data that is stored in accordance with a first storage scheme. In some implementations, the system memory 1730 also includes additional portions of the sensor data stored in accordance with one or more storage schemes, such as a second portion of the sensor data stored in accordance with a second storage scheme. The first storage scheme may include or correspond to the first storage scheme 112 of FIG. 1, the fast compact storage scheme 230 of FIG. 2, the split compact storage scheme 300 of FIG. 3, or a combination thereof, and the second storage scheme may include or correspond to the second storage scheme 114 of FIG. 1, the direct storage scheme 400 of FIG. 4, or a combination thereof. The program data 1736 includes data used by the applications 1734 to perform respective functions of the applications 1734. The applications 1734 include instructions executable by the at least one processor 1720 to obtain and store sensor data, and to analyze the stored sensor data. For example, the applications 1734 may include one or more flight data analytics applications.

The one or more storage devices 1740 include nonvolatile storage devices, such as magnetic disks, optical disks, or flash memory devices. In some implementations, the one or more storage devices 1740 include both removable and non-removable memory devices. In a particular implementation, the one or more storage devices 1740 are configured to store the operating system 1732, the applications 1734, the program data 1736, the portion 1738 of sensor data, or a combination thereof. The system memory 1730 and the one or more storage devices 1740 are physical devices and are not a signal.

In a particular implementation, the at least one processor 1720 is configured to execute computer executable instructions, such as the applications 1734, stored at the system memory 1730. The instructions are executable to cause the at least one processor 1720 to perform operations. The operations include any of the method 500 of FIG. 5, the method 600 of FIGS. 6A and 6B, the method 700 of FIGS. 7A and 7B, the method 800 of FIG. 8, the methods 900, 920, and 930 of FIG. 9, the method 1000 of FIG. 10, the methods 1100, 1110, and 1130 of FIG. 11, the method 1200 of FIGS. 12A and 12B, the methods 1300, 1310, and 1320 of FIG. 13, the method 1400 of FIG. 14, the method 1500 of FIG. 15, the method 1600 of FIG. 16, or a combination thereof.

The one or more input/output interfaces 1750 enable the computing device 1710 to communicate with one or more input/output devices 1770 to facilitate user interaction. For example, the one or more input/output interfaces 1750 are adapted to receive input from a user, to receive input from another computing device, or a combination thereof. In some implementations, the input/output interfaces 1750 conform to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces. In some implementations, the input/output devices 1770 include user interface devices and displays, including some combination of buttons, keyboards, pointing devices, displays, speakers, microphones, touch screens, and other devices. In some implementations, the at least one processor 1720 detects interaction events based on user input received via the input/output interfaces 1750. Additionally, in some implementations, the at least one processor 1720 sends a display to a display device via the input/output interfaces 1750. In a particular implementation, the input/output devices 1770 include or correspond to the interface device 140 and the display device 150 of FIG. 1.

The one or more communications interfaces 1760 enable the computing device 1710 to communicate with one or more other computing devices or controllers 1780. The one or more communications interfaces 1760 may include wired Ethernet interfaces, IEEE 802 wireless interfaces, Bluetooth communication interfaces, electrical (or power line) interfaces, optical or radio frequency interfaces, or other wired or wireless interfaces. The other computer devices or controllers 1780 include host computers, servers, workstations, portable computers, telephones, tablet computers, or any other communication device or component, as non-limiting examples. The one or more communication interfaces 1760 also enable communication with one or more sensors 1782. The one or more sensors 1782 include sensor(s) of a vehicle that are configured to measure or determine one or more operational parameters. For example, if the vehicle is an aircraft, the one or more sensors 1782 are configured to measure or determine one or more operational characteristics of the aircraft before, during, and/or after flight.

Although illustrated as external to the computing device 1710, in other implementations, the one or more sensors 1782 are integrated within the computing device 1710. In a particular implementation, the one or more sensors 1782 include or correspond to the one or more sensors 102 of FIG. 1. The power management system 1762 is configured to manage power resources and to suppress one or more operations or to put the computing device 1710 into a low power mode (e.g., a "sleep mode") if power resources (e.g., battery charge) fall below a threshold amount.

Figure 18:
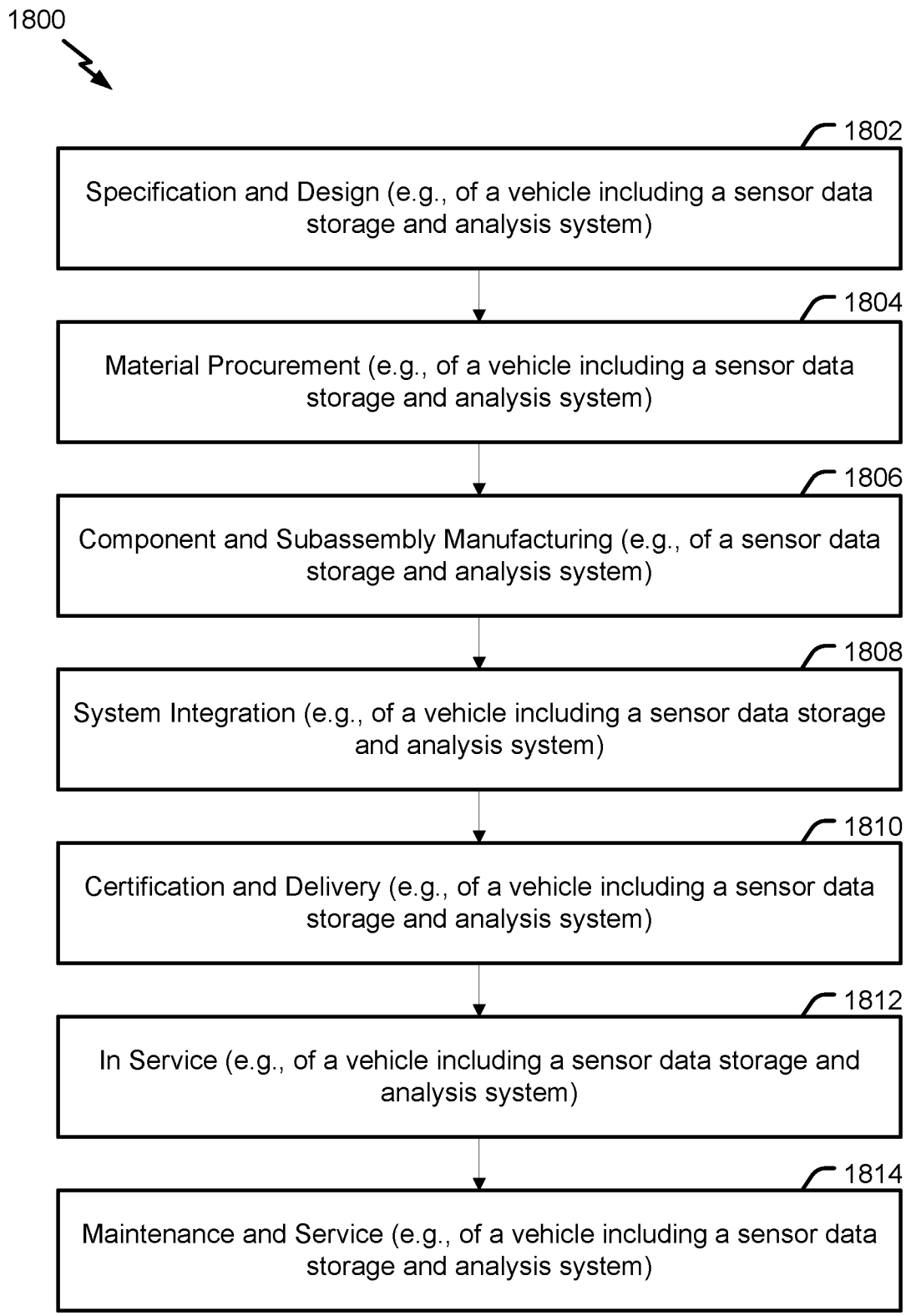
FIG. 18 is a flow chart of a method associated with a sensor data storage and analysis system.
Figure 19:
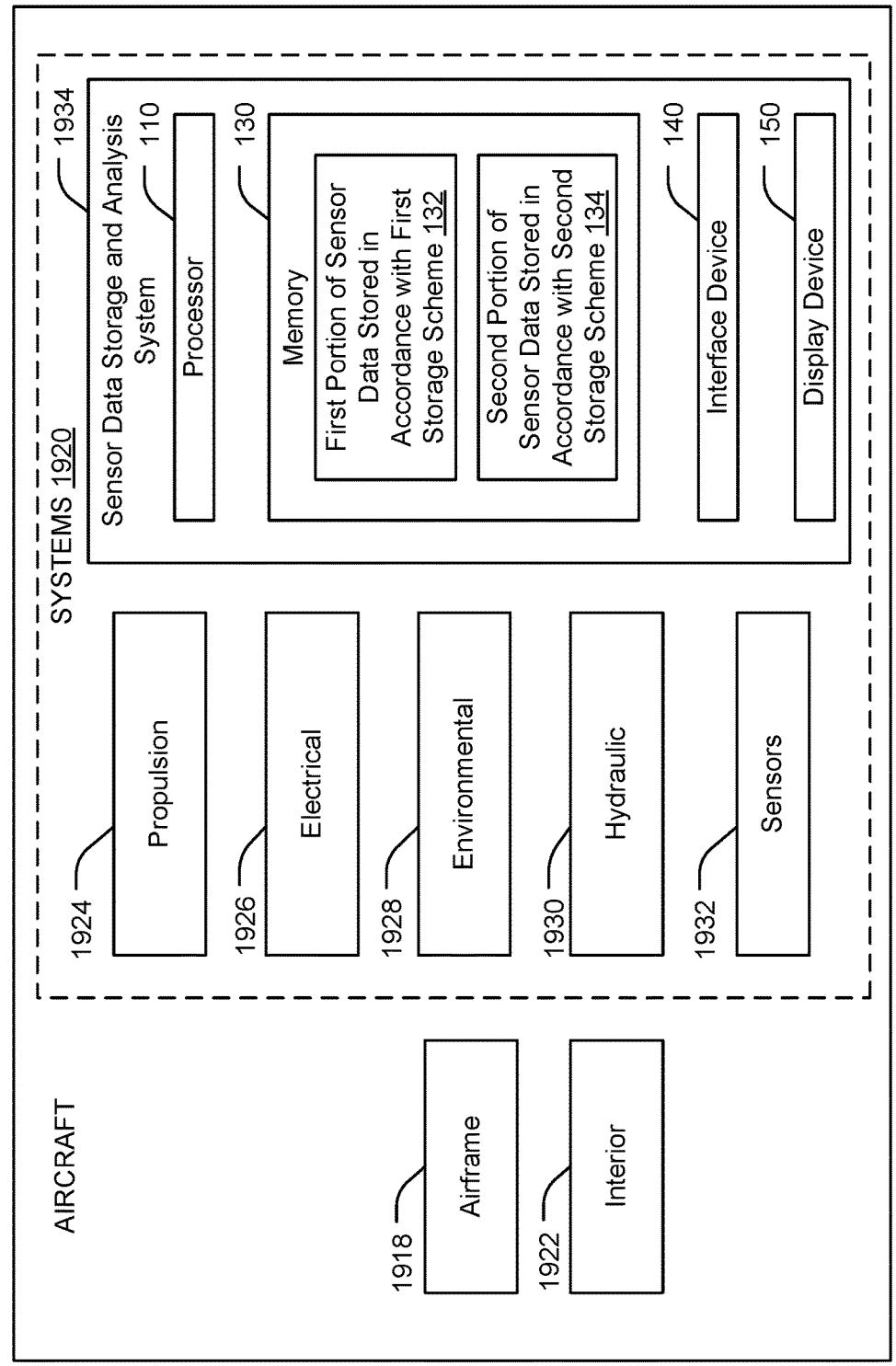
FIG. 19 is a block diagram of an aircraft including a sensor data storage and analysis system.

Referring to FIGS. 18 and 19, examples of the disclosure are described in the context of a vehicle manufacturing and service method 1800 as illustrated by the flow chart of FIG. 18 and a vehicle system 1900 as illustrated by the block diagram of FIG. 19. A vehicle produced by the vehicle manufacturing and service method 1800 of FIG. 18 and a vehicle 1900 of FIG. 19 may include aircraft, an automobile, a train, a motorcycle, a bus, a ship or boat, a rocket, a spacecraft, an autonomous vehicle, or another vehicle, as illustrative, non-limiting examples.

Referring to FIG. 18, a flowchart of an illustrative example of a method associated with a sensor data storage and analysis system is shown and designated 1800. During pre-production, the exemplary method 1800 includes, at 1802, specification and design of a vehicle, such as a vehicle 1900 described with reference to FIG. 19. During the specification and design of the vehicle, the method 1800 includes specifying one or more sensors, a processor, a memory, an interface device, a display device, or a combination thereof. In a particular implementation, the one or more sensors, the processor, the memory, the interface device, and the display device include or correspond to the one or more sensors 102, the processor 110, the memory 130, the interface device 140, and the display device 150, respectively, of FIG. 1. At 1804, the method 1800 includes material procurement. For example, the method 1800 may include procuring materials (such as the one or more sensors, the processor, the memory, the interface device, the display device, or a combination thereof) for the sensor data storage and analysis system.

During production, the method 1800 includes, at 1806, component and subassembly manufacturing and, at 1808, system integration of the vehicle. The method 1800 may include component and subassembly manufacturing (e.g., producing the one or more sensors, the processor, the memory, the interface device, the display device, or a combination thereof) of the sensor data storage and analysis system and system integration (e.g., coupling the one or more sensors to the processor) of the sensor data storage and analysis system. At 1810, the method 1800 includes certification and delivery of the vehicle and, at 1812, placing the vehicle in service. In some implementations, certification and delivery includes certifying the sensor data storage and analysis system. Placing the vehicle in service may also include placing sensor data storage and analysis system in service. While in service by a customer, the vehicle may be scheduled for routine maintenance and service (which may also include modification, reconfiguration, refurbishment, and so on). At 1814, the method 1800 includes performing maintenance and service on the vehicle. The method 1800 may include performing maintenance and service on the sensor data storage and analysis system. For example, maintenance and service of the sensor data storage and analysis system may include replacing one or more of the one or more sensors, the processor, the memory, the interface device, the display device, or a combination thereof. As another example, maintenance and service of the system may also include upgrading or adjusting one or more storage schemes (e.g., the first storage scheme 112 and/or the second storage scheme 114 of FIG. 1) used by the sensor data storage and analysis system.

Each of the processes of the method 1800 may be performed or carried out by a system integrator, a third party, and/or an operator (e.g., a customer). For the purposes of this description, a system integrator includes without limitation any number of vehicle manufacturers and major-system subcontractors; a third party includes without limitation any number of vendors, subcontractors, and suppliers; and an operator is an airline, leasing company, military entity, service organization, and so on.

Referring to FIG. 19, a block diagram of an illustrative implementation of a vehicle that includes components of a sensor data storage and analysis system is shown and designated 1900. In a particular implementation, the vehicle 1900 includes an aircraft. In other implementations, the vehicle 1900 includes other types of vehicles. In at least one implementation, the vehicle 1900 is produced by at least a portion of the method 1800 of FIG. 18. As shown in FIG. 19, the vehicle 1900 includes an airframe 1918 with a plurality of systems 1920 and an interior 1922. Examples of the plurality of systems 1920 include one or more of a propulsion system 1924, an electrical system 1926, an environmental system 1928, a hydraulic system 1930, and a sensor system 1932. The sensor system 1932 includes one or more sensors onboard the vehicle 1900 and configured to generate sensor data during operation of the vehicle 1900. The sensor data indicates one or more parameter values of at least one operational parameter measured by the one or more sensors and one or more timestamps associated with the one or more parameter values. In a particular implementation, the sensor system 1932 includes the one or more sensors 102 of FIG. 1.

The vehicle 1900 also includes a sensor data storage and analysis system 1934. The sensor data storage and analysis system 1934 includes the processor 110 and the memory 130, as described with reference to FIG. 1. The processor 110 is configured to store portions of the sensor data from the sensor system 1932 in the memory 130 in accordance with one or more storage schemes, such as by storing the first portion 132 of the sensor data in accordance with the first storage scheme and storing the second portion 134 of the sensor data in accordance with the second storage scheme. The sensor data storage and analysis system 1934 optionally includes the interface device 140 (configured to receive an input indicating selection of a time window, as described with reference to FIGS. 1, 12A, and 12B) and the display device 150 (configured to display a report associated with a subset of the sensor data corresponding to at least one parameter measured during the time window, as described with reference to FIGS. 1 and 15).

Any number of other systems may be included in the vehicle 1900. Although an aerospace example is shown, the present disclosure may be applied to other industries. For example, the sensor data storage and analysis system 1934 may be used onboard a manned or unmanned vehicle (such as a satellite, a watercraft, or a land-based vehicle), or in a building or other structure.

Apparatus and methods included herein may be employed during any one or more of the stages of the method 1800 of FIG. 18. For example, components or subassemblies corresponding to production process 1808 may be fabricated or manufactured in a manner similar to components or subassemblies produced while the vehicle 1900 is in service, at 1812 for example and without limitation. Also, one or more apparatus implementations, method implementations, or a combination thereof may be utilized during the production stages (e.g., stages 1802-1810 of the method 1800), for example, by substantially expediting assembly of or reducing the cost of the vehicle 1900. Similarly, one or more of apparatus implementations, method implementations, or a combination thereof may be utilized while the vehicle 1900 is in service, at 1900 for example and without limitation, to maintenance and service, at 1814.

Although one or more of FIGS. 1-19 may illustrate systems, apparatuses, and/or methods according to the teachings of the disclosure, the disclosure is not limited to these illustrated systems, apparatuses, and/or methods. One or more functions or components of any of FIGS. 1-19 as illustrated or described herein may be combined with one or more other portions of another of FIGS. 1-19. For example, one or more elements of the method 500 of FIG. 5, the method 600 of FIGS. 6A and 6B, the method 700 of FIGS. 7A and 7B, the method 800 of FIG. 8, the methods 900, 920, and 930 of FIG. 9, the method 1000 of FIG. 10, the methods 1100, 1110, and 1130 of FIG. 11, the method 1200 of FIGS. 12A and 12B, the methods 1300, 1310, and 1320 of FIG. 13, the method 1400 of FIG. 14, the method 1500 of FIG. 15, the method 1600 of FIG. 16, the method 1800 of FIG. 18, or a combination thereof, may be performed in combination with one or more elements of the method 500 of FIG. 5, the method 600 of FIGS. 6A and 6B, the method 700 of FIGS. 7A and 7B, the method 800 of FIG. 8, the methods 900, 920, and 930 of FIG. 9, the method 1000 of FIG. 10, the methods 1100, 1110, and 1130 of FIG. 11, the method 1200 of FIGS. 12A and 12B, the methods 1300, 1310, and 1320 of FIG. 13, the method 1400 of FIG. 14, the method 1500 of FIG. 15, the method 1600 of FIG. 16, the method 1800 of FIG. 18, any combination thereof, or with other operations described herein. Accordingly, no single implementation described herein should be construed as limiting and implementations of the disclosure may be suitably combined without departing form the teachings of the disclosure. As an example, one or more operations described with reference to FIG. 5-16 or 18 may be optional, may be performed at least partially concurrently, and/or may be performed in a different order than shown or described.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method comprising:
   obtaining, by a processor, first data associated with operation of a vehicle, wherein the first data comprises sensor data from one or more sensors onboard the vehicle, and wherein the first data indicates one or more parameter values of a first parameter measured by the one or more sensors and one or more timestamps associated with the one or more parameter values;
   estimating, by the processor, a first amount of storage space that would be used to store a first portion of the first data in accordance with a first storage scheme;
   estimating, by the processor, a second amount of storage space that would be used to store the first portion of the first data in accordance with a second storage scheme that is different than the first storage scheme; and
   storing the first portion of the first data in a memory in accordance with the first storage scheme based on the first amount of storage space satisfying a first threshold, wherein the first threshold is based on the second amount of storage space.

2. The method of claim 1, wherein the first portion of the first data corresponds to the one or more timestamps, the one or more parameter values, or both.

3. The method of claim 1, further comprising storing the first portion of the first data in the memory in accordance with the second storage scheme based on the first amount of storage space failing to satisfy the first threshold.

4. The method of claim 1, wherein the first threshold is based further on a control parameter that corresponds to an amount of additional time associated with accessing data stored in accordance with the first storage scheme.

5. The method of claim 1, wherein storing the first portion of the first data in accordance with the first storage scheme comprises storing, in the memory, a first data structure, and wherein one or more entries of the first data structure comprise a starting timestamp, an ending timestamp, an accumulative count, and a parameter value.

6. The method of claim 5, wherein the first data structure comprises a first entry and a second entry that is subsequent to the first entry, wherein a first accumulative count of the first entry is based on a total number of samples of the first parameter that correspond to the first entry, and wherein a second accumulative count of the second entry is based on the first accumulative count and a total number of samples of the first parameter that correspond to the second entry.

7. The method of claim 1, wherein storing the first portion of the first data in accordance with the first storage scheme comprises storing, in the memory, a second data structure, and wherein one or more entries of the second data structure comprise a timestamp and an accumulative time count that corresponds to the timestamp.

8. The method of claim 7, wherein the second data structure comprises a first entry and a second entry subsequent to the first entry, wherein the first entry comprises a first timestamp and a first accumulative time count, wherein the second entry comprises a second timestamp and a second accumulative time count, and wherein the second accumulative time count is equal a sum of the first accumulative time count and a number of measurements of the first parameter that occur at a fixed rate from a time corresponding to the second timestamp.

9. The method of claim 7, wherein storing the first portion of the first data in accordance with the first storage scheme further comprises storing, in the memory, a third data structure, and wherein one or more entries of the third data structure comprise a parameter value and an accumulative value count that corresponds to the parameter value.

10. The method of claim 9, wherein the third data structure comprises a third entry and a fourth entry subsequent to the third entry, wherein the third entry comprises a first parameter value and a first accumulative value count, wherein the fourth entry comprises a second parameter value and a second accumulative value count, and wherein the second accumulative value count is equal a sum of the first accumulative value count and a number of consecutive measurements of the first parameter that have the second parameter value.

11. The method of claim 1, wherein storing the first portion of the first data in accordance with the second storage scheme comprises storing, in the memory, the one or more timestamps in a first array and storing the one or more parameter values in a second array.

12. The method of claim 1, wherein the first portion of the first data comprises an entirety of the first data.

13. The method of claim 1, further comprising:
   estimating, by the processor, a third amount of storage space that would be used to store a second portion of the first data in accordance with the first storage scheme;
   estimating, by the processor, a fourth amount of storage space that would be used to store the second portion of the first data in accordance with the second storage scheme; and
   storing the second portion of the first data in the memory in accordance with the second storage scheme based on the third amount of storage space failing to satisfy a second threshold, wherein the second threshold is based on the fourth amount of storage space.

14. The method of claim 1, further comprising, after storing the first portion of the first data in accordance with the first storage scheme, processing the first portion of the first data from the memory, wherein processing the first portion of data comprises designating an iterator handle configured to analyze a subset of the first portion of the first data corresponding to a time period between a selected start time and a selected end time.

15. The method of claim 14, wherein the iterator handle is further configured to identify a starting information chunk of the first portion of the first data and an ending information chunk associated with the first portion of the first data, wherein the starting information chunk corresponds to the selected start time, and wherein the ending information chunk corresponds to the selected end time.

16. The method of claim 14, wherein the selected start time and the selected end time are based on a user input.

17. The method of claim 1, wherein the vehicle comprises an aircraft.

18. A vehicle comprising:
one or more sensors onboard the vehicle and configured to generate sensor data during operation of the vehicle, wherein the sensor data indicates one or more parameter values of at least one operational parameter measured by the one or more sensors and one or more timestamps associated with the one or more parameter values;
a memory; and
a processor coupled to the memory and configured to:
receive the sensor data;
estimate a first amount of storage space that would be used to store a portion of the sensor data in accordance with a first storage scheme;
estimate a second amount of storage space that would be used to store the portion of the sensor data in accordance with a second storage scheme that is different than the first storage scheme; and
store the portion of the sensor data in the memory in accordance with the first storage scheme based on the first amount of storage space satisfying a threshold, wherein the threshold is based on the second amount of storage space.

19. The vehicle of claim 18, wherein the processor is configured to store the portion of the sensor data in accordance with the first storage scheme by storing, in the memory, a first data structure, and wherein one or more entries of the first data structure comprise a starting timestamp, an ending timestamp, an accumulative time count, and a parameter value.

20. The vehicle of claim 18, wherein the processor is configured to store the portion of the sensor data in accordance with the first storage scheme by storing, in the memory, a second data structure, a third data structure, or both, wherein one or more entries of the second data structure comprise a timestamp and an accumulative time count that corresponds to the timestamp, and wherein one or more entries of the third data structure comprise a parameter value and an accumulative value count that corresponds to the parameter value.

21. The vehicle of claim 18, wherein the processor is further configured to store timestamps corresponding to the portion of the sensor data in accordance with the first storage scheme by storing, in the memory, a third data structure, wherein the processor is further configured to store parameter values corresponding to the portion of the sensor data in accordance with the second storage scheme by storing, in the memory, a fourth data structure, wherein one or more entries of the third data structure comprise a timestamp and an accumulative time count, and wherein one or more entries of the fourth data structure comprise a parameter value.

22. The vehicle of claim 18, further comprising:
an interface device configured to receive an input indicating a selection of a time window; and
a display device configured to display a report associated with a subset of the sensor data corresponding to at least one parameter measured during the time window, wherein the processor is further configured to generate the report based on the input after the portion of the sensor data is stored in the memory.

23. The vehicle of claim 18, wherein the vehicle comprises an aircraft.

24. A non-transitory computer-readable medium storing instructions that, when executed by a processor, cause the processor to perform operations comprising:
obtaining sensor data associated with operation of a vehicle, wherein the sensor data is generated by one or more sensors onboard the vehicle, and wherein the sensor data indicates one or more samples of at least one operational parameter measured by the one or more sensors and one or more timestamps associated with the one or more samples;
estimating a first amount of storage space that would be used to store a portion of the sensor data in accordance with a first storage scheme;
estimating a second amount of storage space that would be used to store the portion of the sensor data in accordance with a second storage scheme that is different than the first storage scheme; and
storing the portion of the sensor data in a memory in accordance with the first storage scheme based on the first amount of storage space satisfying a first threshold, wherein the first threshold is based on the second amount of storage space.

25. The non-transitory computer-readable medium of claim 24, wherein the operations further comprise, after the portion of the sensor data is stored in accordance with the first storage scheme, accessing a particular sample of the one or more samples based on an index corresponding to the particular sample.

26. The non-transitory computer-readable medium of claim 24, wherein the operations further comprise, after the portion of the sensor data is stored in accordance with the first storage scheme, accessing a particular sample of the one or more samples based on a timestamp corresponding to the particular sample.

27. The non-transitory computer-readable medium of claim 26, wherein the particular sample is accessed in O (log k) time, and wherein the portion of the sensor data is stored as k chunks of samples.

28. The non-transitory computer-readable medium of claim 26, wherein the operations further comprise:
storing a second portion of the sensor data in the memory in accordance with the second storage scheme; and
initiating a compress operation on the second portion of the sensor data.

29. The non-transitory computer-readable medium of claim 28, wherein the compress operation causes the second portion of the sensor data to be stored in accordance with the first storage scheme responsive to a third amount of storage space that would be used to store the second portion of the sensor data in accordance with the first storage scheme failing to exceed a second threshold that is based on a fourth amount of storage space that would be used to store the second portion of the sensor data in accordance with the second storage scheme.

* * * * *